US007140460B2

(12) United States Patent
Shimizu et al.

(10) Patent No.: US 7,140,460 B2
(45) Date of Patent: Nov. 28, 2006

(54) VEHICLE DRIVING FORCE CONTROL APPARATUS

(75) Inventors: Kouichi Shimizu, Sagamihara (JP); Keiji Kadota, Zama (JP); Ping Chen, Fujisawa (JP); Tatsuya Kamata, Atsugi (JP); Hiroyuki Ohya, Zama (JP); Yasuaki Iwata, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 75 days.

(21) Appl. No.: 10/635,557

(22) Filed: Aug. 7, 2003

(65) Prior Publication Data

US 2004/0038775 A1 Feb. 26, 2004

(30) Foreign Application Priority Data

| Aug. 26, 2002 | (JP) | ............................. 2002-245566 |
| Aug. 26, 2002 | (JP) | ............................. 2002-245567 |
| Aug. 27, 2002 | (JP) | ............................. 2002-247553 |
| Oct. 3, 2002 | (JP) | ............................. 2002-291240 |
| Oct. 4, 2002 | (JP) | ............................. 2002-291866 |

(51) Int. Cl.
*B60K 6/02* (2006.01)

(52) U.S. Cl. ...................... 180/65.2; 180/243; 903/942; 903/946

(58) Field of Classification Search .............. 180/65.2, 180/65.3, 65.4, 197, 243; 903/930, 942, 903/946; 477/5, 70, 73
See application file for complete search history.

(56) References Cited

U.S. PATENT DOCUMENTS

| 4,351,405 | A | * | 9/1982 | Fields et al. ................ 180/65.2 |
| 4,438,342 | A | * | 3/1984 | Kenyon ........................ 290/45 |
| 5,301,764 | A | * | 4/1994 | Gardner ....................... 180/65.2 |
| 6,008,606 | A | * | 12/1999 | Arai et al. .................... 318/431 |
| 6,059,064 | A | * | 5/2000 | Nagano et al. .............. 180/243 |
| 6,371,883 | B1 | * | 4/2002 | Eguchi ........................ 477/73 |
| 6,434,469 | B1 | | 8/2002 | Shimizu et al. |
| 6,442,454 | B1 | | 8/2002 | Akiba et al. |
| 6,533,701 | B1 | * | 3/2003 | Maruyama ..................... 477/5 |
| 6,540,642 | B1 | * | 4/2003 | Tabata ........................... 477/5 |
| 6,578,649 | B1 | * | 6/2003 | Shimasaki et al. ......... 180/65.2 |
| 6,767,310 | B1 | * | 7/2004 | Amanuma et al. .......... 477/174 |
| 2003/0010559 | A1 | | 1/2003 | Suzuki |
| 2003/0064858 | A1 | | 4/2003 | Saeki et al. |
| 2003/0089539 | A1 | | 5/2003 | Kadota |
| 2003/0151381 | A1 | | 8/2003 | Kadota et al. |

FOREIGN PATENT DOCUMENTS

| JP | 11-243608 A | 9/1999 |
| JP | 2001-138764 A | 5/2001 |
| JP | 2002-218605 A | 8/2002 |
| JP | 2003-025861 A | 1/2003 |

(Continued)

*Primary Examiner*—Frank Vanaman
(74) *Attorney, Agent, or Firm*—Global IP Counselors, LLP

(57) ABSTRACT

A driving force control apparatus is provided for a vehicle capable of preventing a shock from being generated by disengaging a clutch disposed between a subordinate drive source and subordinate drive wheels during vehicle travel. When a transition determination is made in which the clutch will be released, e.g., from a four-wheel drive state to a two-wheel drive state, a clutch release section disengage the clutch, upon the drive torque of the drive source substantially reaching a target drive torque in which a difference between an output torque of the clutch and an input torque of the clutch is smaller than a prescribed value in response to the transition determination.

105 Claims, 27 Drawing Sheets

FOREIGN PATENT DOCUMENTS

| | | |
|---|---|---|
| JP | 2003-130200 A | 5/2003 |
| JP | 2003-156079 A | 5/2003 |
| JP | 2003-209902 A | 7/2003 |

* cited by examiner

VEHICLE DRIVING FORCE CONTROL APPARATUS

BACKGROUND OF THE INVENTION

1. Field of the Invention

The present invention generally relates to a vehicle driving force control apparatus for a vehicle in which a pair of drive wheels are driven by a drive torque from an electric motor. Preferably, the electric motor is driven with electric power generated by a generator that is driven by an internal combustion engine. The present invention especially useful in an all wheel drive vehicle in which a pair of main drive wheels are driven by a main drive source, such as internal combustion engine, and a pair of subordinate drive wheels are driven by the electric motor. Thus, the invention is particularly well-suited for a so-called battery-less four-wheel drive vehicle in which the engine drives the generator and the electric power from the generator is supplied to the electric motor.

2. Background Information

In conventional practice, a driving force control apparatus for a vehicle in which the front wheels are driven by an internal combustion engine, the rear wheels can be driven by an electric motor, and a clutch or reduction gear is disposed in the torque transfer path from the electric motor to the rear wheel axle is described, for example, in Japanese Laid-Open Patent Publication No. 11-243608.

In the driving force control apparatus described in Japanese Laid-Open Patent Publication No. 11-243608, the generation of shocks during clutch connection is prevented by connecting the clutch after idling the electric motor such that the rotational speed of the electric motor becomes equal to a speed that corresponds to the rotational speed of the axle shaft when a transition to a four-wheel drive state is made during vehicle travel.

In conventional practice, a driving force control apparatus for a vehicle in which the front wheels are driven by an internal combustion engine, the rear wheels can be driven by an electric motor, and a clutch or reduction gear is disposed in the torque transfer path from the electric motor to the rear wheel axle is described, for example, in Japanese Laid-Open Patent Publication No. 11-243608.

In the driving force control apparatus described in Japanese Laid-Open Patent Publication No. 11-243608, the generation of shocks during clutch connection is prevented by connecting the clutch after idling the electric motor such that the rotational speed of the electric motor becomes equal to a speed that corresponds to the rotational speed of the axle shaft when a transition to a four-wheel drive state is made during vehicle travel.

SUMMARY OF THE INVENTION

It has been discovered that in the aforementioned prior art, a differential between the rotational speeds of the clutch on the output shaft side and the input shaft side is regarded as the cause of shocks generated during clutch operation. In terms of the underlying technical idea, it is commonly believed that there is apparently no differential in the rotational speed between the output shaft side and the input shaft side when the clutch is moved to a disengaged state, so there is no need to perform any processing to match the rotational speeds, and no shock is generated.

However, the inventors have confirmed that shocks are sometimes generated when the clutch is disengaged. Specifically, in a system in which the drive sources for driving the main drive wheels and the subordinate drive wheels are constructed separately from each other and the subordinate drive wheels are driven only when necessary, the torque from the subordinate drive wheels acts on the clutch because the vehicle is in motion when the clutch is changed to a disengaged state after the output of the electric motor becomes zero as a transfer is made from a four-wheel drive state to a two-wheel drive state during vehicle travel. A resulting drawback is that although there is no differential in rotational speed between the input and output shafts of the clutch, a shock is still sometimes generated because of the existence of a torque that is at or above a prescribed level in the clutch position.

For this reason, a shock is still sometimes generated by the action of a torque that is at or above a prescribed level in the clutch position because this torque exerts an action despite the fact that there is no differential in rotational speed between the input and output shafts of the clutch.

The present invention focuses on this kind of problem and aims to provide a driving force control apparatus for a vehicle capable of preventing a shock from being generated when the clutch disposed between the subordinate drive source and subordinate drive wheels is moved to a disengaged state during vehicle travel.

In view of the foregoing, a vehicle driving force control apparatus is provided for a vehicle having a wheel, a drive source configured to supply the wheel with a drive torque, and a clutch disposed in a torque transfer path from the drive source to the wheel. The vehicle driving force control apparatus basically comprises a transition determining section and a clutch release section. The transition determining section is configured to output a transition determination upon determining a transition condition indicating cease of the drive torque from the drive source to the wheel, while the vehicle is traveling. The clutch release section is configured to disengage the clutch, upon the drive torque of the drive source substantially reaching a target drive torque in which a difference between an output torque of the clutch and an input torque of the clutch is smaller than a prescribed value in response to the transition determination by the transition determining section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
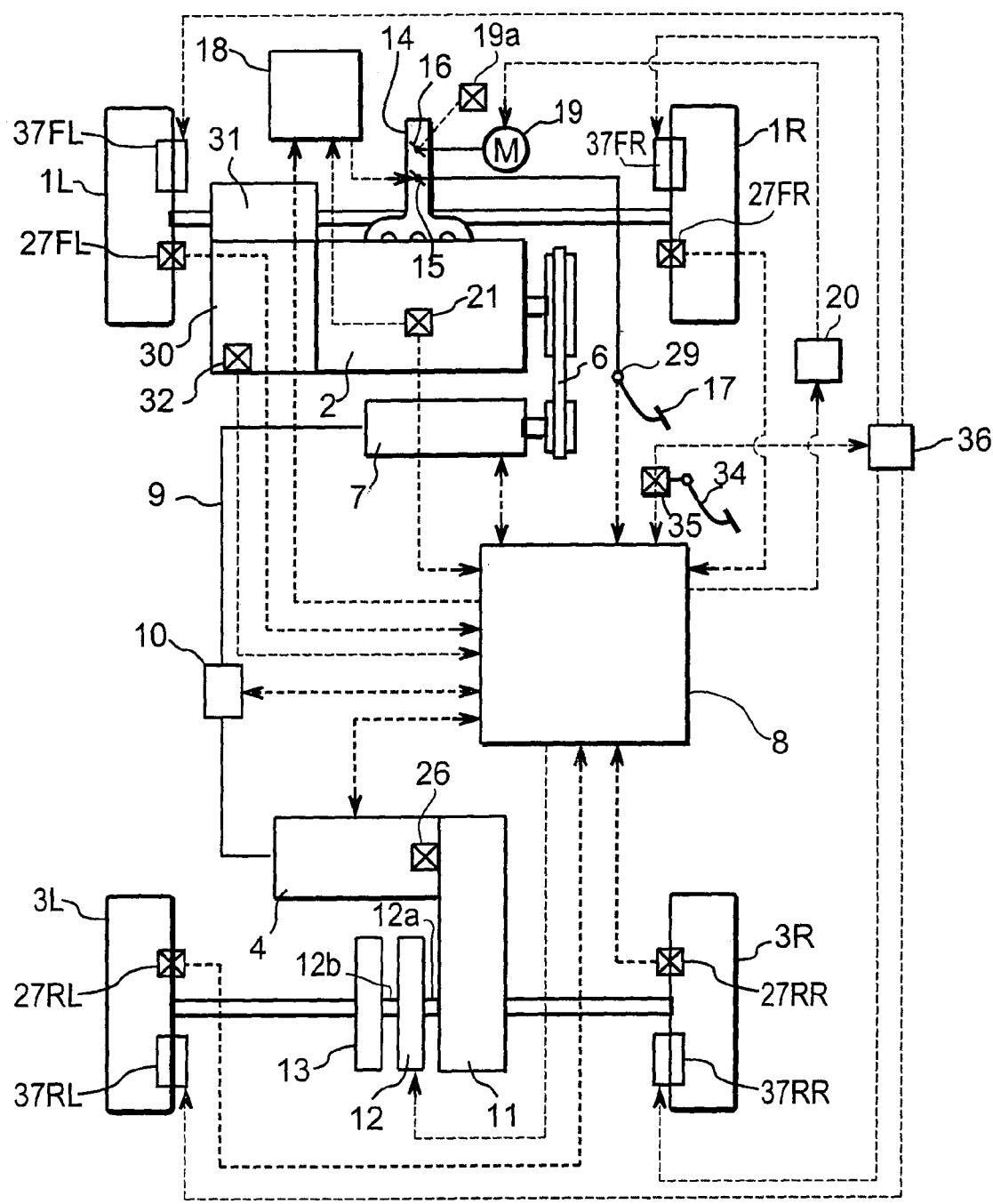
FIG. 1 is a schematic block diagram of a vehicle equipped with a vehicle driving force control apparatus in accordance with preferred embodiments of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the subsequent detailed descriptions of the present invention, the parts of the embodiments that are identical will be given the same reference numerals. Moreover, the descriptions of the component parts of the second embodiment and other embodiments, that are the same or have similar functions as corresponding component parts of the first embodiment may be simplified or omitted.

First Embodiment

Referring initially to FIGS. 1–11, a vehicle driving force control apparatus will now be explained in accordance with a first embodiment of the present invention. As seen in FIG. 1, a four wheel drive vehicle is diagrammatically illustrated that is equipped with the vehicle driving force control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels. An endless drive belt 6 transfers power from the internal combustion engine 2 to a generator 7, which supplies electrical energy to the electric motor 4.

The generator 7 rotates at a rotational speed Nh that is equal to the product of the rotational speed Ne of the internal combustion engine 2 and the pulley ratio of the endless drive belt 6. The load placed on the internal combustion engine 2 by the generator 7 due to the field current Ifh of the generator 7 is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner.

According to the present invention, the shock generated when the clutch 12 is brought to a disengaged state can be avoided by disengaging the clutch 12 when the torque on the clutch 12 is at zero level or in a low state, as explained below. In addition, the clutch 12 can be released in a controlled state in which the motor 4 torque remains constant at a clutch-release torque, whereby the clutch 12 can be released when the motor torque remains at the level of the clutch-release torque in a stable fashion.

The clutch 12 is preferably an electromagnetic clutch having an input shaft 12a coupled to the electric motor 4 via the reduction gear 11, and an output shaft 12b coupled to the rear wheels 3L and 3R via the differential gear 13. Preferably, the clutch 12 is turned on to perform an engagement operation in which the input and output shafts 12a and 12b are connected such that the drive torque from the electric motor 4 is transmitted to the rear wheels 3L and 3R. When the clutch 12 is turned off, a disengagement or release operation occurs in which the input and output shafts 12a and 12b are disengaged such that the drive torque from the electric motor 4 is no longer transmitted to the rear wheels 3L and 3R. Thus, when the clutch 12 is engaged, the vehicle is in a four-wheel (multi-wheel) drive state in which all of the wheels 1L, 1R, 3L and 3R are driven. When the clutch 12 is released, the vehicle is in a two-wheel (non-all wheel) drive state in which only the front wheels 1L and 1R are driven by the internal combustion engine 2. It is preferable in accordance with the present invention to release the clutch 12, during the vehicle traveling, such that substantially no shock occurs in the vehicle, or at least the shock to the vehicle is below a prescribed limit. Preferably, the clutch 12 is released in accordance with the present invention when the vehicle is traveling such that the drive torque of the electric motor 4 is sufficient to avoid a vehicle shock above a prescribed limit.

A main throttle valve 15 and a sub throttle valve 16 are disposed inside the intake passage 14 (e.g., an intake manifold) of the internal combustion engine 2. The throttle opening of the main throttle valve 15 is adjusted/controlled in accordance with the amount of depression of the accelerator pedal 17, which also constitutes or functions as an accelerator position detecting device or sensor, or a throttle opening instructing device or sensor. In order to adjust the throttle opening of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 29 that detects the depression amount of the accelerator pedal 17 or the degree of opening of the main throttle valve 15. The depression amount detection value from the accelerator sensor 29 is outputted as a control signal to the 4WD controller 8. The accelerator sensor 29 constitutes an acceleration or throttle instruction sensor. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening. Specifically, the throttle opening of the sub throttle valve 16 is adjusted/controlled by the rotational angle of the stepper motor 19, which corresponds to the step count. The rotational angle of the stepper motor 19 is adjusted/controlled by a drive signal from the motor controller 20. The sub throttle valve 16 is provided with a throttle sensor 19a shown in FIG. 2. The step count of the stepper motor 19 is feedback-controlled based on the throttle opening detection value detected by this throttle sensor 19a. The output torque of the internal combustion engine 2 can be controlled (reduced) independently of the driver's operation of the accelerator pedal 17 by adjusting the throttle opening of the sub throttle valve 16 so as to be smaller than the throttle opening of the main throttle valve 15.

The apparatus is also equipped with an engine rotational speed sensor 21 that detects the rotational speed Ne of the internal combustion engine 2. The engine rotational speed sensor 21 outputs a control signal that is indicative of the engine rotational speed Ne to both the engine controller 18 and the 4WD controller 8.

As shown in the FIG. 1, the engine output torque Te of the internal combustion engine 2 is transferred to the left and right front wheels 1L and 1R through an automatic transmission 30 using a torque converter and a differential gear 31 in a conventional manner. A portion of the engine output torque Te of the internal combustion engine 2 is transferred to the generator 7 using the endless drive belt 6 to supply electrical energy to the electric motor 4. In other words, the generator 7 is rotated at a rotational speed Nh, which is obtained by multiplying the rotational speed Ne of the internal combustion engine 2 by the pulley ratio of the endless drive belt 6.

The transmission 30 is provided with a shift position detecting device or sensor 32 (gear ratio detecting device) that is configured and arranged to detect the current gear range of the automatic transmission 30. The shift position detecting sensor 32 is configured and arranged to output or send a detected shift position signal that is indicative of the current gear range of the transmission 30 to the 4WD controller 8.

A brake pedal 34 is provided that constitutes a brake instructing/operating section. The stroke amount of the brake pedal 34 is detected by a brake stroke sensor 35, which constitutes a brake operation amount sensor. The brake stroke sensor 35 outputs the brake stroke amount it detects to a brake controller 36 and the 4WD controller 8.

The brake controller 36 controls the braking force acting on the vehicle by controlling the braking devices (e.g., disc brakes) 37FL, 37FR, 37RL and 37RR installed on the wheels 1L, 1R, 3L and 3R in response to the inputted brake stroke amount by the brake pedal 34.

Figure 2:
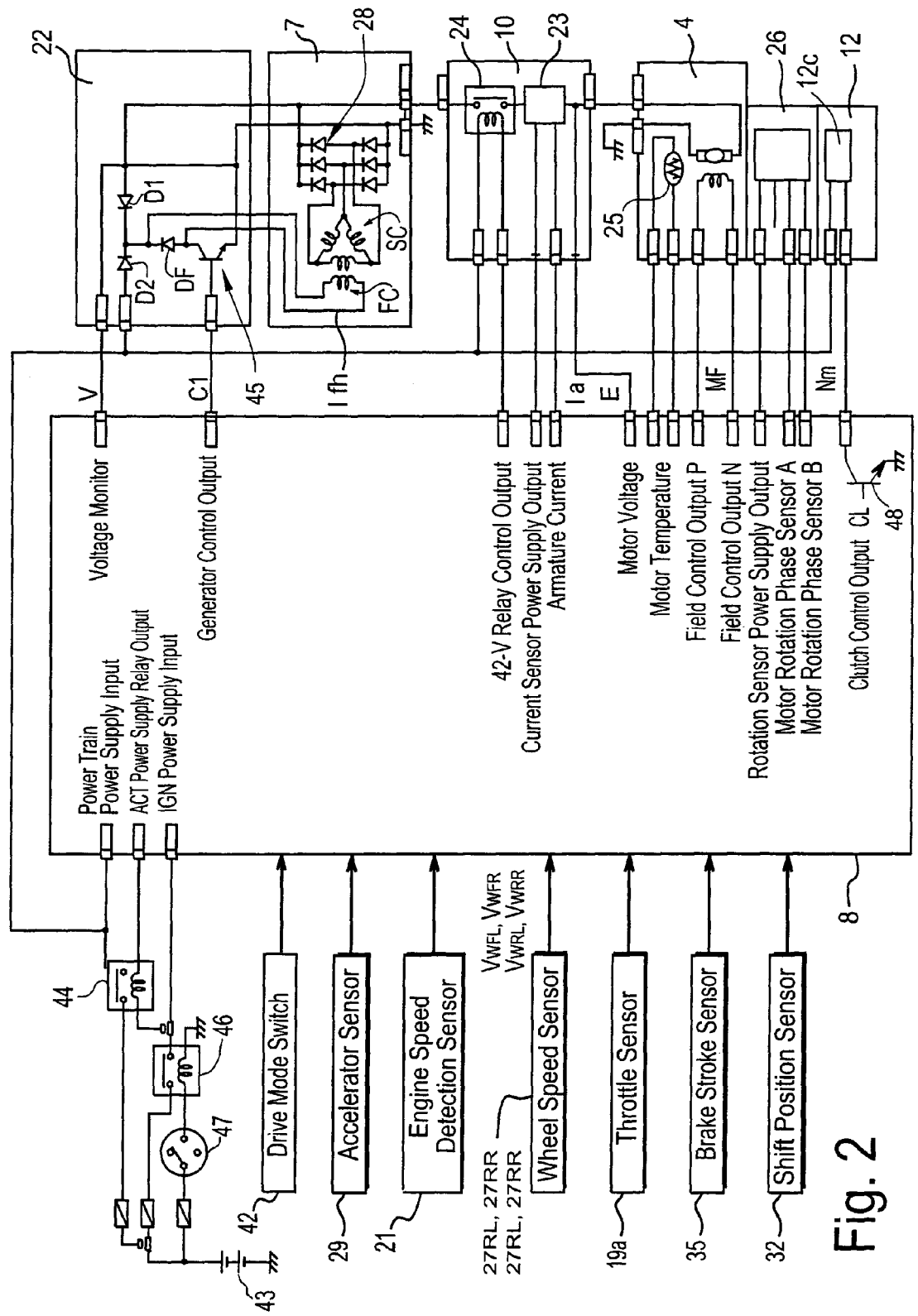
FIG. 2 is a block diagram showing a control system configuration for the vehicle driving force control apparatus illustrated in FIG. 1 in accordance with the illustrated embodiments of the present invention.

As shown in FIG. 2, the generator 7 is equipped with a voltage adjuster 22 (regulator) for adjusting the output voltage V. The 4WD controller 8 controls the generator load torque Th against the internal combustion engine 2 and the generated voltage V by adjusting the field current Ifh such as controlling a generator control command value C1 (duty ratio or field current value). The voltage adjuster 22 receives the generator control command value C1 (duty ratio or field current value) from the 4WD controller 8 and adjusts the field current Ifh of the generator 7 to a value corresponding to the generator control command value C1. The voltage adjuster 22 is also configured and arranged to detect the output voltage V of the generator 7 and then output the detected voltage value to the 4WD controller 8. Additionally, the rotational speed Nh of the generator 7 can be computed based on the rotational speed Ne of the internal combustion engine 2 and the pulley ratio of the endless drive belt 6.

A current sensor 23 is provided inside the junction box 10. The current sensor 23 detects the current value Ia of the electrical power supplied from the generator 7 to the electric motor 4 and outputs a detected armature current signal to the 4WD controller 8. The voltage value flowing through the electrical line 9 is detected by the 4WD controller 8 to produce a control signal indicative of the voltage across the electric motor 4. A relay 24 shuts off or connects the voltage (current) supplied to the electric motor 4 in accordance with a control command from the 4WD controller 8.

A control command from the 4WD controller 8 controls the field current Ifm of the electric motor 4. Thus, the adjustment of the field current Ifm by the 4WD controller 8 adjusts the drive torque Tm of the electric motor 4. A thermistor 25 measures the temperature of the electric motor 4 and produces a control signal indicative of the temperature of the electric motor 4 that is outputted to the 4WD controller 8.

The vehicle driving force control apparatus is also equipped with a motor rotational speed sensor 26 that detects the rotational speed Nm of the drive shaft of the electric motor 4. The motor rotational speed sensor 26 outputs a control signal indicative of the detected rotational speed of the electric motor 4 to the 4WD controller 8. The motor rotational speed sensor 26 constitutes an input shaft rotational speed detector or sensor of the clutch 12.

The clutch 12 is preferably an electromagnetic clutch that connects and disconnects in response to a clutch control command issued from the 4WD controller 8. Of course, a hydraulic clutch can be used for clutch 12 is certain situations to carry out the present invention. Thus, the clutch 12 transmits torque from the electric motor 4 to the rear wheels 3L and 3R at a torque transfer rate corresponding to the clutch control command from the 4WD controller 8.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value indicative of the rotational speed of the respective wheel 1L, 1R, 3L and 3R, respectively. The wheel speed sensors 27RL and 27RR constitute an output shaft rotational speed detector or sensor of the clutch 12.

As shown in FIG. 2, the generator 7 has a three-phase stator coil SC connected in a delta formation and a field coil FC. Each of the connection nodes of the stator coil SC is connected to a rectifying circuit 28 made up of diodes and the rectifying circuit 28 delivers a maximum DC voltage V of, for example, 42 V.

One end of the field coil FC is connected to the output side of the rectifying circuit 28 through a diode D1 and to a battery 43 of a prescribed voltage (e.g., 12 volts) through a diode D2 in the reverse direction and a 4WD or 12-volt relay 44. The other end of the field coil FC is connected to the cathode sides of the diodes D1 and D2 through a flywheel diode DF in the forward direction, and is grounded through a bipolar transistor 45.

The 12-volt battery 43 supplies operating electric power to the 4WD controller 8 with the 12-volt relay 44 that is installed in the 12-volt electric power supply line in order to connect and disconnect the power to the clutch 12, which is preferably an electromagnetic clutch.

The circuitry that supplies the field current Ifh through the rectifying circuit 28 and the diode D1 forms a self excited circuit and the circuitry that supplies the field current Ifh through the battery 43 and the diode D2 forms a separately excited circuit. The diodes D1 and D2 function as a select-high mechanism that selects the higher voltage between the voltage of the self excited circuit and the voltage of the separately excited circuit.

The 4WD or 12-volt relay 44 is configured such that one end of its relay coil is connected to the output side of an ignition relay 46 that is connected to the battery 43 through an ignition switch 47 and the other end of the relay coil connected to the 4WD controller 8.

The generator load torque Tg that the generator 7 imposes on the engine 2 and the generated voltage V are controlled by the 4WD controller 8 by adjusting the field current Ifh going through the field coil FC. The bipolar transistor 45 receives a pulse width modulated (PWM) generator control command (duty ratio or field current value) C1 from the 4WD controller 8 and adjusts the value of the field current Ifh of the generator 7 in accordance with the generator control command C1.

The motor relay 24 and the current sensor 23 are connected in series inside the junction box 10. The motor relay 24 connects and disconnects the electric power supplied to the electric motor 4 in accordance with a command from the 4WD controller 8. The current sensor 23 detects the armature current Ia supplied to the electric motor 4 from the generator 7 and outputs the detected armature current Ia to the 4WD controller 8. The motor voltage Vm of the electric motor 4 is detected at the 4WD controller 8.

As mentioned above, the field current Ifm of the electric motor 4 is controlled by a pulse width modulated field current control command, i.e., motor output torque command, from the 4WD controller 8 and the drive torque Tm is adjusted by adjusting the field current Ifm. The temperature of the electric motor 4 is detected by the thermistor 25 and the temperature detection value is fed to the 4WD controller 8. The rotational speed Nm of the output shaft of the electric motor 4 is detected by the motor rotational speed sensor 26 and the rotational speed Nm is also fed to the 4WD controller 8.

The electric clutch 12 has an excitation coil 12c having one end connected to the output side of the 4WD relay 44 and the other end connected to the 4WD controller 8. Inside of the 4WD controller 8, the other end of the excitation coil 12c is connected to ground via a switching transistor 48 that serves as a switching element. The current in the excitation coil 12c is controlled by a pulse width modulated clutch control command CL supplied to the base of the transistor 48. As a result, the torque transmitted to the rear wheels 3L and 3R (subordinate drive wheels) from the electric motor 4 is controlled.

Figure 3:
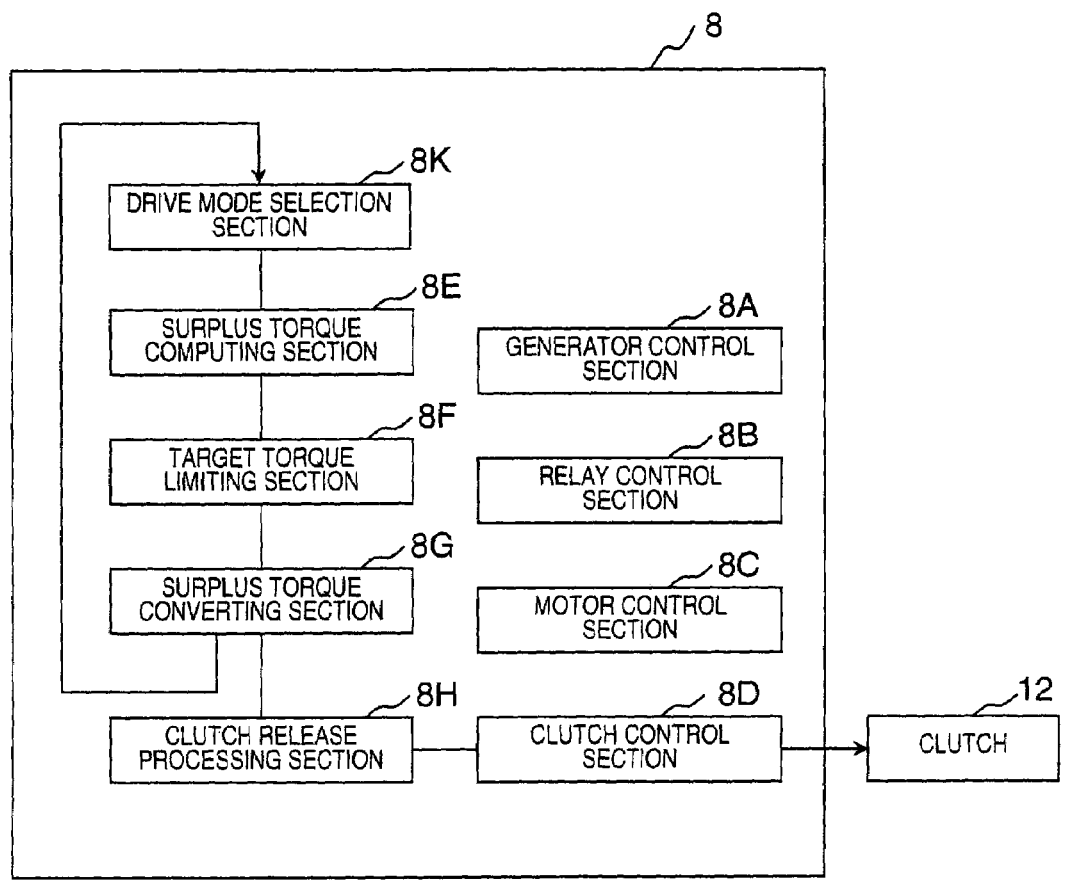
FIG. 3 is a block diagram showing the 4WD controller for the vehicle driving force control apparatus illustrated in FIG. 1 in accordance with the illustrated preferred embodiments of the present invention.

As shown in FIG. 3, the 4WD controller 8 is equipped with a generator control section 8A, a relay control section 8B, a motor control section 8C, a clutch control section 8D, a surplus torque computing section 8E, a target torque limiting section 8F, a surplus torque converting section 8G, a clutch release processing section 8H, and a drive mode selection section 8K. The clutch release processing section 8H constitutes or includes an output shaft stop estimating section, an input shaft stop estimating section, and a clutch connection command outputting section.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

Through the bipolar transistor 45 of the voltage adjuster 22, the generator control section 8A monitors the generated voltage V of the generator 7 and adjusts the generated voltage V of the generator 7 to the required voltage by adjusting the field current Ifh of the generator 7. Thus, the generator control section 8A includes a generation load torque adjusting section as discussed below. The relay control section 8B controls shutting off and connecting the electrical power supply from the generator 7 to the electric motor 4. The motor control section 8C adjusts the field current Ifm of the electric motor 4 in order to adjust the torque of the electric motor 4 to the required value. The clutch control section 8D controls the state of the clutch 12 by outputting a clutch control command to the clutch 12. The clutch control section 8D constitutes the clutch engagement control section of the present invention.

The vehicle driving force control apparatus is also equipped with a drive mode or 4WD switch 42 that allows the driver to manually select either a two-wheel (non-all wheel) drive mode or a four-wheel (multi-wheel) drive mode. The drive mode switch 42 is configured and arranged to output to the 4WD controller 8 a control signal that is indicative of the selected or designated drive mode to the 4WD controller 8. In other words, the drive mode switch 42 of the present invention constitutes the drive mode selection section 8K that is configured to select one of a multi-wheel drive mode and a non-all wheel drive mode. Thus, the 4WD controller 8 has a clutch connection command outputting section that is configured to output a clutch connection command 12 to connect the clutch 12 when the four-wheel drive mode has been designated. When the present invention is utilized in vehicles equipped with more than four wheels or without an all wheel drive mode, the multi-wheel drive mode refers to a mode in which at least one of (main) drive wheel driven by a first (main) drive source is driven and at least one second (subordinate) drive wheel driven by a second (subordinate) drive source with a clutch disposed between the second drive wheel and the second drive source is driven. In this situation, a non-all wheel drive mode refers to a mode in which at least the clutch disconnects the second (subordinate) drive source from the second (subordinate) wheel.

Figure 4:
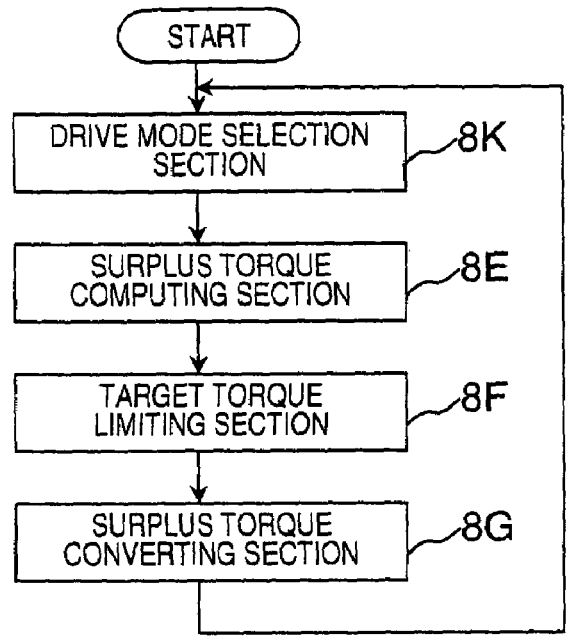
FIG. 4 is a flow chart showing the processing sequence executed by the 4WD controller for the vehicle driving force control apparatus illustrated in FIG. 1 in accordance with the illustrated embodiments of the present invention.

As shown in FIG. 4, at a prescribed sampling time cycle, the 4WD controller 8 executes the processing of the drive mode selection section 8K, the surplus torque computing section 8E, the target torque limiting section 8F, and the surplus torque converting section 8G in sequence based on the input signals. Together, the drive mode selection section 8K, the surplus torque computing section 8E, the target torque limiting section 8F, and the surplus torque converting section 8G constitute an output torque control section of the 4WD controller 8.

Figure 5:
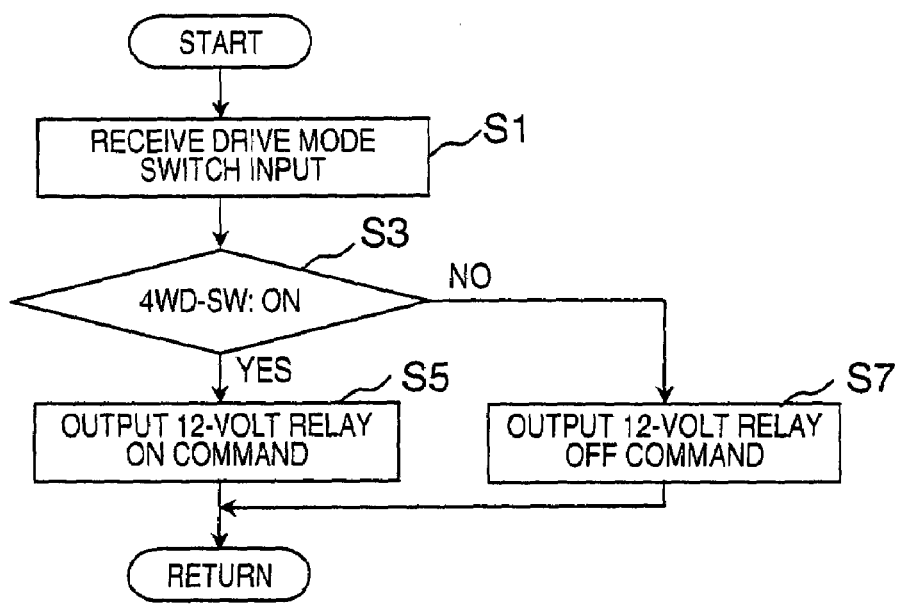
FIG. 5 is a flow chart showing the processing sequence executed by the drive mode selection section of the 4WD controller for the vehicle driving force control apparatus illustrated in FIG. 1 in accordance with the illustrated embodiments of the present invention.

First, the processing shown in FIG. 5 is executed by the drive mode selection section 8K. In step S1, mode information is received from the drive mode switch 42, while in step S3, the 4WD controller 8 determines if a four-wheel drive mode or a two-wheel drive mode has been selected. If the four-wheel drive mode has been selected, the 4WD controller 8 proceeds to step S5. If the two-wheel drive mode has been selected, the 4WD controller 8 proceeds to step S7.

In step S5, the 4WD controller 8 outputs a 12-volt relay ON command such that electric power is supplied to activate the clutch 12 and the 4WD controller 8 returns to the beginning of the control loop. Meanwhile, in step S7, the 4WD controller 8 outputs the 12-volt relay OFF command such that electric power is shut off to the clutch 12 and the 4WD controller 8 returns to the beginning of the control loop.

Next, the surplus torque computing section 8E will be discussed which executes the processing shown in FIG. 6. First, in step S10, the wheel speeds computed based on the signals from the wheel speed sensors 27FL, 27FR, 27RL and 27RR are used to subtract the wheel speed of the rear wheels 3L and 3R (subordinate drive wheels) from the wheel speed of the front wheels 1L and 1R (main drive wheels) and find the slippage speed $\Delta V_F$, which is the magnitude of the acceleration slippage of the front wheels 1L and 1R. Then, the 4WD controller 8 proceeds to step S20.

The slippage speed $\Delta V_F$ can be calculated as follows. The average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two Equations (1) and (2):

$$V_{Wf}=(V_{Wfl}+V_{Wfr})/2 \qquad (1)$$

$$V_{Wr}=(V_{Wrl}+V_{Wrr})/2 \qquad (2)$$

Now, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, as set forth in the following Equation (3):

$$\Delta V_F = V_{Wf} - V_{Wr} \qquad (3)$$

In step S20, the 4WD controller 8 determines whether or not the calculated slippage speed $\Delta V_F$ exceeds a prescribed value, such as zero. Thus, steps S10 and S20 constitute an acceleration slippage detection section that estimates if acceleration slippage is occurring in the front wheels 1L and 1R that is driven by the internal combustion engine 2. If slippage speed $\Delta V_F$ is determined to be zero or below, it is estimated that the front wheels 1L and 1R are not experiencing acceleration slippage and the 4WD controller 8 proceeds to step S30, where a target generator load torque Th is set to zero and the 4WD controller 8 returns to the beginning of the control loop.

Conversely, if in step S20 slippage speed $\Delta V_F$ is determined to be larger than zero, it is estimated that the front wheels 1L and 1R are experiencing acceleration slippage, and thus, control proceeds to step S40. In step S40, the absorption torque $T\Delta V_F$ required for suppressing the acceleration slippage of the front wheels 1L and 1R is calculated using the Equation (4) below and the 4WD controller 8 proceeds to step S50. The absorption torque $T\Delta V_F$ is an amount that is proportional to the acceleration slippage magnitude, as set forth in the following Equation (4):

$$T\Delta V_F = K1 \times \Delta V_F \qquad (4)$$

where: K1 is a gain that is found through experimentation or the like.

In step S50, a current load torque TG of the generator 7 is calculated based on the Equation (5) below, and then the 4WD controller 8 proceeds to step S60.

$$TG = K2 \frac{V \times Ia}{K3 \times Nh} \qquad (5)$$

where:
V: voltage of the generator 7,
Ia: armature current of the generator 7,
Nh: rotational speed of the generator 7,
K3: efficiency, and
K2: coefficient.

In step S60, the surplus torque, i.e., the target generator load torque Th that the generator 7 should impose, is found based on the Equation (6) stated below, and the 4WD controller 8 returns to the beginning of the control loop.

$$Th = TG + T\Delta V_F \qquad (6)$$

Next, the processing executed by the target torque (control) limiting section 8F will be explained based on FIG. 7. The processing of the target generator load torque Th in the flow chart of FIG. 7 constitutes a generator control section configured to control a generation load torque of the generator 7 to substantially correspond to an acceleration slippage magnitude of the drive wheel, when the acceleration slippage detection section estimates acceleration slippage occurring in the drive wheel.

First, in step S10, the target torque limiting section 8F of the 4WD controller 8 determines whether or not the target generator load torque Th is larger than the maximum load capacity HQ of the generator 7. The 4WD controller 8 proceeds to the beginning of the control program to repeat the processing if the 4WD controller 8 determines that target generator load torque Th is less than or equal to the maximum load capacity HQ of the generator 7. Conversely, the 4WD controller 8 proceeds to step S120 if the 4WD controller 8 determines that the target generator load torque Th is larger than the maximum load capacity HQ of the generator 7.

In step S120, the excess torque ΔTb, which is the portion of target generation load torque Th that exceeds the maximum load capacity HQ, is found according to the following Equation (7):

$$\Delta Tb = Th - HQ. \qquad (7)$$

Then, the 4WD controller 8 proceeds to step S130.

In step S130, the current engine torque Te is computed based on the signals from the throttle sensor 19a and the engine rotational speed sensor 21 using an engine torque calculation map. Then, the 4WD controller 8 proceeds to step S140.

In step S140, the engine torque upper limit value TeM is calculated by subtracting the excess torque ΔTb from the engine torque Te, as set forth in the following Equation (8):

$$TeM = Te - \Delta Tb. \qquad (8)$$

After the engine torque upper limit value TeM is outputted to the engine controller 18, the 4WD controller 8 proceeds to step S150.

In step S150, the maximum load capacity HQ is assigned as the target generation load torque Th, and then the 4WD controller 8 returns to the beginning of the control loop.

Next, the processing executed by the surplus torque converting section 8G will be explained based on FIG. 8.

First, in step S200, the 4WD controller 8 determines if the target generator load torque Th is larger than 0. If the target generator load torque Th is determined to be larger than 0, then the program of the 4WD controller 8 proceeds to step S210 because the front wheels 1L and 1R are experiencing acceleration slippage. If the 4WD controller 8 determines that the target generator load torque Th is less than or equal to 0, then the 4WD controller 8 returns to the beginning of the control loop because the front wheels 1L and 1R are not experiencing acceleration slippage.

In step S210, the 4WD controller 8 determines whether a transition is being made from a four-wheel drive state to a two-wheel drive state. The 4WD controller 8 proceeds to step S230 if a transition to two wheels is being made and to step S220 for regular processing if no transition to two wheels is being made.

In the present embodiment, the 4WD controller 8 determines that a transition is made to a two-wheel drive state, in which the clutch 12 should be released, if the target motor torque Tm is decreasing and the target motor torque Tm is at or below a prescribed threshold torque T−TM1.

Whether the target motor torque Tm, which is the torque command value for the electric motor 4, is decreasing may also be determined merely by comparing the target motor torque with a preceding value. In other words, it is acceptable to determine if the target motor torque is decreasing by simply comparing the current target motor torque with the target motor torque from the previous processing cycle using Equation (9) below:

$$Tm(n-1) - Tm(n-2) < 0 \qquad (9)$$

In Equation (9), the subscript (n−1) indicates that the target motor torque is from one processing cycle previous and the subscript (n−2) indicates that the target motor torque is from two processing cycles previous. However, in order to suppress the effects of noise or the like, it is also acceptable to determine if the target motor torque is decreasing based on target motor torque values from three or more previous cycles (for example, the Equation (10) shown below uses values from six processing cycles). It is also acceptable to determine that the target motor torque is decreasing when the target motor torque decreases continuously over a plurality of processing cycles using the Equation (10) below:

$$[Tm(n-1) + Tm(n-2) + Tm(n-3)] - [Tm(n-4) + Tm(n-5) + Tm(n-6)] < 0 \qquad (10)$$

In step S220, the rotational speed Nm of the electric motor 4 detected by motor rotational speed sensor 26 is received as input. The target motor field current Ifmt corresponding to the rotational speed Nm of the electric motor 4 is calculated and the target motor field current Ifmt is outputted to the motor control section 8C. Then, the 4WD controller 8 proceeds to step S280.

The target motor field current Ifmt corresponding to the rotational speed Nm of the electric motor 4 is held to a fixed prescribed current value when rotational speed Nm is below a prescribed rotational speed and the field current Ifm of the electric motor 4 is reduced by a known weak magnetic field control method when the electric motor 4 is rotating above a prescribed rotational speed. In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm(n) is obtained by reducing the field current Ifm of the electric motor 4 and lowering the required motor induced voltage E. As a result, even if the electric motor 4 rotates at a high speed, the required motor torque Tm(n) can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

It is also acceptable to provide a motor torque correcting section that continuously corrects the required motor torque Tm(n) by adjusting the field current Ifm in accordance with the rotational speed Nm of the electric motor 4. That is, instead of switching between two stages, the field current Ifm of the electric motor 4 can be adjusted in accordance with the motor rotational speed Nm. As a result, even if the electric motor 4 rotates at a high speed, the required motor torque Tm(n) can be obtained because the motor induced voltage E of the electric motor 4 is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

Meanwhile, if the 4WD controller 8 determines that a transition is being made to a clutch-releasing two-wheel drive, then the program proceeds to step S230. In step S230, the 4WD controller 8 determines whether the target motor field current Ifm is greater than a prescribed (end-time) field current limit value D-Ifm, which is a prescribed limiting field current value. If so, the 4WD controller 8 proceeds to step S240. If the field current Ifm is less than or equal to the prescribed field current limit value (D-Ifm), the 4WD controller 8 proceeds to step S235 where it keeps the field current Ifm at the prescribed field current limit value (D-Ifm). The 4WD controller 8 then proceeds to step S270.

Here, the prescribed (end-time) field current limit value D-Ifm is the minimum field current value at which the electric motor 4 is capable of generating very small torque. Setting the limit value to such a small value serves to curb power consumption during two-wheel drive operation. Needless to say, it is acceptable for the prescribed field current limit value (D-Ifm) to be larger than the minimum field current value at which the electric motor 4 is capable of generating very small torque. In other words, it will be apparent to those skilled in the art from this disclosure that the end-time field current value D-Ifm may also be greater than the minimum field current value at which the electric motor 4 can generate a minute torque.

In step S240, the 4WD controller 8 determines if the accelerator position (ACC) or the corresponding throttle opening is less than 4% based on the signal from the accelerator sensor 29 or a corresponding throttle opening sensor. If the accelerator position or the corresponding throttle opening is less than 4%, the 4WD controller 8 proceeds to step S250. Otherwise, the 4WD controller 8 proceeds to step S260.

An accelerator position or the corresponding throttle opening (detected accelerator position opening degree) of less than 4% indicates that the accelerator pedal 17 is not being depressed at all or is not being depressed enough (i.e., the acceleration instruction amount is not large enough) to affect the acceleration of the vehicle. In other words, the phrase "the accelerator position opening degree is less than 4%" refers to an acceleration indicating amount sufficient to exclude the effect of the vehicle on the acceleration irrespective of whether the accelerator pedal 17 is depressed or in a state in which it is not depressed.

In step S250, the 4WD controller 8 reduces the field current by the amount of a first reduction value Dif1 and outputs the new field current Ifm to the motor control section 8C before proceeding to step S270.

Meanwhile, in step S260, the 4WD controller 8 reduces the field current by the amount of a second reduction value Dif2 and outputs the new field current Ifm to the motor control section 8C before proceeding to step S270.

The second reduction value Dif2 is set to a smaller value than the first reduction value Dif1. As a result, the decrease or change rate at which the field current value is reduced toward the prescribed field current limit value (D-Ifm) is larger when the accelerator position is less than 4% so that the prescribed field current limit value (D-Ifm) can be reached sooner.

Although in the preceding explanation, the reduction value by which the field current Ifm is reduced is set to one of two different values based on whether or not the accelerator pedal is depressed in an effectual way (i.e., whether or not there is an effectual acceleration instruction), it is also acceptable to set the reduction value of the field current Ifm to one of three or more different values or to vary the reduction value in a continuous manner in accordance with the acceleration instruction amount.

In addition, determining whether the accelerator position opening degree is less than 4% makes it possible to also estimate the reduction in the generation capacity. Thus, the program proceeds to step S250 if the 4WD controller 8 determines in step S240 on the basis of the rotational speed of the internal combustion engine 2, the rotational speed of the generator 7, or the like that the generation capacity is decreasing or there is a risk of such a decrease, and the program proceeds to step S260 if no such determination is made.

In step S270, the induced voltage E of the electric motor 4 is calculated based on the target motor field current Ifmt and the rotational speed Nm of the electric motor 4. Then, the 4WD controller 8 proceeds to step S280.

In step S280, the 4WD controller 8 determines whether a transition is being made from a four-wheel drive state to a two-wheel drive state. If a transition to a two-wheel drive state is being made, then the 4WD controller 8 proceeds to step S300. If this is not the case, then the 4WD controller 8 proceeds to step S290.

In step S300, the 4WD controller 8 executes the clutch release processing section 8H and then proceeds to step S310.

Determining whether a transition from a four-wheel drive state to a two-wheel drive state is made should be done in the same manner as in step S210 above. It is also possible to set up a flag for indicating whether a transition to a two-wheel drive state is made in step S210, and to perform the determination based on this arrangement.

In step S290, the 4WD controller 8 uses a map or the like to calculate the corresponding target motor torque Tm(n)

based on the generator load torque Th computed by the surplus torque computing section 8E and then the program proceeds to step S310.

Meanwhile, the program proceeds to step S310 after the clutch release processing section 8H is executed in step S300.

The clutch release processing section 8H constitutes a clutch releasing section of the 4WD controller 8. In the clutch release processing section 8H, the clutch release command is issued when it is determined that the current target motor torque Tm(n) is approximately equal to the clutch disconnection torque, i.e., when the Equation (11) below is satisfied.

$$Tf-\alpha \leq Tm(n) \leq Tf+\alpha \qquad (11)$$

where: α is the tolerance value.

The clutch disconnection or release torque Tf is the torque of the electric motor 4 at the moment when the clutch 12 is to be released and the acceleration of the clutch input shaft 12a and the acceleration of the clutch output shaft 12b are approximately equal, i.e., when the torque at the clutch 4 is approximately zero. It is preferred to correct the clutch disconnection torque Tf by an appropriate amount to compensate for the response delay of the clutch operation.

The clutch disconnection torque Tf is calculated using a map and computations based on such factors as the vehicle acceleration and the friction in the torque transmission path to the rear wheels, or is a value determined experimentally, and serves as the motor torque value required to achieve zero torque at the clutch 12 in accordance with the traveling state of the vehicle. The clutch disconnection torque Tf corresponds to the sum of the torque due to friction of the electric motor 4 and the reduction gear 11 and the torque required to accelerate the electric motor 4 and the reduction gear 11 at the same acceleration rate as the rear wheels 3L and 3R, but comprises only the torque due to friction of the electric motor 4 and the reduction gear 11 when during normal travel. It is also acceptable for the clutch disconnection torque Tf to be a fixed value determined experimentally.

In step S310, the 4WD controller 8 uses the target motor torque Tm(n) of the current cycle and the target motor field current Ifmt as variables to calculate the corresponding target armature current Ia and then the program proceeds to step S320.

In step S320, the 4WD controller 8 computes the duty ratio C1, which serves as the generator control command value, based on the target armature current Ia and outputs the same before returning to the beginning of the control loop.

Figure 9:
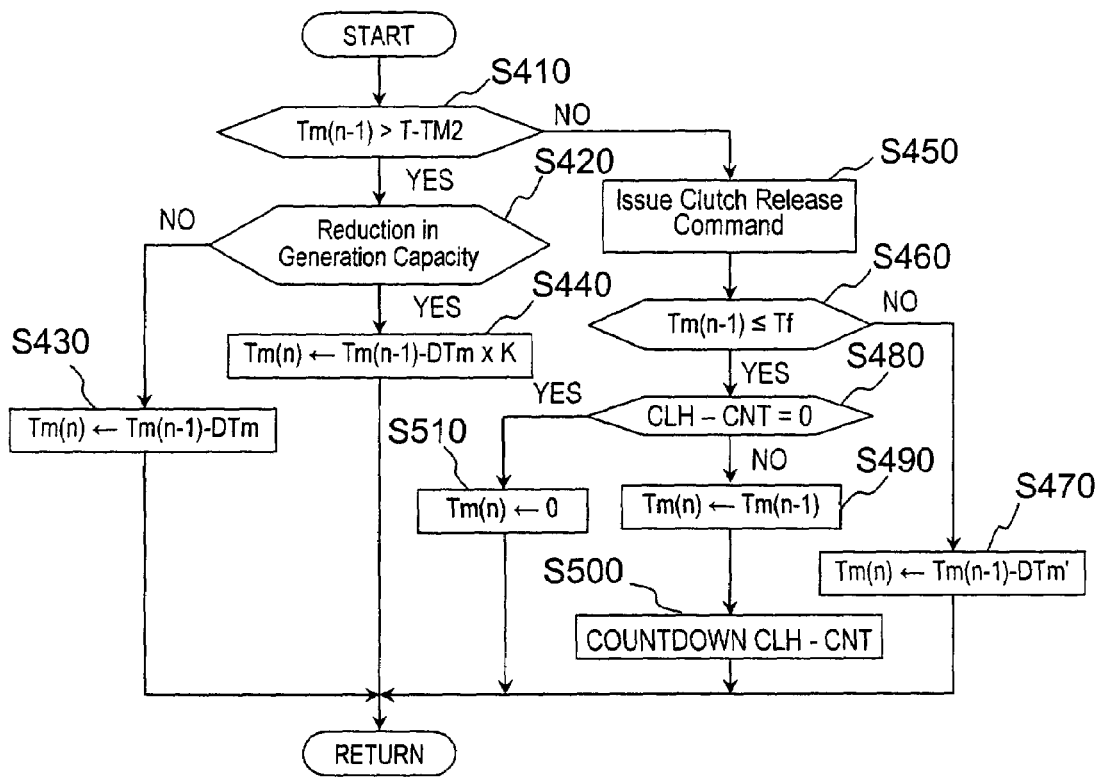
FIG. 9 is a flow chart showing the processing executed by the clutch release processing section in accordance with the first embodiment based on the present invention.

The clutch release processing section 8H will now be described with reference to FIG. 9. The clutch release processing section 8H starts up when it is time for the vehicle to shift from the four-wheel drive state to the two-wheel drive state. In step S401, the 4WD controller 8 first determined whether the target motor torque Tm(n−1) is greater than the clutch command output torque T−TM2 at which a clutch release command should be outputted. The 4WD controller 8 proceeds to step S420 if it is determined that the torque is greater than the clutch command output torque T−TM2, and the 4WD controller 8 proceeds to step S450 if it is determined that the torque is equal to or less than the clutch command output torque T−TM2.

Here, the clutch command output torque T−TM2 is a torque value that is greater than the clutch release torque Tf, which is the motor torque at which the clutch 12 is released, but is still in the vicinity of the clutch release torque Tf. The maximum differential between the clutch command output torque T−TM2 and the clutch release torque Tf is determined from the following conditions. Specifically, the value of the clutch command output torque T−TM2 is determined so as to satisfy conditions in which the time from the moment the motor torque becomes the clutch command output torque T−TM2 until the moment the motor torque becomes the clutch release torque Tf is less than the clutch response delay time from the moment the clutch release command is outputted until the moment the clutch 12 is actually released when control is performed such that the motor torque becomes the clutch release torque Tf, as described below.

In addition, the clutch release torque Tf is a value determined by experimentation or calculated by computation or mapping in accordance with the vehicle acceleration, the friction in the torque transfer path on the side of the electric motor, or the like. The clutch release torque Tf is the motor torque value needed to bring the torque on the clutch 12 to zero during vehicle travel. The clutch release torque Tf is estimated to be the sum (Tf=$Tf_1$+$Tf_2$) of "the torque $Tf_1$ for the friction of the electric motor and the reduction gear" and "the torque $Tf_2$ for accelerating the electric motor and the reduction gear equally with the acceleration of the rear wheels."

In the present embodiment, it is assumed that the contribution from "the torque $Tf_1$ for the friction of the electric motor and the reduction gear" is greater than the contribution from "the torque $Tf_2$ for accelerating the electric motor and the reduction gear equally with the acceleration of the rear wheels," and the clutch release torque Tf is set to a fixed value that corresponds to "the torque $Tf_1$ for the friction of the electric motor and the reduction gear," which is determined by experimentation or the like.

In step S420, the 4WD controller 8 determines whether the generation capacity of the generator 7 decreases to a state in which the power generation that corresponds to the target motor torque Tm, which is a target torque command value, cannot be provided or is in danger of not being provided. The 4WD controller 8 proceeds to step S440 if it is determined that there is a decrease in the generation capacity, and to step S430 if this is not the case.

According to the aforementioned determination, a state is established in which the power generation that corresponds to the target torque command value cannot be provided or is in danger of not being provided if, for example, the gear position of the transmission 30 shifts up into second or higher gear on the basis of a signal from the shift position detection device 32.

In step S430, a setting is established such that the motor torque decreases at the normal torque decrease rate DTm on the basis of the Equation (12) shown below, and the program returns to the beginning.

$$Tm(n)=Tm(n-1)-DTm \qquad (12)$$

In step S440, the normal torque decrease rate Dtm is multiplied by a gain K greater than 1 (for example, 2) to keep the decrease rate low on the basis of the Equation (13) shown below when the torque rapidly decreases, and the 4WD controller 8 returns to the beginning.

$$Tm(n)=Tm(n-1)-DTm \times K \qquad (13)$$

Although the decrease rate is multiplied by a gain K greater than 1 to limit the target torque command value, it is also possible to subtract a specific preset decrease rate.

If it is concluded in the determination of step S410 that the target motor torque is equal to or less than the clutch command output torque T−TM2, the 4WD controller 8 proceeds to step S450, the clutch release command is outputted through the clutch control section 8D, and the program proceeds to step S460. Here, the clutch 12 is actually released once the clutch release command has been outputted and the operating delay of the clutch 12 has elapsed. In other words, there is a clutch response delay time that elapses between the time when the clutch release command is issued and the time when the clutch 12 is actually released. This clutch response delay time is ascertained in advance.

In step S460, the 4WD controller 8 determines whether the target motor torque Tm(n−1) is equal to or less than the clutch release torque Tf at which the acceleration on the clutch output side is in substantial equal to the acceleration on the clutch input side the moment the clutch 12 is released, i.e., at which the torque on the clutch 12 is substantially zero. The 4WD controller 8 proceeds to step S480 and the target motor torque Tm(n) is kept at the clutch release torque Tf, if it is determined that the torque is equal to or less than the target motor torque Tm(n). If, on the other hand, the target motor torque Tm(n−1) is greater than the clutch release torque Tf, the current target motor torque Tm(n) is reduced at a decrease rate DTm′ in relation to the preceding value on the basis of the Equation (14) shown below, and then the 4WD controller 8 proceeds to the beginning.

$$Tm(n)=Tm(n-1)-DTm' \qquad (14)$$

The current target motor torque Tm(n) is thereby gradually reduced until it reaches the clutch release torque Tf.

In the Equation (14) above, the value of the decrease rate DTm′ is preferably established, for example, below the decrease rate Dtm so as to suppress the actual variation range of the motor torque.

It is determined in step S480 whether a torque holding time counter CLH–CNT is zero, zero is substituted for the target motor torque Tm(n) in step S510 in order to no longer keep the motor torque constant if it is determined that the torque holding time counter CLH–CNT is zero, and the 4WD controller 8 then proceeds to the beginning.

If, on the other hand, the torque holding time counter CLH–CNT is greater than zero, the preceding value is substituted for the current value in order to keep the target motor torque Tm(n) at the constant clutch release torque Tf, as in the Equation (15) shown below, and the 4WD controller 8 proceeds to step S500.

$$Tm(n)=Tm(n-1) \qquad (15)$$

Here, the torque holding time counter CLH–CNT is reset in the four-wheel drive state. The value that is set as the initial value for the torque holding time counter CLH–CNT is one at which the clutch 12 is reliably released when the variation component of the clutch response delay has been absorbed and the motor torque value brought to a constant level.

In step S500, the program is completed and returned to the beginning after the torque holding time counter CLH–CNT has been counted down.

Here, the clutch release processing section 8H constitutes a clutch release control command section or device, and steps S410 and S450 constitute a clutch release section or device. The clutch release control command section can also be referred to as a clutch-release torque control section.

Next, the processing executed by the engine controller 18 will be described with reference to FIG. 10. In accordance with a prescribed sampling time cycle, the engine controller 18 executes the processing show in FIG. 10 based on the input signals.

In step S610, the engine controller 18 computes the target output torque TeN requested by the driver based on the detection signal from the accelerator sensor 29 and then proceeds to step S620.

In step S620, the engine controller 18 determines if the output torque upper limit TeM has been received from the 4WD controller 8. If it is determined that the output torque limit has been received, the engine controller 18 proceeds to step S630. Otherwise, the engine controller 18 proceeds to step S670.

In step S630, the engine controller 18 determines if the output torque upper limit TeM is larger than the target output torque TeN. If the output torque upper limit TeM is larger, the engine controller 18 proceeds to step S640. Meanwhile, if the output torque upper limit TeM is smaller than or equal to the target output torque TeN, the engine controller 18 proceeds to step S670.

In step S640, the engine controller 18 assigns the value of the output torque upper limit TeM to as the target output torque TeN, thereby increasing the target output torque TeN, and the program then proceeds to step S670.

In step S670, the engine controller 18 calculates the current output torque Te based on the throttle opening degree, the engine rotational speed, etc., and then the program proceeds to step S680.

In step S680, the engine controller 18 calculates the deviation ΔTe′ of the target output torque TeN from the current output torque Te using the Equation (16) shown below and then proceeds to step S690.

$$\Delta Te'=TeN-Te \qquad (16)$$

In step S690, the engine controller 18 calculates a change Δθ in the throttle opening degree θ in accordance with the deviation ΔTe′ and outputs a throttle opening degree signal corresponding to the throttle opening degree change amount Δθ to the stepper motor 19. Then, the program of the engine controller 18 returns to the beginning of the control loop.

Now the operation of an apparatus constituted as described heretofore will be described. The following explanation assumes the designated drive mode is set to the four-wheel drive mode. The clutch 12 is not connected when the designated drive mode is set to the two-wheel drive mode.

When the torque transferred from the internal combustion engine 2 to the front wheels 1L and 1R is larger than the road surface reaction force limit torque, i.e., when acceleration slippage occurs in the front wheels 1L and 1R, which are the main drive wheels 1L and 1R, due to the road surface friction coefficient μ being small, or the driver depressing the accelerator pedal 17 too deeply, or the like, the clutch 12 is connected, a transition to a four-wheel drive state is made by having the generator 7 generate at a generator load torque Th corresponding to the magnitude of the acceleration slippage thereof, and a transition to a two-wheel drive state is subsequently made by adjusting the drive torque transferred to the front wheels 1L and 1R so as to approach the road surface reaction force limit torque of the front wheels 1L and 1R. This results in suppression of the acceleration slippage of the front wheels 1L and 1R, which are the main drive wheels.

Furthermore, the acceleration performance of the vehicle is improved because the surplus electric power generated by the generator 7 is used to drive the electric motor 4, which drives the rear wheels 3L and 3R (which are the subordinate drive wheels).

At this time, the energy efficiency is increased and fuel consumption improved because the electric motor 4 is driven by a surplus torque that has exceeded the road surface reaction force limit torque of the main drive wheels 1L and 1R.

Here, if the rear wheels 3L and 3R were always driven, several energy conversions (mechanical energy→electrical energy→mechanical energy) take place, creating energy losses that are proportional to the conversion efficiencies. Therefore, the acceleration performance of the vehicle would decline in comparison with a case where only the front wheels 1L and 1R were driven. Consequently, it is generally desired that driving of the rear wheels 3L and 3R be suppressed. By contrast, this embodiment takes into consideration the fact that when traveling on a slippery road surface or the like, even if all of the output torque Te of the internal combustion engine 2 is transferred to the front wheels 1L and 1R, not all of the torque will be used as driving force. The driving force that cannot be utilized efficiently by the front wheels 1L and 1R is outputted to the rear wheels 3L and 3R, and the acceleration performance is improved.

In addition, the clutch 12 is connected to establish a four-wheel drive state and, with the subsequent suppression of the acceleration slippage, the motor torque is continuously reduced and a transition to a two-wheel drive state made.

Figure 11:
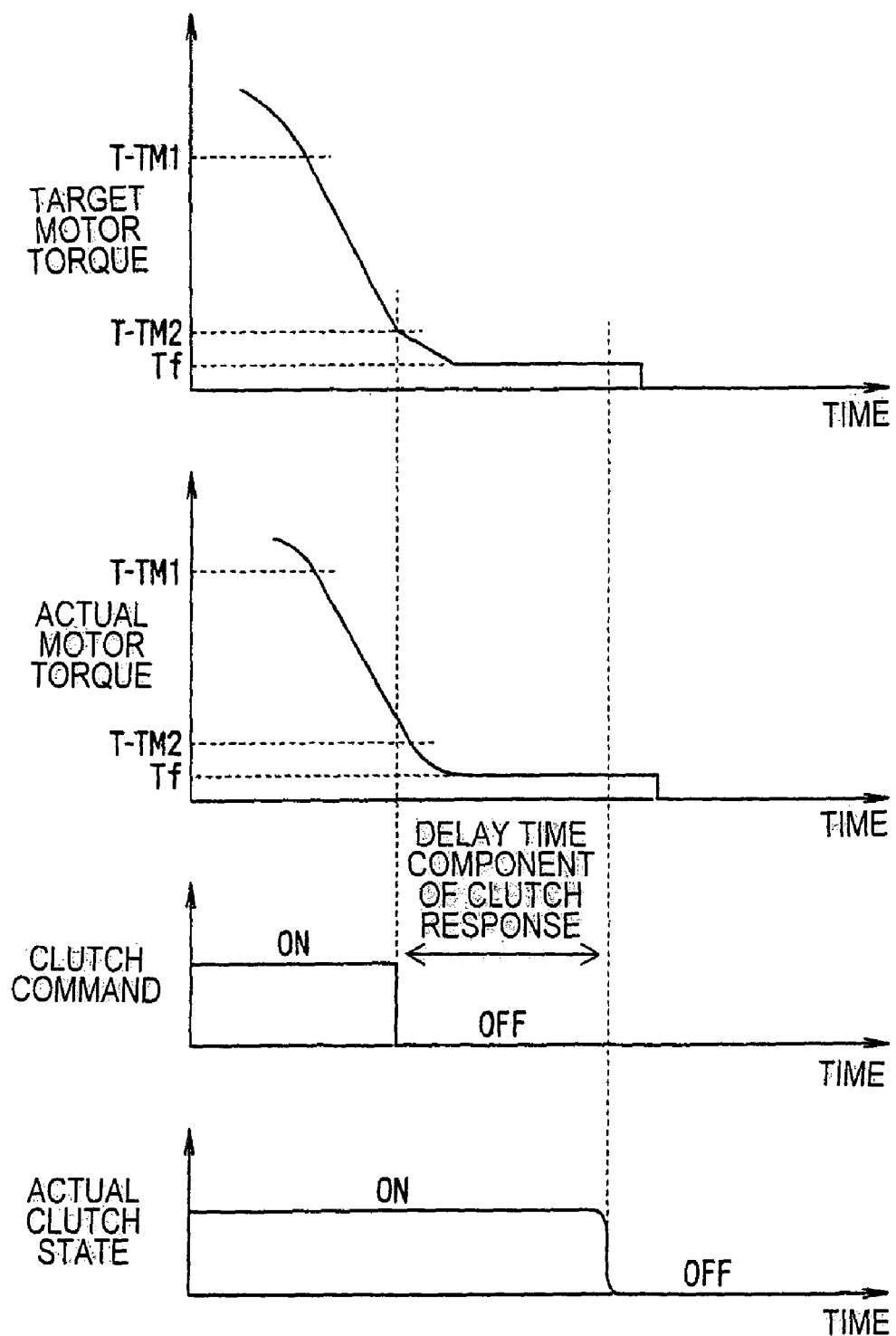
FIG. 11 is a diagram showing exemplary time charts for the clutch release in accordance with the first embodiment based on the present invention.

If at this time the target motor torque Tm(n) is equal to or less than a prescribed threshold T–TM1, the reduction rate, i.e., the decrease rate of the motor torque is kept constant at Dtm to allow the torque to decrease at a prescribed gradient during the transition to a two-wheel drive state, and if the target motor torque Tm(n) reaches a clutch command output torque T–TM2 that is slightly greater than the clutch release torque Tf, a clutch release command is outputted and the clutch 12 is released in a state in which the response delay component of the clutch 12 has elapsed and the actual motor torque is kept constant at roughly the clutch release torque Tf, as shown in FIG. 11. Specifically, it is possible to prevent a shock from being generated during clutch release because the clutch 12 is released in a state in which the torque on the clutch 12 is substantially zero during vehicle travel.

In addition, generation of shocks during clutch release can be reliably prevented as a result of the fact that the motor torque value during the actual clutch release can be kept substantially at the clutch release torque Tf, even when the response delay time of the clutch 12 fluctuates somewhat due to temperature and other factors, by adopting an approach in which the actual motor torque values before and after the clutch 12 is actually released are kept at a constant torque substantially equal to the clutch release torque Tf.

When the target motor torque approaches the clutch release torque Tf, the target motor torque is gradually reduced; for example, the decrease rate DTm' of the motor torque is limited to a low value that can be followed in terms of the control performance of the motor drive control, whereby the actual motor torque converges to the desired clutch release torque Tf at an earlier stage without any hunting, thereby making it possible to keep the motor torque during clutch release in a stable manner at substantially the same value as the clutch release torque Tf.

When the generation capacity of the generator 7 has decreased, situations in which the target motor torque and the actual motor torque differ from each other and the motor torque decreases rapidly are prevented by a process in which the target motor torque is controlled to a level at or below the maximum value of the motor torque resulting from the generation deficiency, by increasing the decrease rate at which the torque decreases from the prescribed threshold torque T–TM1 to the clutch command output torque T–TM2.

In the embodiment described above, the clutch release torque Tf is kept constant at "the torque $Tf_1$ for the friction of the electric motor and the reduction gear," which is a value maintained during steady-state travel (at zero acceleration), but this option is non-limiting. It is also possible to perform a correction based on the acceleration (negative acceleration in the case of deceleration) of the rear wheels or the vehicle body. In this case, the clutch command output torque T–TM2 may also be varied in accordance with the correction of the clutch release torque Tf, or may be used as a value that takes into account the variation component based on this correction.

The present embodiment was described above with reference to a case in which the electric motor 4 was driven by a voltage generated by the generator 7, and a four-wheel drive was configured, but this option is non-limiting. This embodiment is also applicable to a system comprising a battery capable of supplying electrical power to the electric motor 4. In this case, minute amounts of electrical power may be supplied from the battery, or the battery supply may be combined with the supply of electrical power from the generator 7.

In the above-described embodiment, an internal combustion engine was cited as an example of the main drive source, but the main drive source may also comprise an electric motor.

Also, the above system was described with reference to a case in which the transition to a four-wheel drive state was performed in accordance with the acceleration slippage of the front wheels, but it is also possible to use a system in which the transition to a four-wheel drive state is performed in accordance with the accelerator position opening degree or the like.

Second Embodiment

Figure 12:
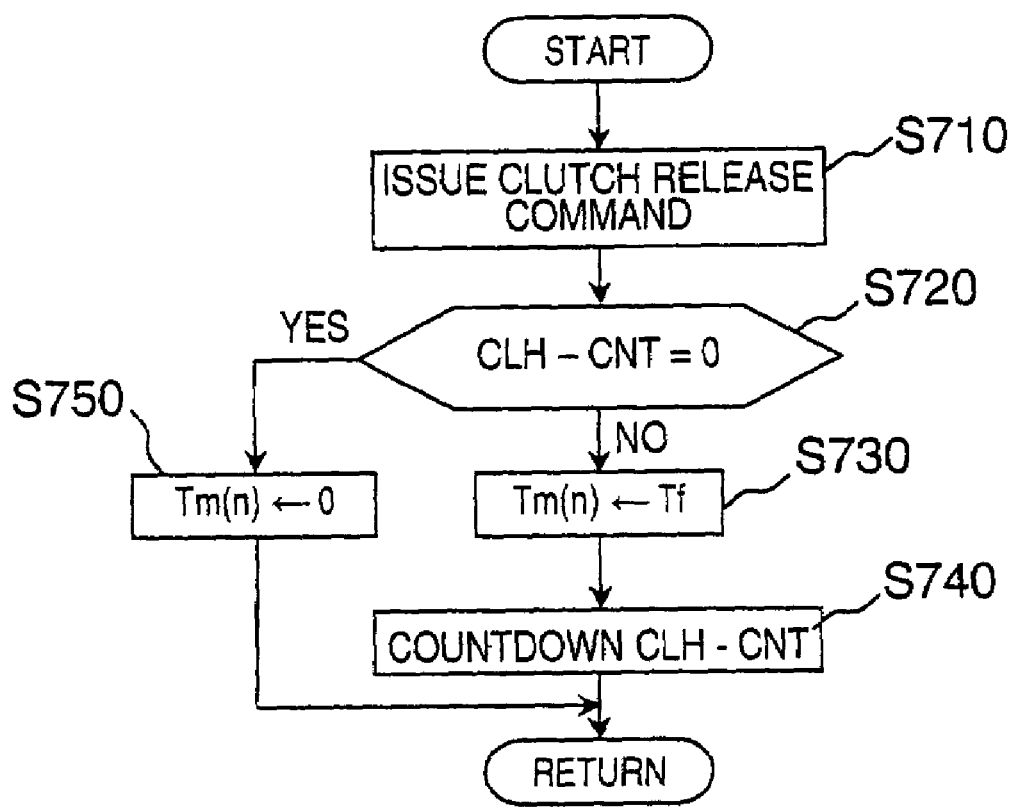
FIG. 12 is a flow chart showing processing executed by the clutch release processing section in accordance with a second embodiment based on the present invention.
Figure 13:
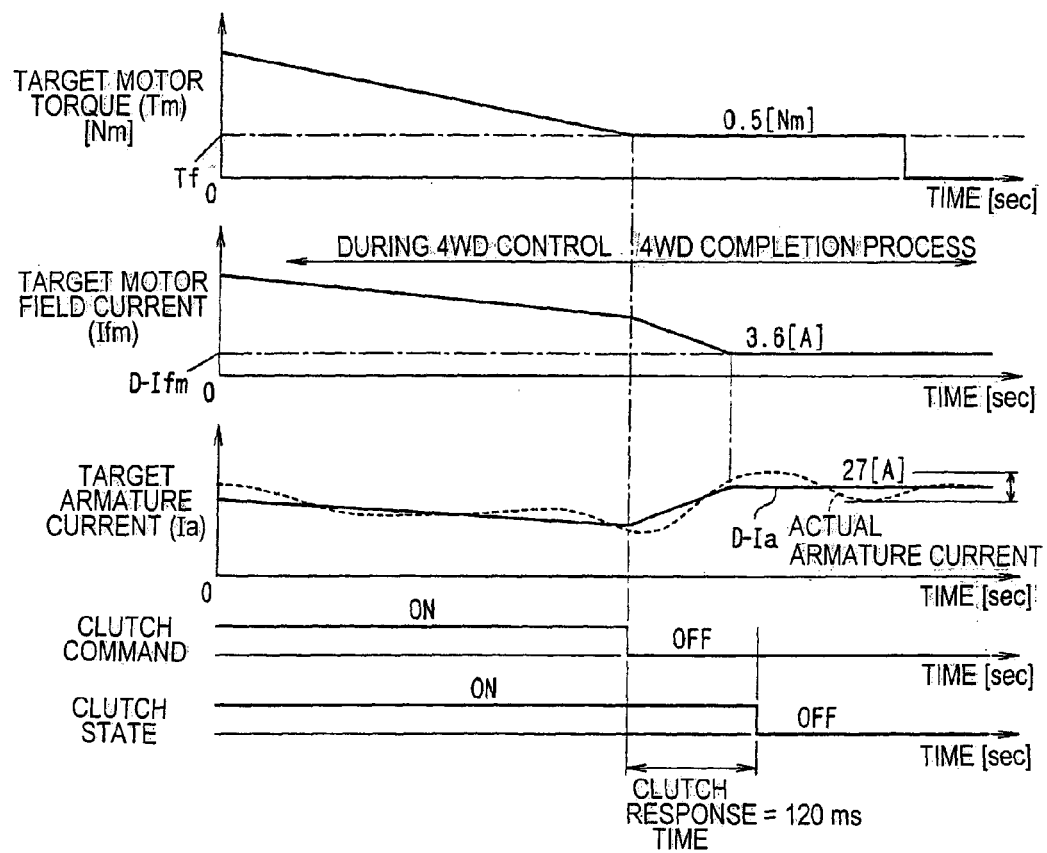
FIG. 13 is a diagram showing exemplary time charts for the clutch release in accordance with the second embodiment based on the present invention.
Figure 14:
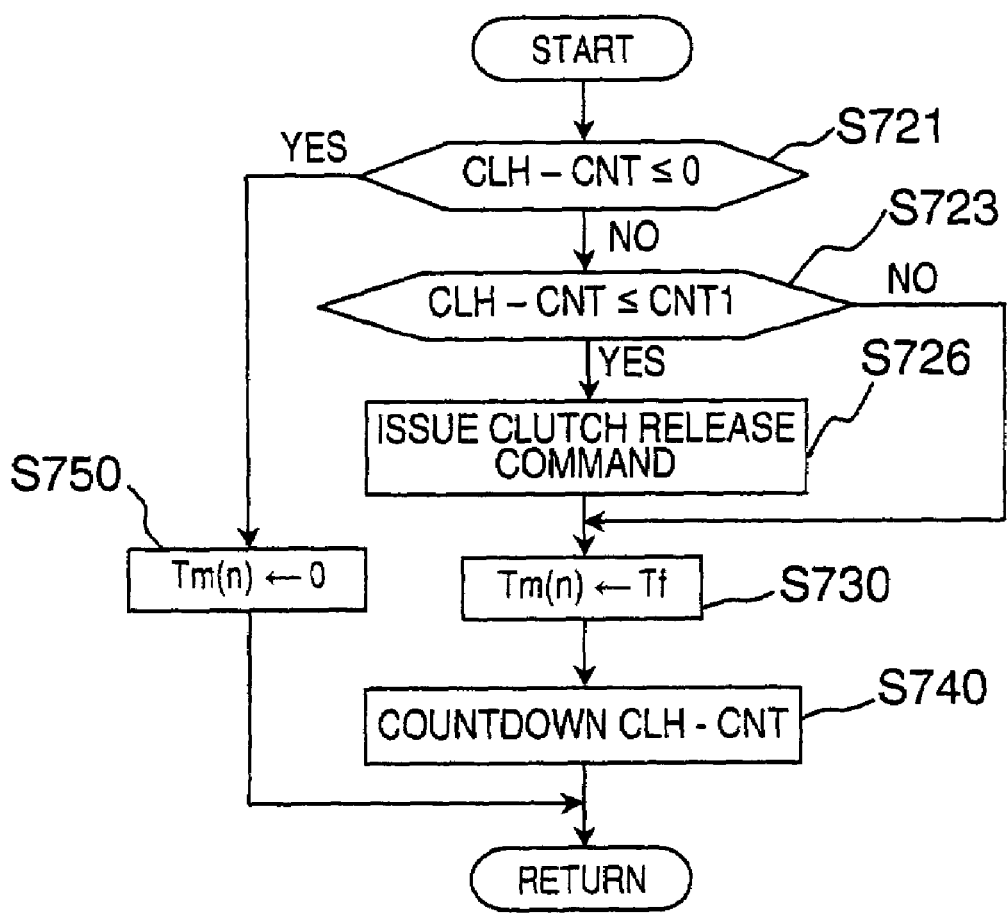
FIG. 14 is a flow chart showing another processing executed by the clutch release processing section in accordance with the second embodiment based on the present invention.

Referring now to FIGS. 12–14, a vehicle driving force control apparatus in accordance with a second embodiment will now be explained. In view of the similarity between the first and second embodiments, the parts or steps of the second embodiment that are identical to the parts or steps of the first embodiment will be given the same reference numerals as the parts or steps of the first embodiment. Moreover, the descriptions of the parts or steps of the second embodiment that are identical to the parts or steps of the first embodiment may be omitted for the sake of brevity.

The second embodiment will now be described with reference mainly to FIGS. 12–14. The same apparatuses and elements as in the first embodiment will be described using the same symbols. The basic construction of this embodiment is the same as that of the first embodiment, except that the processing of the surplus torque converting section 8G and the processing of the clutch release processing section 8H are different.

Thus, the vehicle driving force control apparatus of this second embodiment of the present invention is installed in the four wheel drive vehicle that is diagrammatically illustrated in FIG. 1. Also, the 4WD controller 8 for the vehicle driving force control apparatus of this second embodiment is diagrammatically illustrated as a block diagram in FIG. 3. Moreover, the 4WD controller 8 for the vehicle driving force control apparatus of this second embodiment executes the processing sequence illustrated in FIGS. 4–7 in the same manner as discussed above with reference to the first embodiment. In other words, the processing sequence executed by the 4WD controller 8 of the second embodiment is generally shown in FIG. 4 as discussed above. The processing sequence executed by the drive mode selection section 8K of the second embodiment is shown in FIG. 5 as discussed above. The processing sequence executed by the surplus torque computing section 8E of the second embodiment is shown in FIG. 6 as discussed above. The processing sequence executed by the target torque limiting section 8F of the second embodiment is shown in FIG. 7 as discussed above. The processing sequence executed by the target torque limiting section 8G of the second embodiment is shown in FIG. 8 as discussed above, but the transition determination is slightly different in this embodiment. However, the 4WD controller 8 for the vehicle driving force control apparatus of this second embodiment executes the processing sequence in the surplus torque converting section 8H as illustrated in FIG. 12.

Figure 10:
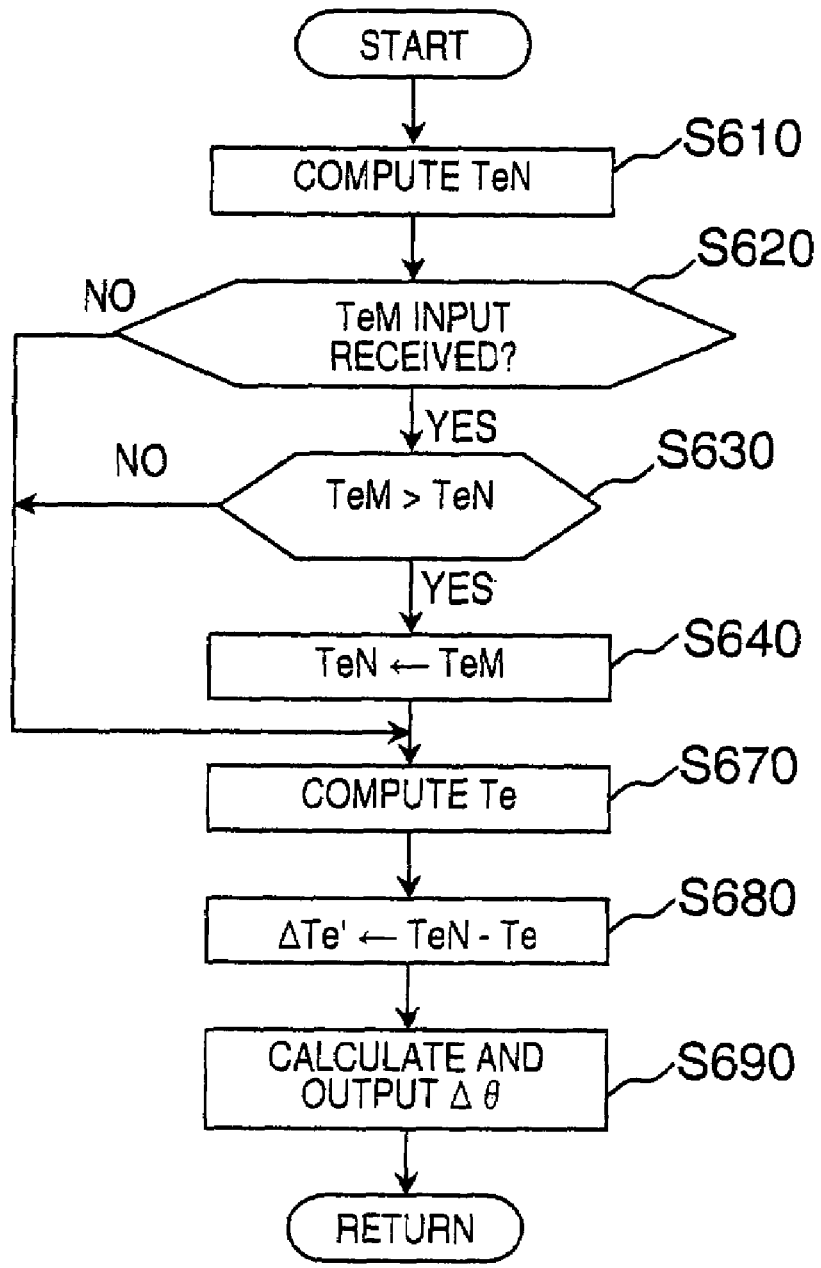
FIG. 10 is a flow chart showing the processing executed by the engine controller in accordance with the first embodiment based on the present invention.

The engine controller 18 for the vehicle driving force control apparatus of this second embodiment also executes the processing sequence illustrated in FIG. 10 as discussed above.

Figure 8:
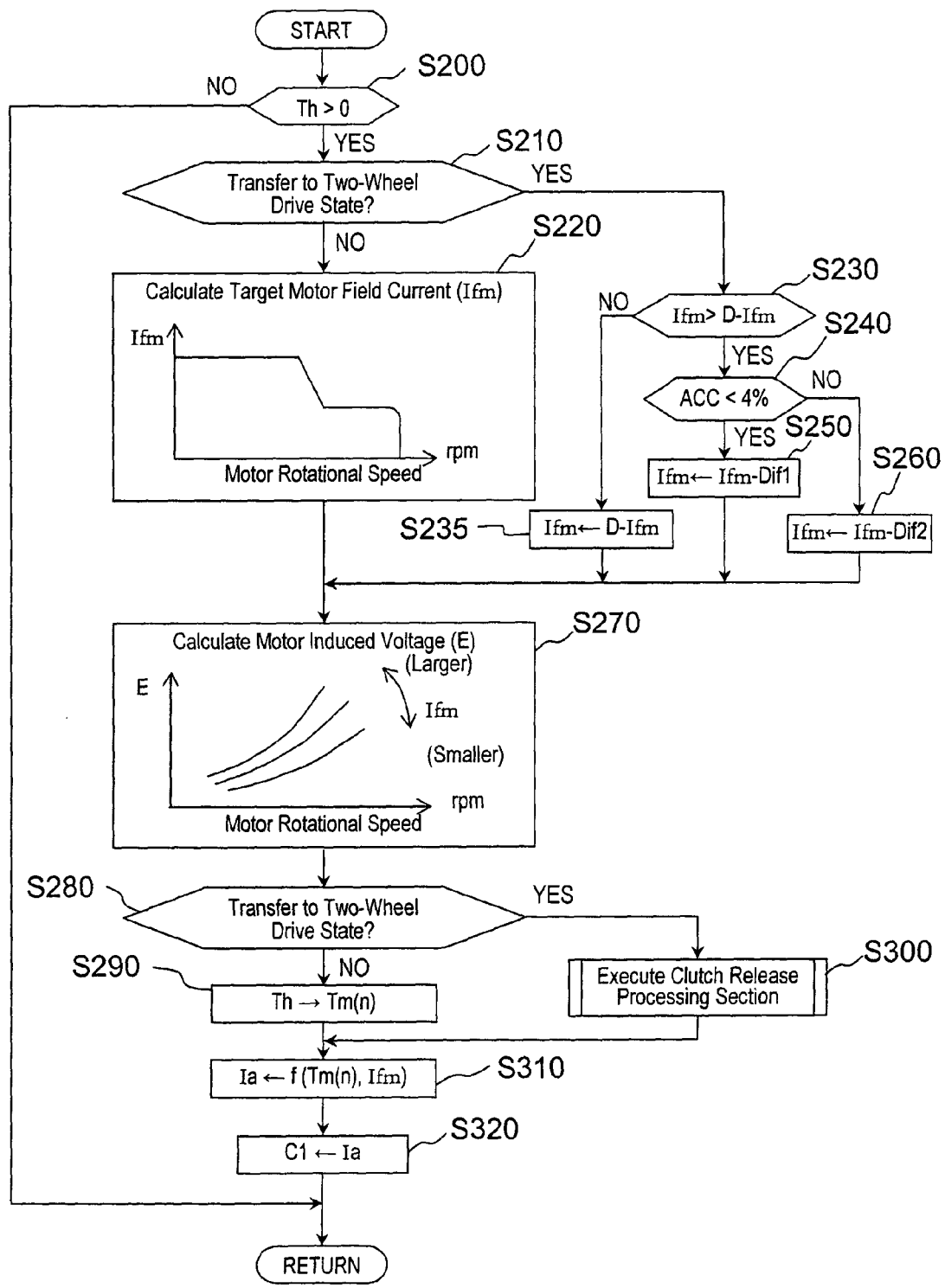
FIG. 8 is a flow chart showing the processing executed by the surplus torque converting section in accordance with the first embodiment based on the present invention.

The process flow of the surplus torque converting section 8G in the present embodiment is the same as in the first embodiment shown in FIG. 8, except that the determination of the transition to a two-wheel drive state in steps S210 and S280 is different. Specifically, in determining a transition to a two-wheel drive state in accordance with the second embodiment of the present embodiment, it is concluded that a transition to a two-wheel drive state is made if the target motor torque is decreasing or is in a steady state in which it is kept constant, and the target motor torque is determined to be the clutch release torque Tf. The rest of the processing performed by the surplus torque converting section 8G is the same as in the first embodiment.

The processing performed by the clutch release processing section 8H of the present embodiment will now be described. A clutch release command is first outputted in step S710, and the program proceeds to step S720, as shown in FIG. 12.

It is determined in step S720 whether a torque holding time counter CLH–CNT is zero, zero is substituted for the target motor torque Tm(n) in step S750 in order to no longer keep the motor torque constant if it is determined that the torque holding time counter CLH–CNT is zero, and the program then proceeds to the beginning.

If, on the other hand, the torque holding time counter CLH–CNT is greater than zero, the clutch release torque Tf is substituted in step S730 in order to keep the target motor torque Tm(n) at the constant clutch release torque Tf, as in the Equation (17) shown below, and the program proceeds to step S740.

$$Tm(n)=Tf \quad (17)$$

Here, the torque holding time counter CLH–CNT is reset in a four-wheel drive state or two-wheel drive state. The value that is set as the initial value for the torque holding time counter CLH–CNT is one at which the clutch 12 is reliably released when the variation component of the clutch response delay has been absorbed and the motor torque value brought to a constant level. For example, 330 ms may be set as the initial value for the torque holding time counter CLH–CNT.

In step S740, the program is completed and returned to the beginning after the torque holding time counter CLH–CNT has been counted down.

The operations, actions, and effects of the present embodiment are the same as those of the first embodiment, except that the transition from a four-wheel drive state to a two-wheel drive state is processed differently.

FIG. 13 shows the exemplary time charts in the second embodiment. In these examples, a target drive torque of 0.5 Nm is adopted as the clutch release torque Tf, a field current value of 3.6 A is adopted as the end-time field current value D–Ifm, and an armature current 27 A is adopted as the end-time armature current D–Ia.

In the present embodiment, the clutch release torque Tf itself is used as the torque threshold to determine a transition from a four-wheel drive state to a two-wheel drive state, as shown in FIG. 13.

Immediately after it is determined that a transition has occurred from a four-wheel drive state to a two-wheel drive state, a clutch release command is outputted and the target armature current Ia is controlled so as to obtain the clutch release torque Tf; and when the clutch response time has elapsed, the clutch is actually released, and a transfer is made to a two-wheel drive state. A case in which the clutch response time is 120 ms is shown in FIG. 13.

The rest of the construction, operation, action, or the like is the same as in the embodiment described above.

Here, the output of the clutch release command may be delayed as shown in FIG. 14 in view of the fact that it takes a certain time for the actual armature current during the two-wheel transition processing to converge to within a prescribed variation width, as shown in FIG. 13.

For example, as shown in FIG. 14, the step S710 in FIG. 12 has been replaced with the processing of steps S721, S723 and S726 in the clutch release processing section 8H in this embodiment of the present invention.

Specifically, when it is determined in step S721 that the torque holding time counter CLH–CNT is greater than 0, it is then determined in step S723 whether the torque holding time counter CLH–CNT is at or below a clutch release counter value CNT1, and if it is determined that the counter is indeed at or below the clutch release counter value CNT1, a clutch release command is outputted in step S726, and the program then proceeds to step S730. If, on the other hand, it is determined that the torque holding time counter CLH–CNT is greater than the clutch release counter value CNT1 in step S723, the program proceeds to step S730 without any clutch release command being outputted. Steps S723 and 726 constitute a clutch release command output section or device.

The initial value of the torque holding time counter CLH–CNT is initially set at a value greater by CNT1 because the output of the clutch release command is delayed by CNT1.

Delaying the output of the clutch release command in this manner makes it possible to release the clutch in a state in which the actual armature current reliably converges to within a prescribed variation width; that is, the actual motor torque is substantially equal to the clutch release torque Tf.

Third Embodiment

Figure 15:
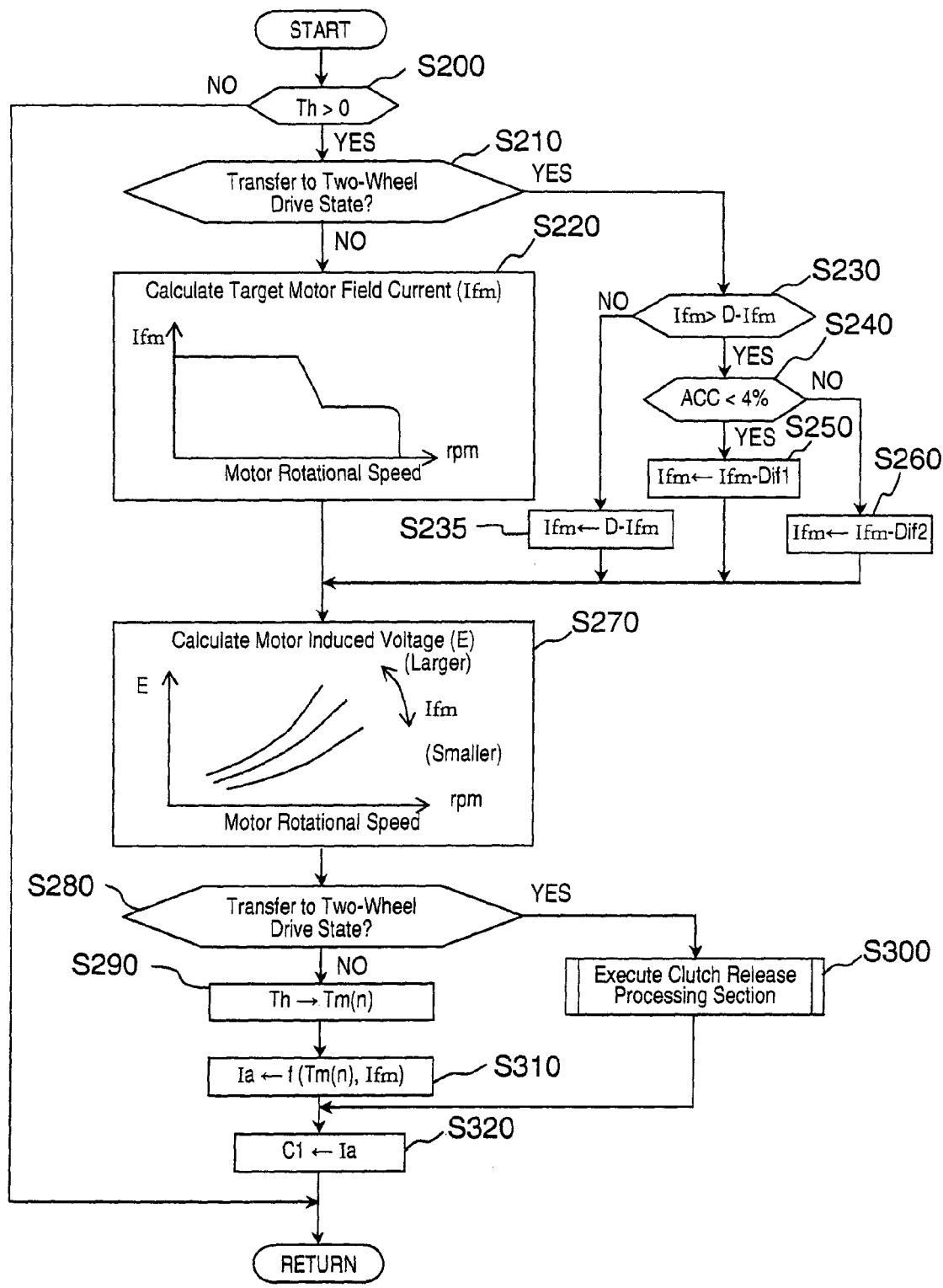
FIG. 15 is a flow chart showing the processing executed by the surplus torque converting section in accordance with a third embodiment based on the present invention.
Figure 16:
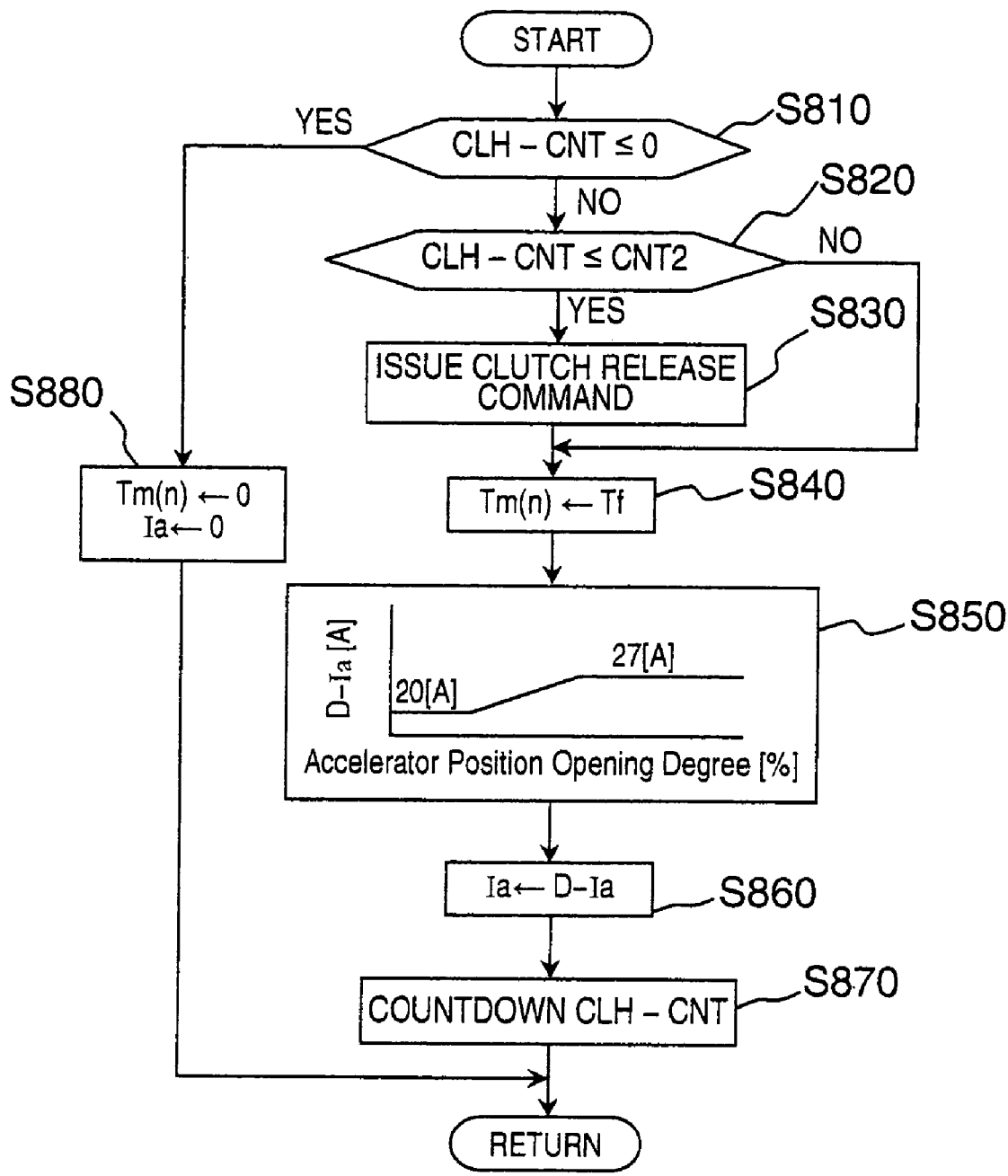
FIG. 16 is a flow chart showing the processing executed by the clutch release processing section in accordance with the third embodiment based on the present invention.
Figure 17:
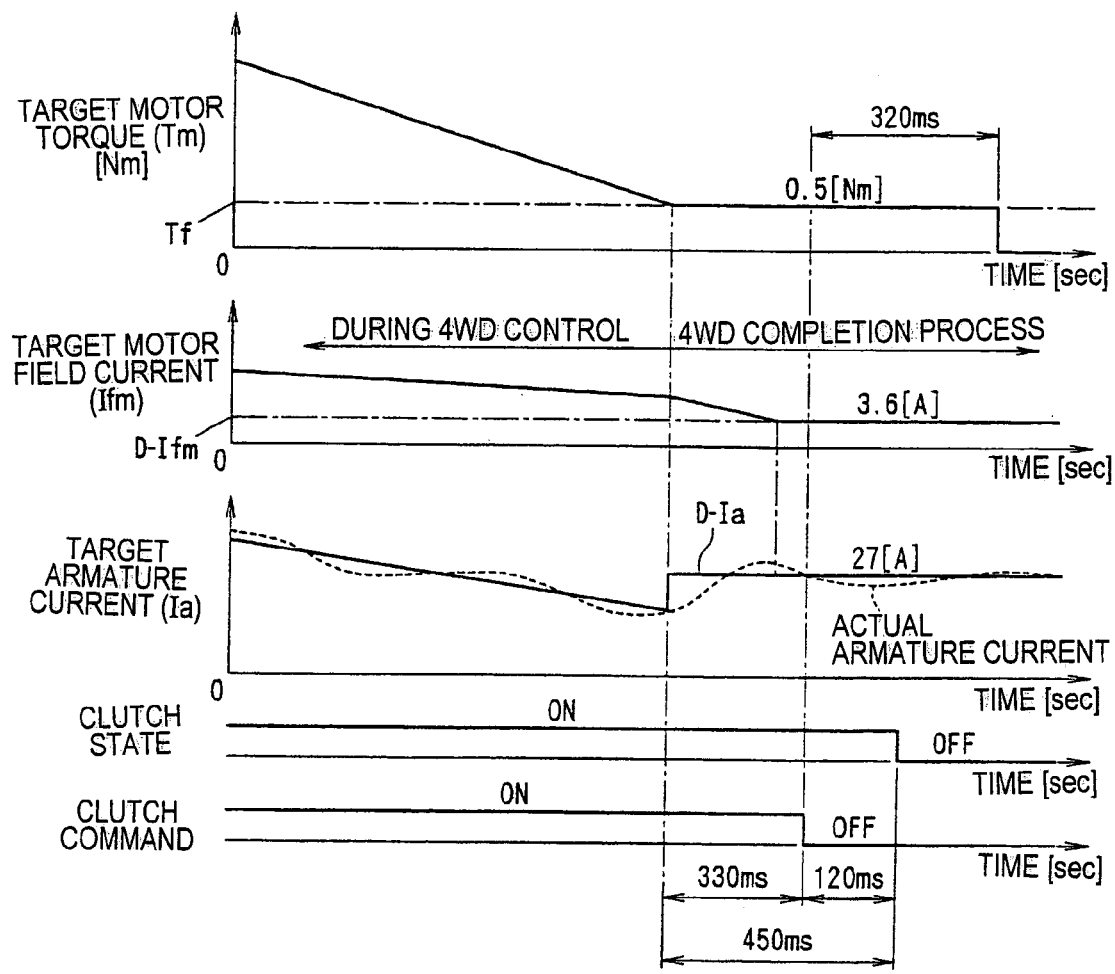
FIG. 17 is a diagram showing exemplary time charts for the clutch release in accordance with the third embodiment based on the present invention.

Referring now to FIGS. 15–17, a vehicle driving force control apparatus in accordance with a third embodiment will now be explained. In view of the similarity between the preceding embodiments and this embodiment, the parts or steps of this embodiment that are identical to the parts or steps of the preceding embodiments will be given the same reference numerals as the parts or steps of the preceding embodiments. Moreover, the descriptions of the parts or steps of this embodiment that are identical to the parts or steps of the preceding embodiments may be omitted for the sake of brevity.

The third embodiment will now be described with reference mainly to FIGS. 15–17. The same apparatuses and elements as in the first embodiment will be described using the same symbols. The basic construction of this embodiment is the same as that of the first embodiment, except that the processing of the surplus torque converting section 8G and the processing of the clutch release processing section 8H are different.

Thus, the vehicle driving force control apparatus of this third embodiment of the present invention is installed in the four wheel drive vehicle that is diagrammatically illustrated in FIG. 1. Also, the 4WD controller 8 for the vehicle driving force control apparatus of this third embodiment is diagrammatically illustrated as a block diagram in FIG. 3. Moreover, the 4WD controller 8 for the vehicle driving force control apparatus of this third embodiment executes the processing sequence illustrated in FIGS. 4–7 in the same manner as discussed above with reference to the first embodiment. In other words, the processing sequence executed by the 4WD controller 8 of the third embodiment is generally shown in FIG. 4 as discussed above. The processing sequence executed by the drive mode selection section 8D of the second embodiment is shown in FIG. 5 as discussed above. The processing sequence executed by the surplus torque computing section 8E of the third embodiment is shown in FIG. 6 as discussed above. The processing sequence executed by the target torque limiting section 8F of the third embodiment is shown in FIG. 7 as discussed above. The processing sequence executed by the target torque limiting section 8G of the third embodiment is shown in FIG. 8 as discussed above, but the transition determination is slightly different in this embodiment. However, the 4WD controller 8 for the vehicle driving force control apparatus of this third embodiment executes the processing sequence in the surplus torque converting section 8H as illustrated in FIG. 12.

The engine controller 18 for the vehicle driving force control apparatus of this third embodiment also executes the processing sequence illustrated in FIG. 10 as discussed above.

The process flow of the surplus torque converting section 8G in the present embodiment is substantially the same as in the first embodiment shown in FIG. 8, except that after the processing in the clutch release processing section 8H has been performed in step S300, the program proceeds to step S320 instead of proceeding to step S310 as seen in FIG. 15.

In the clutch release processing section 8H of the third embodiment, as seen in FIG. 16, the target armature current Ia of the electric motor 4 is directly set instead of the target motor torque. Specifically, the clutch release processing section 8H of the third embodiment first determines in step S810 whether the torque holding time counter CLH–CNT is at or below 0, and if it indeed at or below 0, the program proceeds to step S880, where 0 is substituted for the target motor torque Tm(n) and the target armature current Ia of the electric motor 4, the processing is completed, and the program proceeds to the beginning, as shown in FIG. 16.

If, on the other hand, it is determined in step S810 that the torque holding time counter CLH–CNT is greater than 0, the program proceeds to step S820, it is determined whether the torque holding time counter CLH–CNT is at or below a clutch release counter value CNT2, and if it determined that the torque holding time counter CLH–CNT is indeed at or below the clutch release counter value CNT2, the program proceeds to step S830. In step S830, a clutch release command is outputted, and the program proceeds to step S840. If, on the other hand, it is determined that the torque holding time counter CLH–CNT is greater than CNT2, the program proceeds to step S840 without any output of the clutch release command. Steps S820 and S830 constitute a clutch release command output section. The relation CNT1>CNT2 can be obtained because the convergence of the actual armature current can be improved in comparison with the second embodiment.

In step S840, the target motor torque is set to the clutch release torque Tf, and the program proceeds to step S850.

In step S850, an end-time armature current value D–Ia, which is the armature current value needed for the electric motor 4 to output the clutch release torque Tf, is found and the program then proceeds to step S860 if the actual field current of the electric motor becomes D–Ifm, which is the end-time field current value. Step S850 constitutes a disconnection torque correction section.

In the present embodiment, the end-time armature current value D–Ia is varied in two steps in accordance with the accelerator position opening degree such that the end-time armature current value D–Ia increases with an increase in the accelerator position opening degree, as in the map shown in step S850.

The following are the reasons that the end-time armature current value D–Ia is varied in accordance with the accelerator position opening degree in this manner. Specifically, the clutch release torque Tf is the motor torque value needed to bring the torque on the clutch 12 to zero during vehicle travel, as described above, and the clutch release torque Tf is estimated to be the sum ($Tf=Tf_1+Tf_2$) of "the torque $Tf_1$ for the friction of the electric motor and the reduction gear" and "the torque $Tf_2$ for accelerating the electric motor and the reduction gear equally with the acceleration of the rear wheels." Specifically, the clutch release torque Tf becomes a larger value with an increase in the acceleration of the vehicle body because the acceleration of the rear wheels is synonymous with the acceleration of the vehicle body. In the present embodiment, the end-time armature current value D–Ia increases with an increase in the accelerator position opening degree because it is estimated that the acceleration of the vehicle body increases with an increase in the accelerator position opening degree. The acceleration of the vehicle body may be used instead of the accelerator position opening degree.

The end-time armature current value D–Ia is subsequently substituted for the target armature current Ia of the electric motor 4 in step S860, the torque holding time counter CLH–CNT is then counted down in step S870, the processing is completed, and the program proceeds to the beginning.

The rest of the construction is the same as in the first embodiment.

When the target motor torque Tm is controlled so as to remain constant at the clutch release torque Tf, the target motor field current Ifm in the present embodiment is kept at the end-time field current value D–Ifm after being reduced at a prescribed decrease rate (for example, 5 A/s) and brought closer to the end-time field current value D–Ifm, as in the exemplary time charts shown in FIG. 17. The motor torque is controlled to the level of the clutch-release torque by setting the target armature current to remain constant at the level of the end-time armature current value D–Ia immediately after it is determined that a transfer has occurred from a four-wheel drive state to a two-wheel drive state.

In the exemplary time charts of FIG. 17, a field current value of 3.6 A is adopted as the end-time field current value D–Ifm, and armature current value of 27 A is adopted as the end-time armature current value D–Ia. Also, in the exemplary time charts of FIG. 17, a time of 450 ms is adopted as the time that corresponds to the torque holding time counter CLH–CNT, a time of 330 ms is adopted as the time that corresponds to the clutch release counter value CNT2, a time of 120 ms is adopted as the clutch response time in faster processes at high temperatures or the like, and a time of 320 ms is adopted in slower processes at low temperatures or the like.

Thus, by setting the target armature current to be constant at the level of the end-time armature current value D–Ia immediately after it is determined that a transfer has started from a four-wheel drive state to a two-wheel drive state, it is possible to cause the actual armature current (i.e., the actual motor torque) to converge faster than in a case (see FIG. 11) in which the target armature current value is controlled such that the motor torque reaches the clutch release torque Tf in accordance with the target field current value. Here, the reason that the target motor field current is brought closer to the end-time field current value D–Ifm at a prescribed decrease rate is that peaked variations are created in the actual armature current value because field current is more responsive than armature current when the value is set to the end-time field current value D–Ifm immediately after it is determined that a transfer has occurred from a four-wheel drive state to a two-wheel drive state.

By ensuring convergence at an earlier stage in this manner, it is possible to allow the clutch 12 to be released at a value at which the motor torque is closer to the clutch release torque Tf in comparison with the second embodiment, even when a clutch release command is outputted immediately after it is determined that a transition has occurred from a four-wheel drive state to a two-wheel drive state.

In the present embodiment, the clutch release command is also delayed with consideration for the time elapsed until the actual armature current value and the motor torque have converged to within a prescribed allowable range, making it possible to release the clutch 12 in a more reliable manner when the motor torque is brought substantially to the level of the clutch release torque Tf, and to more reliably prevent shocks from being generated by the clutch release during a transfer from a four-wheel drive state to a two-wheel drive state.

Furthermore, shocks are more reliably prevented from being generated in the present embodiment by a clutch release during a transfer from a four-wheel drive state to a two-wheel drive state by setting and varying the clutch release torque Tf on the basis of the accelerator position opening degree in accordance with the acceleration of the vehicle body.

Fourth Embodiment

Figure 18:
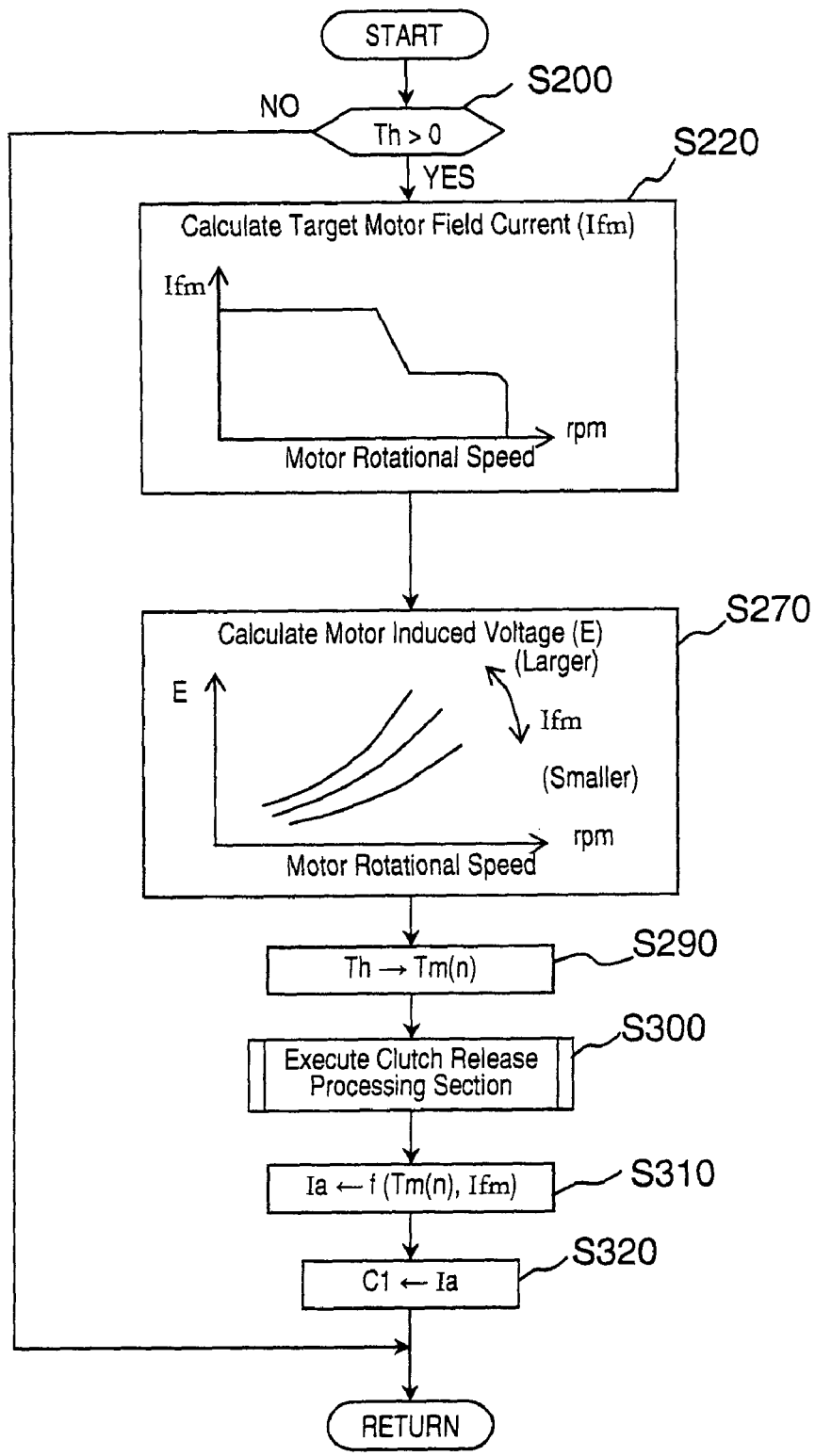
FIG. 18 is a flow chart showing the processing executed by the surplus torque converting section in accordance with a fourth embodiment based on the present invention.
Figure 19:
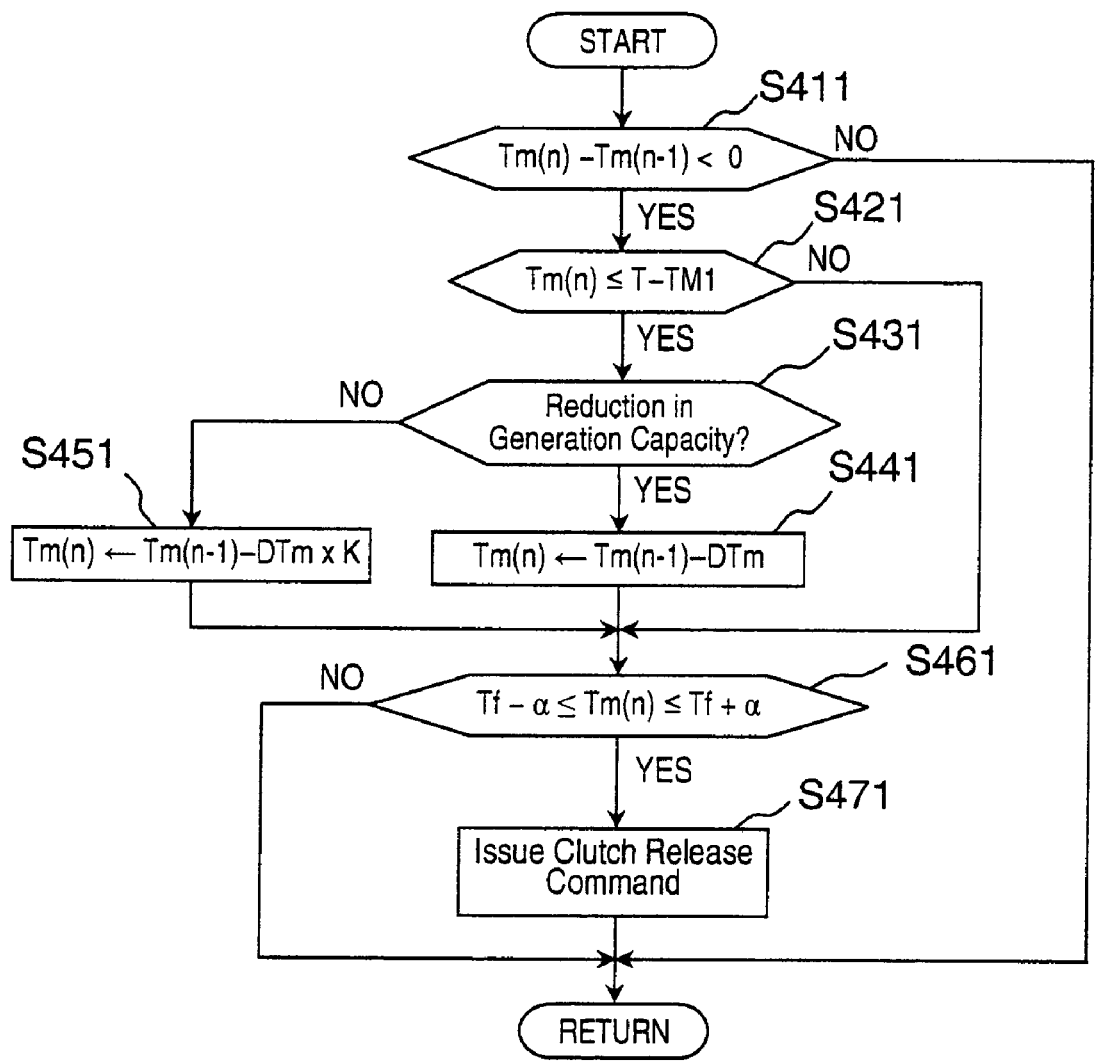
FIG. 19 is a flow chart showing the processing executed by the clutch release processing section in accordance with the fourth embodiment based on the present invention.
Figure 20:
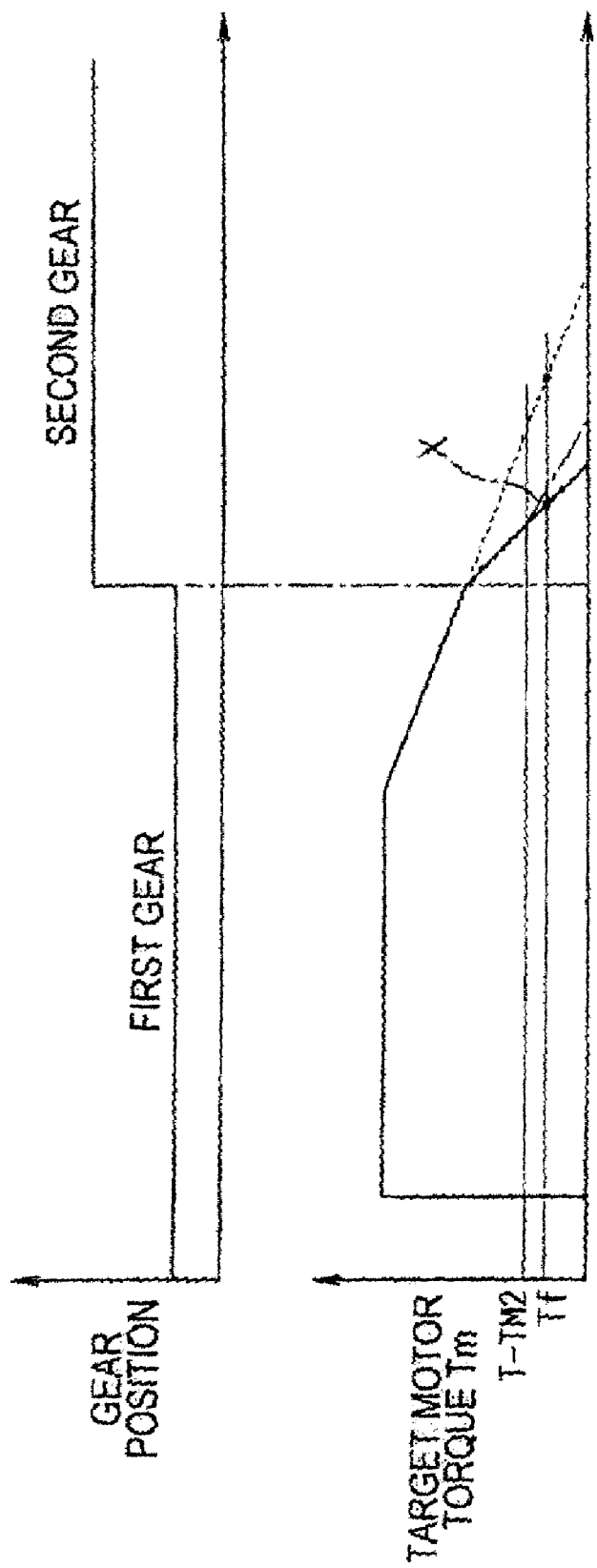
FIG. 20 is a diagram showing exemplary time charts for the clutch release in accordance with the fourth embodiment based on the present invention.

Referring now to FIGS. 18–20, a vehicle driving force control apparatus in accordance with a fourth embodiment will now be explained. In view of the similarity between the first and fourth embodiments, the parts or steps of the fourth embodiment that are identical to the parts or steps of the first embodiment will be given the same reference numerals as the parts or steps of the first embodiment. Moreover, the descriptions of the parts or steps of the fourth embodiment that are identical to the parts or steps of the first embodiment may be omitted for the sake of brevity.

The vehicle driving force control apparatus of this fourth embodiment of the present invention is installed in the four wheel drive vehicle that is diagrammatically illustrated in FIG. 1. In this fourth embodiment of the present invention, the 4WD controller 8 is configured and arranged to adjust the field current Ifh of the generator 7. In particular, the generator 7 imposes a load on the engine 2 in accordance with the field current Ifh of the generator 7 that is adjusted by the 4WD controller 8, and thus, the generator 7 generates electric power in accordance with the load torque. Accordingly, the generator 7 is configured and arranged this embodiment of the present invention as illustrated in FIG. 2.

Also, the 4WD controller 8 for the vehicle driving force control apparatus of this fourth embodiment is diagrammatically illustrated as a block diagram in FIG. 3. The surplus torque computing section 8E, the target torque limiting section 8F, and the surplus torque converting section 8G used herein constitute an output torque control section. Moreover, the 4WD controller 8 for the vehicle driving force control apparatus of this fourth embodiment executes the processing sequence illustrated in FIGS. 4–7 in the same manner as discussed above with reference to the first embodiment. In other words, the processing sequence executed by the 4WD controller 8 of the fourth embodiment is generally shown in FIG. 4 as discussed above. The processing sequence executed by the drive mode selection section 8D of the fourth embodiment is shown in FIG. 5 as discussed above. The processing sequence executed by the surplus torque computing section 8E of the fourth embodiment is shown in FIG. 6 as discussed above. The processing sequence executed by the target torque limiting section 8F of the fourth embodiment is shown in FIG. 7 as discussed above. However, the 4WD controller 8 for the vehicle driving force control apparatus of this fourth embodiment executes the processing sequence in the surplus torque converting section 8G as illustrated in FIG. 18.

The engine controller 18 for the vehicle driving force control apparatus of this fourth embodiment also executes the processing sequence illustrated in FIG. 10 as discussed above.

Similar to the prior embodiments of the present invention, the shock generated when the clutch 12 is brought to a disengaged state can be avoided by disengaging the clutch 12 the moment the torque on the clutch 12 reaches zero level or a low value when the output torque of the motor 4 is reduced to a torque that is equivalent to the torque necessary for the motor 4 to rotate at the same acceleration as the acceleration of the subordinate or rear drive wheels 3L and 3R. In this embodiment of the present invention, if it is determined at this time that the power generation of the generator 7 decreases to the point where the targeted torque cannot be ensured by the motor 4, the deceleration of the output torque is increased by limiting the target torque command value, and the deviation between the target torque command value and the actual drive source torque of the motor 4 is kept low, as explained below. As a result, the output torque of the motor 4 at the time of clutch release can be adjusted to the desired torque, and the shock generated when the clutch 12 is brought to a disengaged state can be avoided even with a reduction in the generation capacity of the generator 7 for supplying electrical power to the electric motor 4.

Accordingly, the processing executed by the surplus torque converting section 8G will now be explained based on FIG. 18.

First, in step S200, it is determined whether the target generator load torque Th is larger than 0. If the target generator load torque Th is determined to be larger than 0, the program of the 4WD controller 8 proceeds to step S220 because the front wheels 1L and 1R are experiencing acceleration slippage. If the 4WD controller 8 determines that the target generator load torque Th is less than or equal to 0, then the 4WD controller 8 returns directly to the beginning because the vehicle is in a state in which the front wheels 1L and 1R are not experiencing acceleration slippage.

In step S220, the rotational speed Nm of the electric motor 4 detected by the motor rotational speed sensor 21 is received as an input, the target motor field current Ifm corresponding to the rotational speed Nm of the electric motor 4 is calculated, the target motor field current Ifm is outputted to the motor control section 8C, and the 4WD controller 8 then proceeds to step S270.

Here, the target motor field current Ifm corresponding to the rotational speed Nm of the electric motor 4 is held to a fixed prescribed current value when the rotational speed Nm is at or below a prescribed rotational speed, and the field current Ifm of the electric motor 4 is reduced by a known weak magnetic field control method when the electric motor 4 is rotating at or above a prescribed rotational speed. In short, when the electric motor 4 rotates at a high speed, the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque $Tm(n)$ is obtained by reducing the field current Ifm of the electric motor 4 and lowering the induced voltage E. As a result, even if the electric motor 4 rotates at a high speed, the required motor torque $Tm(n)$ can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value, and another stage for when the rotational speed is at or above a prescribed value.

It is also acceptable to provide a motor torque correcting section for continuously correcting the required motor torque $Tm(n)$ by adjusting the field current Ifm in accordance with the rotational speed Nm of the electric motor 4 with respect to the required motor torque $Tm(n)$. That is, instead of switching between two stages, the field current Ifm of the electric motor 4 can be adjusted in accordance with the motor rotational speed Nm. As a result, even if the electric motor 4 rotates at a high speed, the required motor torque $Tm(n)$ can be obtained because the motor induced voltage E of the electric motor 4 is kept from rising and the motor torque is prevented from decreasing. Furthermore, since a smooth motor torque characteristic can be obtained, the vehicle can travel with better stability than in the case of two-stage control and can always be kept in a state where the motor driving efficiency is good.

In step S270, the induced current E of the electric motor 4 is calculated based on the target motor field current Ifm and the rotational speed Nm of the electric motor 4, and the 4WD controller 8 then proceeds to step S290.

In step S290, the corresponding target motor torque $Tm(n)$ is calculated based on the generator load torque Th computed by the surplus torque computing section 8E, and the 4WD controller 8 then proceeds to step S300.

In step S300, the clutch release processing section 8H described below is executed, and the 4WD controller 8 proceeds to step S310.

In step S310, the corresponding target armature current Ia is calculated using the latest target motor torque $Tm(n)$ and the target motor field current Ifm as variables, and the 4WD controller 8 then proceeds to step S320.

In step S320, the duty factor C1, which is a generator control command value, is calculated based on the target armature current Ia, the result is outputted, and the 4WD controller 8 then proceeds to the beginning.

Although here the surplus torque converting section 8G takes into account control of the motor 4 when it calculates the target voltage V at the generator 7 that corresponds to the target generator load torque Th, the voltage value V that constitutes the target generator load torque Th may also be calculated directly from the target generator load torque Th.

The processing executed by the motor torque limit computing section 8H will be described next with reference to FIG. 19.

First, in step 411, the 4WD controller 8 determines whether the target motor torque $Tm(n)$, which is the torque command value for the electric motor 4, is decreasing. The 4WD controller 8 proceeds to step S421 if the 4WD controller 8 determines that the torque is decreasing; and the 4WD controller 8 stops and proceeds to the beginning if the 4WD controller 8 determines that the torque is not decreasing. Whether the torque is decreasing can be determined by a mere comparison with the preceding value, as shown by Equation (18) below.

$$Tm(n)-Tm(n-1)<0 \qquad (18)$$

In Equation (18), the suffix (n−1) is the target motor torque of the next preceding calculation period, while the suffix (n) is the target motor torque of the current calculation period.

To reduce the effect of noise or the like, it is also possible to determine whether the torque is decreasing on the basis of historical values that span target motor torques corresponding to three or more periods, as described below. The Equation (19) that follows corresponds to an example in which values corresponding to six periods are used.

$$[Tm(n)+Tm(n-1)+Tm(n-2)]-[Tm(n-3)+Tm(n-4)+Tm(n-5)]<0 \qquad (19)$$

Thus, it is further possible to determine whether the torque is decreasing in cases in which the target motor torque value continuously decreases over a plurality of calculation periods.

In step S421, the 4WD controller 8 determines whether the latest target motor torque $Tm(n)$ is less than the motor torque reduction rate switch threshold T–TM1, and if the answer is positive, the 4WD controller 8 proceeds to step S431 as a transition to a two-wheel drive state, and the decrease gradient of the motor torque is set to a constant value. The 4WD controller 8 proceeds to step S461 if the 4WD controller 8 determines that the motor torque $Tm(n)$ is equal to or greater than the motor torque reduction rate switch threshold T–TM1.

In step S431, the 4WD controller 8 determines whether the generation capacity of the generator 7 decreases to a state in which the power generation that corresponds to the target motor torque $Tm(n)$, which is a target torque command value, cannot be provided or is in danger of not being provided. The 4WD controller 8 proceeds to step S451 if it is determined that there is a decrease, and to step S441 if this is not the case. Step S431 constitutes a generation capacity reduction detection section.

According to the aforementioned determination, a state is established in which the power generation that corresponds to the target torque command value cannot be provided or is in danger of not being provided if, for example, the gear position of the transmission 30 shifts up into second or higher gear on the basis of a signal from the shift position detection device or sensor 32.

In step S441, a setting is established such that the motor torque decreases at the normal torque decrease rate Dtm on the basis of the Equation (20) shown below, and the 4WD controller 8 proceeds to step S461.

$$Tm(n)=Tm(n-1)-Dtm \quad (20)$$

In step S451, the normal torque decrease rate Dtm is multiplied by a gain K greater than 1 (for example, 2) to keep the decrease rate low on the basis of the Equation (21) shown below when the torque rapidly decreases, and the 4WD controller 8 proceeds to step S461.

$$Tm(n)=Tm(n-1)-Dtm \times K \quad (21)$$

Although the decrease rate is multiplied by a gain K greater than 1 to limit the target torque command value, it is also possible to subtract a specific preset decrease rate.

Here, steps S431 and S451 constitute an output torque command value limiting section.

The 4WD controller 8 determines in step S461 whether the latest target motor torque Tm(n) ensures substantial agreement between the acceleration on the clutch output side and the acceleration on the clutch input side the moment the clutch 12 is released, i.e., substantial agreement with the torque Tf (referred to herein below as "equivalent torque Tf") at which the torque on the clutch is substantially zero. If the 4WD controller 8 determines that there is substantial agreement with the equivalent torque Tf, a clutch release command is outputted through the clutch control section 8D in step S471, and the program of this section of the 4WD controller 8 is subsequently completed. If there is no substantial agreement with the equivalent torque Tf, the program of this section of the 4WD controller 8 is completed unchanged and is returned to the beginning.

The equivalent torque Tf is preferably corrected to the extent of the response delay of the clutch operation. Here, the equivalent torque Tf is a value determined by experimentation or calculated by computation or mapping in accordance with the vehicle acceleration, the friction in the torque transfer path on the side of the rear wheels 3L and 3R, or the like, and is an electric motor torque needed to bring the torque on the clutch 12 to zero in accordance with the travel state.

The equivalent torque Tf is the sum of "the torque for the friction of the electric motor and the reduction gear" and "the torque needed to accelerate the electric motor and the reduction gear equally with the acceleration of the rear wheels." The equivalent torque Tf may be a fixed value determined by experimentation or the like.

In addition, the motor torque reduction rate switch threshold T–TM1 is a torque value envisioned for a state of transition from a four-wheel drive state to a two-wheel drive state.

Now the operation of an apparatus constituted as described heretofore will be described. The following explanation assumes the designated drive mode is set to the four-wheel drive mode. The clutch 12 is not connected when the designated drive mode is set to the two-wheel drive mode.

When the torque transferred from the internal combustion engine 2 to the front wheels 1L and 1R is larger than the road surface reaction force limit torque, i.e., when acceleration slippage occurs in the front wheels 1L and 1R, which are the main drive wheels 1L and 1R, due to the road surface friction coefficient μ being small, or the driver depressing the accelerator pedal 17 too deeply, or the like, the clutch 12 is connected, a transition to a four-wheel drive state is made by having the generator 7 generate at a generator load torque Th corresponding to the magnitude of the acceleration slippage thereof, and a transition to a two-wheel drive state is subsequently made by adjusting the drive torque transferred to the front wheels 1L and 1R so as to approach the road surface reaction force limit torque of the front wheels 1L and 1R. This results in suppression of the acceleration slippage of the front wheels 1L and 1R, which are the main drive wheels.

Furthermore, the acceleration performance of the vehicle is improved by adopting an approach in which the surplus power generated by the generator 7 is used to drive the electric motor 4 as well as the rear wheels 3L and 3R, which are the subordinate drive wheels.

At this time, the energy efficiency is increased and fuel consumption improved because the electric motor 4 is driven by a surplus torque that has exceeded the road surface reaction force limit torque of the main drive wheels 1L and 1R.

In this embodiment, if the rear wheels 3L and 3R were always driven, several energy conversions (mechanical energy→electrical energy→mechanical energy) take place, creating energy losses that are proportional to the conversion efficiencies. Therefore, the acceleration performance of the vehicle would decline in comparison with a case where only the front wheels 1L and 1R were driven. Consequently, it is generally desired that driving of the rear wheels 3L and 3R be suppressed. By contrast, this embodiment takes into consideration the fact that when traveling on a slippery road surface or the like, even if all of the output torque Te of the internal combustion engine 2 is transferred to the front wheels 1L and 1R, not all of the torque will be used as driving force. The driving force that cannot be utilized efficiently by the front wheels 1L and 1R is outputted to the rear wheels 3L and 3R, and the acceleration performance is improved.

In addition, the clutch 12 is connected to establish a four-wheel drive state and, with the subsequent suppression of the acceleration slippage, the motor torque is continuously reduced and a transition to a two-wheel drive state made.

If at this time the target motor torque Tm(n) exceeds the motor torque reduction rate switch threshold T–TM1, the reduction rate, i.e., the decrease rate of the motor torque is kept constant at Dtm to allow the torque to decrease at a prescribed gradient during the transition to a two-wheel drive state, and a clutch release command is outputted, then the clutch 12 is released the moment the target motor torque Tm(n) is in substantial agreement with the equivalent torque Tf. It is possible at this time to prevent a shock from being generated during the clutch release because the torque on the clutch 12 is low.

If in this case the transmission is shifted up to second or higher gear during the aforementioned transition to a two-wheel drive state, there is a risk that the rotational speed of the internal combustion engine 2 will decrease following such an upshift, the generation capacity of the generator 7 driven by the internal combustion engine 2 will decrease as well, and the electric motor 4 will become incapable of outputting a torque that corresponds to the target motor torque. Because of the accompanying risk that limitations on the generation capacity will make it impossible to obtain a motor torque that corresponds to the command value (target motor torque), there is the danger that a shock will be generated during clutch release due to a large deviation between the actual motor torque and the target motor torque Tm(n) when the clutch 12 is released according to a timing during which the target motor torque Tm(n) is in substantial agreement with the equivalent torque Tf.

By contrast, this embodiment entails detecting a decrease in the generation capacity of the generator 7 with a timing that precedes the reduction in the post-upshift engine speed, and the reduction rate of the target motor torque Tm(n) is increased, and the target motor torque Tm(n) is limited in a feed-forward manner before there is a decrease in the generation capacity of the generator 7. The target motor torque Tm(n) can thus be kept within the limits of the reduced generation capacity or in the vicinity of these limits, making it possible to prevent a shock from being generated during a clutch release as a result of the fact that the deviation existing between the actual motor torque and the target motor torque Tm(n) during the clutch release can be minimized even when there is a decrease in the generation capacity.

FIG. 20 shows exemplary time charts for the clutch release control of this embodiment. Specifically, as the reduction rate of the target motor torque Tm increases, the actual motor torque becomes the target motor torque Tm within the limits of the generation capacity or in the vicinity of these limits, and the deviation between the target motor torque (torque command value) and the actual motor torque is suppressed when the gear position upshifts into second gear.

Once the target motor torque Tm becomes equal to a torque T−TM2 in the vicinity of the equivalent torque Tf, the decrease rate of the torque may be reset low, i.e., torque limitations may be canceled, as shown by the dashed line X in FIG. 20. Adopting this approach makes it possible to further reduce the disparity between the torque command value and the actual torque even when the deceleration rate of the torque is markedly limited in accordance with the reduction in the generation capacity in the above-described manner by keeping the reduction rate, i.e., decrease rate, of the motor torque immediately before the clutch release or during clutch release sufficiently low to be able to be followed in terms of the control performance of the motor drive control. The corresponding decrease rate may be less than the aforementioned normal torque decrease rate DTm. This processing may also be performed irrespective of the presence or absence of a reduction in the generation capacity.

This embodiment was described above with reference to a case in which the electric motor 4 was driven by a voltage generated by the generator 7, and a four-wheel drive was configured, but this option is non-limiting. This embodiment is also applicable to a system comprising a battery capable of supplying electrical power to the electric motor 4. In this case, minute amounts of electrical power may be supplied from the battery, or the battery supply may be combined with the supply of electrical power from the generator 7.

In the above-described embodiment, an internal combustion engine was cited as an example of the main drive source, but the main drive source may also comprise an electric motor.

Also, the above system was described with reference to a case in which the transition to a four-wheel drive state was performed in accordance with the acceleration slippage of the front wheels, but it is also possible to use a system in which the transition to a four-wheel drive state is performed in accordance with the accelerator position opening degree or the like.

Fifth Embodiment

Figure 21:
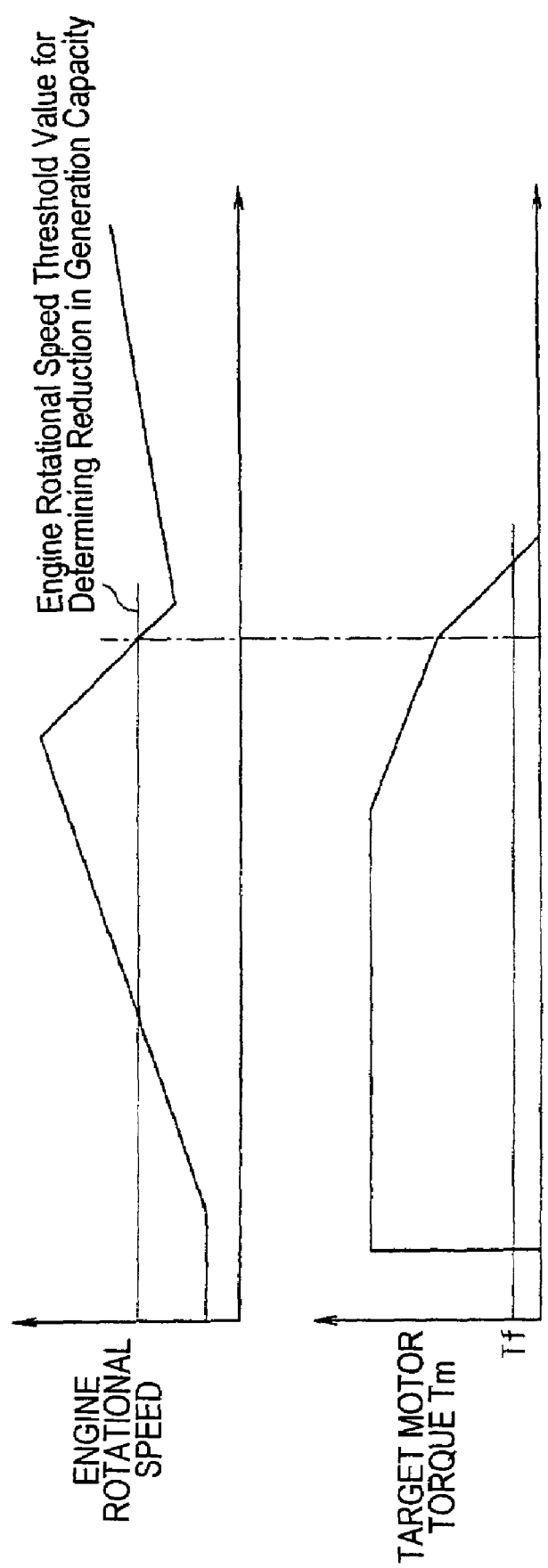
FIG. 21 is a diagram showing exemplary time charts for the clutch release in accordance with a fifth embodiment based on the present invention.

Referring now to FIG. 21, a vehicle driving force control apparatus in accordance with a fifth embodiment will now be explained. In view of the similarity between the preceding embodiments and this embodiment, the parts or steps of this embodiment that are identical to the parts or steps of the preceding embodiments will be given the same reference numerals as the parts or steps of the preceding embodiments. Moreover, the descriptions of the parts or steps of this embodiment that are identical to the parts or steps of the preceding embodiments may be omitted for the sake of brevity.

The basic construction of this fifth embodiment is the same as that of the fourth embodiment, except that the determination in step S431 in the clutch release processing section 8H of FIG. 19 is different. The rest of the construction is the same as in the fourth embodiment. Also the other operations and effects are the same as in the fourth embodiment.

Thus, the vehicle driving force control apparatus of this fifth embodiment of the present invention is installed in the four wheel drive vehicle that is diagrammatically illustrated in FIG. 1. Thus, the electric motor 4, the generator 7 and the 4WD controller 8 are configured and arranged in this fifth embodiment of the present invention as illustrated in FIG. 2. Also, the 4WD controller 8 for the vehicle driving force control apparatus of this fifth embodiment is diagrammatically illustrated as a block diagram in FIG. 3. Moreover, the 4WD controller 8 for the vehicle driving force control apparatus of this fifth embodiment executes the processing sequence illustrated in FIGS. 4–7 in the same manner as discussed above with reference to the first embodiment. In other words, the processing sequence executed by the 4WD controller 8 of the fifth embodiment is generally shown in FIG. 4 as discussed above. The processing sequence executed by the drive mode selection section 8D of the fifth embodiment is shown in FIG. 5 as discussed above. The processing sequence executed by the surplus torque computing section 8E of the fifth embodiment is shown in FIG. 6 as discussed above. The processing sequence executed by the target torque limiting section 8F of the fifth embodiment is shown in FIG. 7 as discussed above. The processing sequence executed by the surplus torque converting section 8G of the fifth embodiment is shown in FIG. 18 as discussed above. The processing sequence executed by the clutch release processing section 8H of the fifth embodiment is shown in FIG. 19 as discussed above, except that the determination in step S431 is different as explained below.

The engine controller 18 for the vehicle driving force control apparatus of this fifth embodiment also executes the processing sequence illustrated in FIG. 11 as discussed above.

Since the basic construction of this fifth embodiment is the same as that of the fourth embodiment, except for the determination in step S431 in the clutch release processing section 8H of FIG. 19 is different, only the determination in step S431 in the clutch release processing section 8H will be discussed. Specifically, the 4WD controller 8 determines in step S431 of the fifth embodiment whether the generation capacity has decreased based on a signal from the engine rotational speed sensor 21, and it is determined that there is a reduction in the generation capacity if the engine rotational speed is at or below a prescribed rotational speed threshold E-T.

In the fifth embodiment, the determination is made based on the engine rotational speed in view of the fact that the generation capacity of the generator 7 driven by the internal combustion engine 2 decreases when there is a decrease in the engine rotational speed.

Since the device for detecting the rotational speed of the internal combustion engine 2 is commonly mounted on the vehicle, the decrease in the generation capacity can be detected easily, inexpensively, and accurately.

The prescribed rotational speed threshold E-T used herein may, for example, be a rotational speed obtained by mapping in advance the engine rotational speed immediately after an upshift from first to second gear has been made in the transmission, or it may be a rotational speed slightly higher than this rotational speed.

Sixth Embodiment

Figure 22:
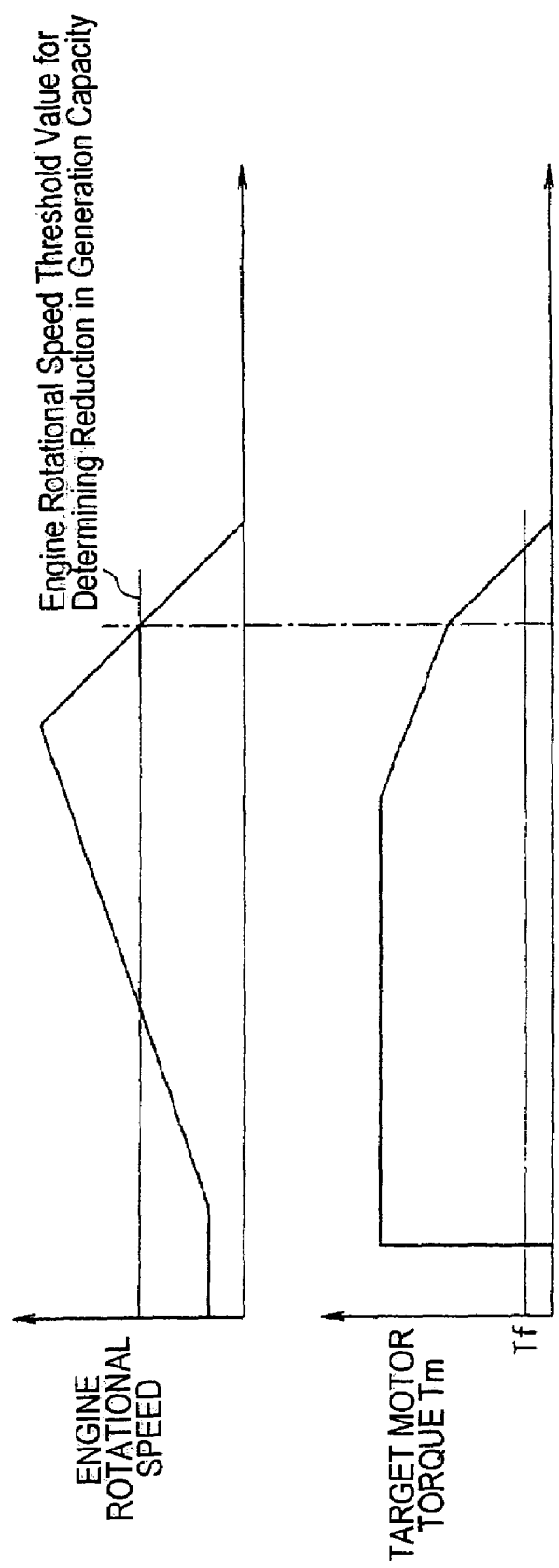
FIG. 22 is a diagram showing exemplary time charts for the clutch release in accordance with a sixth embodiment based on the present invention.

Referring now to FIG. 22, a vehicle driving force control apparatus in accordance with a sixth embodiment will now be explained. In view of the similarity between the preceding embodiments and this embodiment, the parts or steps of this embodiment that are identical to the parts or steps of the preceding embodiments will be given the same reference numerals as the parts or steps of the preceding embodiments. Moreover, the descriptions of the parts or steps of this embodiment that are identical to the parts or steps of the preceding embodiments may be omitted for the sake of brevity.

The basic construction of this sixth embodiment is the same as that of the fourth embodiment, except that the determination in step S431 in the clutch release processing section 8H of FIG. 19 is different. The rest of the construction of this sixth embodiment is the same as in the fourth embodiment. Also the other operations and effects of this sixth embodiment are the same as in the fourth embodiment.

Thus, the vehicle driving force control apparatus of this sixth embodiment of the present invention is installed in the four wheel drive vehicle that is diagrammatically illustrated in FIG. 1. Thus, the electric motor 4, the generator 7 and the 4WD controller 8 are configured and arranged in this sixth embodiment of the present invention as illustrated in FIG. 2. Also, the 4WD controller 8 for the vehicle driving force control apparatus of this sixth embodiment is diagrammatically illustrated as a block diagram in FIG. 3. Moreover, the 4WD controller 8 for the vehicle driving force control apparatus of this sixth embodiment executes the processing sequence illustrated in FIGS. 4–7 in the same manner as discussed above with reference to the first embodiment. In other words, the processing sequence executed by the 4WD controller 8 of the sixth embodiment is generally shown in FIG. 4 as discussed above. The processing sequence executed by the drive mode selection section 8D of the sixth embodiment is shown in FIG. 5 as discussed above.

Figure 6:
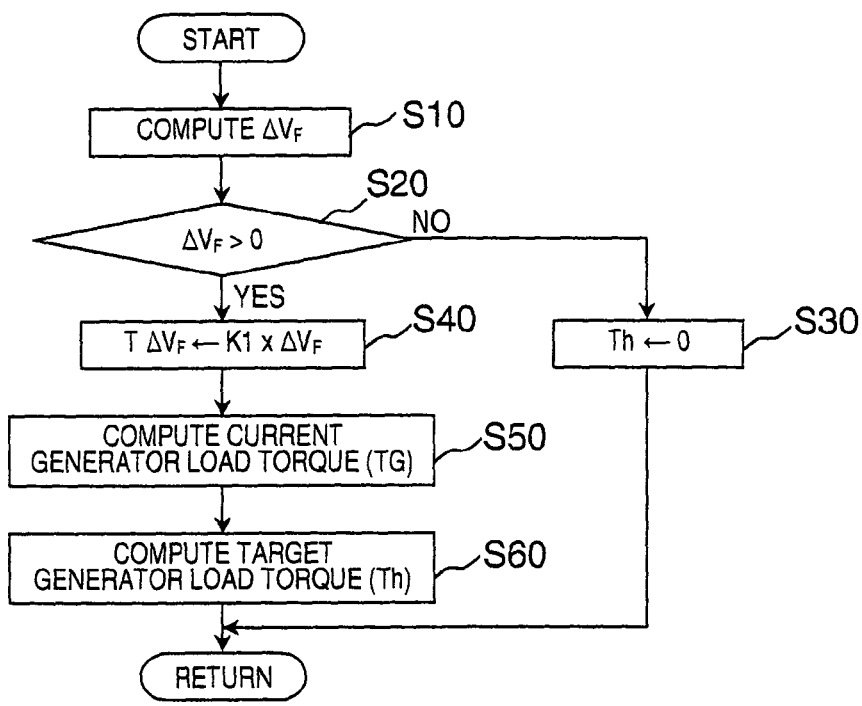
FIG. 6 is a flow chart showing the processing sequence executed by the surplus torque computing section of the 4WD controller for the vehicle driving force control apparatus illustrated in FIG. 1 in accordance with the illustrated embodiments of the present invention.

The processing sequence executed by the surplus torque computing section 8E of the sixth embodiment is shown in FIG. 6 as discussed above. The processing sequence executed by the target torque limiting section 8F of the sixth embodiment is shown in FIG. 7 as discussed above. The processing sequence executed by the surplus torque converting section 8G of the sixth embodiment is shown in FIG. 18 as discussed above. The processing sequence executed by the clutch release processing section 8H of the sixth embodiment is shown in FIG. 19 as discussed above, except that the determination in step S431 is different as explained below.

The engine controller 18 for the vehicle driving force control apparatus of this sixth embodiment also executes the processing sequence illustrated in FIG. 11 as discussed above.

Since the basic construction of this fifth embodiment is the same as that of the fourth embodiment, except for the determination in step S431 in the clutch release processing section 8H of FIG. 19 is different, only the determination in step S431 in the clutch release processing section 8H will be discussed. FIG. 22 shows corresponding exemplary time charts.

Another feature of this construction is that a rotational speed sensor for detecting the rotational speed of the generator 7 is provided to allow the detection signals of the rotational speed sensor to be outputted to the 4WD controller.

Specifically, it is determined in step S431 of the present embodiment whether the generation capacity has decreased based on a signal from the rotational speed sensor, and it is determined that there is a reduction in the generation capacity if the rotational speed of the generator 7 is at or below a prescribed rotational speed threshold H-T.

The prescribed rotational speed threshold H-T used herein may, for example, be a rotational speed obtained by mapping in advance the rotational speed of the generator 7 immediately after an upshift from first to second gear has been made in the transmission, or it may be a rotational speed slightly higher than this rotational speed. Alternatively, it is possible to use a rotational speed at the lower limit of the rotational region of a generator in which sufficient generation is ensured with any traveling pattern in terms of the generation characteristics of the generator 7.

In the present embodiment, the rotational speed of the generator 7 is directly detected to detect any reduction in the generation capacity of the generator 7.

It is also possible to determine whether the generation capacity has decreased on the basis of the voltage or current value of the generator 7.

Seventh Embodiment

Figure 23:
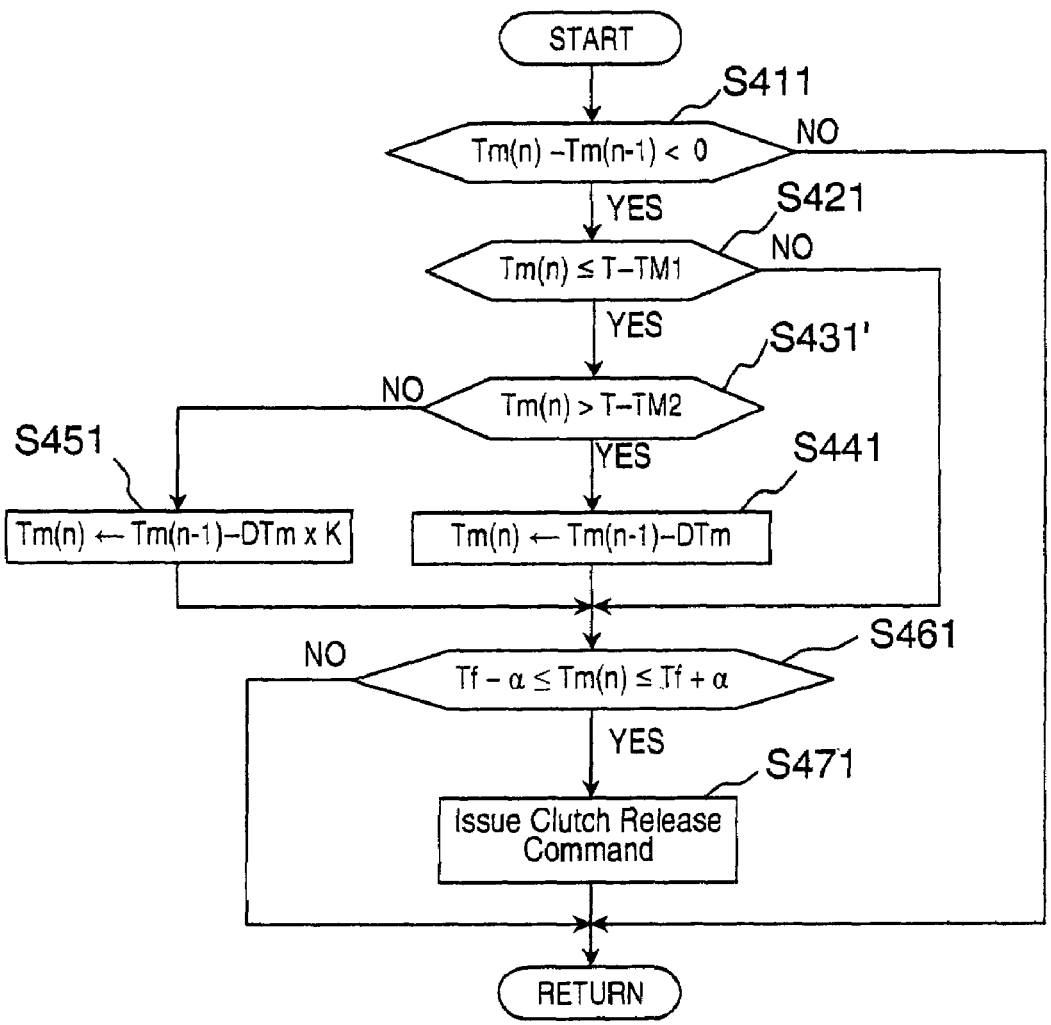
FIG. 23 is a diagram showing the processing executed by the clutch release processing section in accordance with a seventh embodiment based on the present invention.
Figure 24:
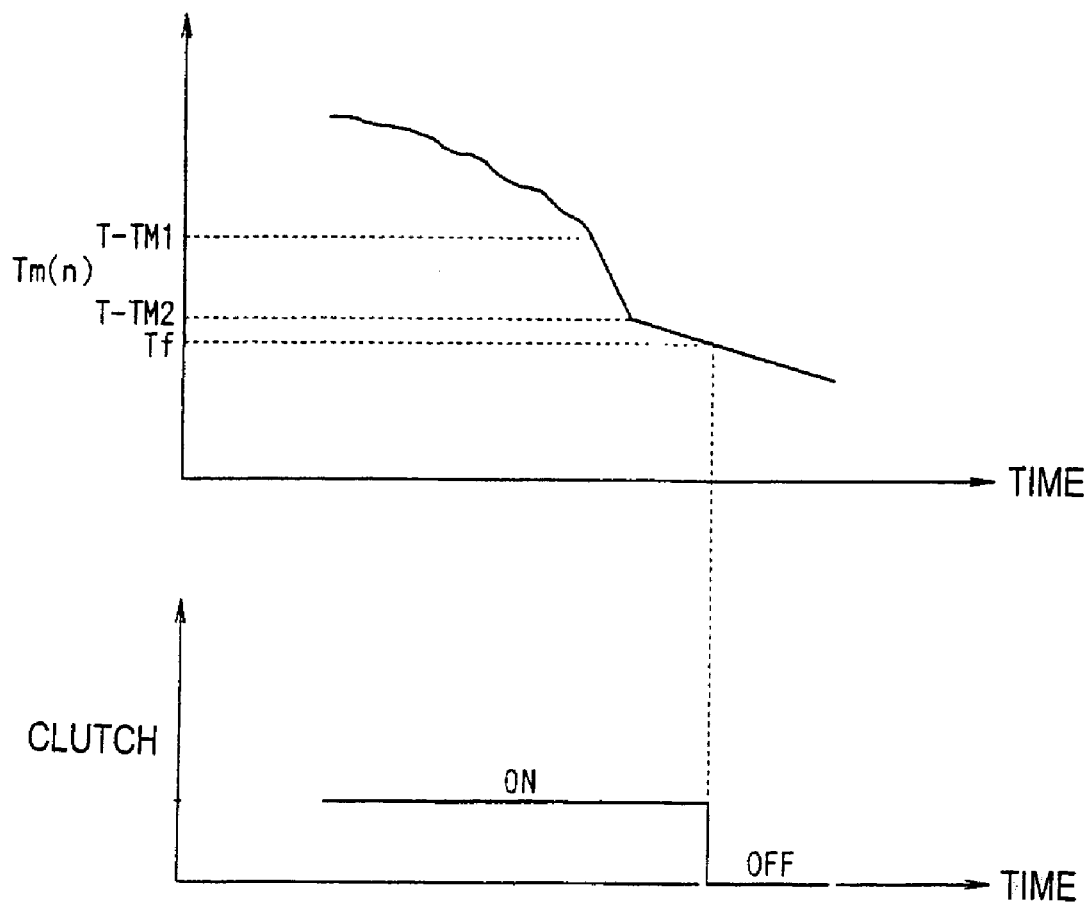
FIG. 24 is a diagram showing exemplary time charts for the clutch release in accordance with the seventh embodiment based on the present invention.

Referring now to FIGS. 23 and 24, a vehicle driving force control apparatus in accordance with a seventh embodiment will now be explained. In view of the similarity between the preceding embodiments and this embodiment, the parts or steps of this embodiment that are identical to the parts or steps of the preceding embodiments will be given the same reference numerals as the parts or steps of the preceding embodiments. Moreover, the descriptions of the parts or steps of this embodiment that are identical to the parts or steps of the preceding embodiments may be omitted for the sake of brevity.

The basic construction of this seventh embodiment is the same as that of the fourth embodiment, except for one step of the clutch release processing section 8H is different. In particular, in the clutch release processing section 8H, the determination in step S431' of this seventh embodiment replaces the determination in step S431 of the fourth embodiment. The rest of the construction of this seventh embodiment is the same as in the fourth embodiment. Also the other operations and effects of this seventh embodiment are the same as in the fourth embodiment.

The vehicle driving force control apparatus of this seventh embodiment of the present invention is installed in the four wheel drive vehicle that is diagrammatically illustrated in FIG. 1. Thus, the electric motor 4, the generator 7 and the 4WD controller 8 are configured and arranged in this seventh embodiment of the present invention as illustrated in FIG. 2. Also, the 4WD controller 8 for the vehicle driving force control apparatus of this seventh embodiment is diagrammatically illustrated as a block diagram in FIG. 3. Moreover, the 4WD controller 8 for the vehicle driving force control apparatus of this seventh embodiment executes the processing sequence illustrated in FIGS. 4-7 in the same manner as discussed above with reference to the first embodiment. In other words, the processing sequence executed by the 4WD controller 8 of the seventh embodiment is generally shown in FIG. 4 as discussed above. The processing sequence executed by the drive mode selection section 8D of the seventh embodiment is shown in FIG. 5 as discussed above. The-processing sequence executed by the surplus torque computing section 8E of the seventh embodiment is shown FIG. 6. The processing sequence executed by the target torque limiting section 8F of the seventh embodiment is shown in FIG. 7 as discussed above. The processing sequence executed by the target torque limiting section 8F of the seventh embodiment is shown in FIG. 7 as discussed above. The processing sequence executed by the surplus torque converting section 8G is shown in FIG. 18 as discussed above. However, the 4WD controller 8 for the vehicle driving force control apparatus of this seventh embodiment executes the processing sequence in the clutch release processing section 8H as illustrated in FIG. 23.

The engine controller 18 for the vehicle driving force control apparatus of this seventh embodiment also executes the processing sequence illustrated in FIG. 11 as discussed above.

According to this embodiment of the present invention, the clutch 12 is released when the torque on the clutch 12 is at zero level or in a low state by releasing the clutch 12 the moment the output torque of the motor 4 is reduced to a torque that corresponds to the torque at which the acceleration of the motor 4 on the clutch input side and the acceleration of the subordinate or rear drive wheels 3L and 3R on the clutch output side become equal to each other. As a result, shocks can be prevented from being generated when the clutch 12 is in a released state. The torque that corresponds to the aforementioned torque becomes one that corresponds to the friction component in the electric motor 4 and in the torque transfer path from the electric motor 4 to the clutch 12 when the rear wheels 3L and 3R rotate at equal speed. Specifically, the torque that corresponds to the aforementioned torque is the sum of "the torque component corresponding to the friction component in the electric motor and in the torque transfer path from the electric motor to the clutch" and "the torque component that is required to accelerate the clutch input side equally with the subordinate drive wheels."

The processing executed by the motor torque limit computing section 8H will be described next with reference to FIG. 23

First, in step 411, the 4WD controller 8 determines whether the target motor torque Tm(n), which is the torque command value for the electric motor 4, is decreasing. The 4WD controller 8 proceeds to step S421 if the 4WD controller 8 determines that the torque is decreasing; and the 4WD controller 8 stops and proceeds to the beginning if the 4WD controller 8 determines that the torque is not decreasing. Whether the torque is decreasing can be determined by a mere comparison with the preceding value, as shown by Equation (18) presented above.

To reduce the effect of noise or the like, it is also possible to determine whether the torque is decreasing on the basis of historical values that span target motor torques corresponding to three or more periods, as described above with respect to Equation (19). Thus, it is further possible to determine whether the torque is decreasing in cases in which the target motor torque value continuously decreases over a plurality of calculation periods.

In step S421, the 4WD controller 8 determines whether the latest target motor torque Tm(n) is less than the motor torque reduction rate switch threshold T-TM1, and if the answer is positive, the 4WD controller 8 proceeds to step S431' as a transition to a two-wheel drive state, and the decrease gradient of the motor torque is set to a constant value. The 4WD controller 8 proceeds to step S461 if the 4WD controller 8 determines that the motor torque Tm(n) is equal to or greater than the motor torque reduction rate switch threshold T-TM1.

In this embodiment, the 4WD controller 8 determines in step S431' of FIG. 23 whether the current target motor torque Tm(n) is less than the motor torque decrease rate switch threshold T-TM2, and the program proceeds to step S441 if this is the case, and to step S451 if this is not the case.

In step S441, a setting is established such that the motor torque decreases at the normal torque decrease rate Dtm on the basis of the Equation (20) as mentioned above, and the program proceeds to step S461.

In step S451, the normal torque decrease rate Dtm is multiplied by a gain K less than 1 (for example, 0.5), and the decrease rate is regulated to remain low such that the reduction rate of the torque is reduced on the basis of the Equation (21) as mentioned above when the torque rapidly decreases; and the program proceeds to step S461.

Although the decrease rate is multiplied by a gain K less than 1 and is regulated to remain low, it is also possible to subtract a specific preset decrease rate. The post-regulation decrease rate is set to ensure a low decrease rate within a range that can be followed by the torque control of the electric motor, that is, a range within which there is no difference between the actual torque value and the target motor torque (torque command value). The term "that can be followed by the torque control of the electric motor" refers, for example, to setting a decrease rate that is lower than the speed of response obtained until the actual torque value becomes the torque command value.

It is also possible to adopt an arrangement in which steps S421 and S441 are dispensed with, and when the program proceeds from step S431' to step S451, step S451 is replaced by multiplying the decrease rate of the motor torque being controlled by a prescribed maximum limiting value to achieve a result not greater than the prescribed decrease rate, that is, to prevent the motor torque from decreasing rapidly.

It is determined in step S461 whether the latest target motor torque Tm(n) ensures substantial agreement between the acceleration on the clutch output side and the acceleration on the clutch input side the moment the clutch 12 is released, i.e., substantial agreement with the torque Tf (referred to herein below as "equivalent torque Tf") at which the torque on the clutch is substantially zero, and if it is determined that there is substantial agreement with the equivalent torque Tf, a clutch release command is outputted through the clutch control section 8D in step S471, and the program is subsequently completed. If there is no substantial agreement with the equivalent torque Tf, the program is completed unchanged and is returned to the beginning.

The equivalent torque Tf is preferably corrected in proportion to the response delay of the clutch operation.

Following are descriptions of the motor torque reduction rate switch threshold T–TM1, the motor torque decrease rate switch threshold T–TM2, and the equivalent torque Tf. These three values are related as shown in Equation (22) below.

$$T\text{-}TM1 > T\text{-}TM2 > Tf \tag{22}$$

The equivalent torque Tf is a value determined by experimentation or calculated by computation or mapping in accordance with the vehicle acceleration, the friction in the torque transfer path on the side of the electric motor, or the like, and is the motor torque needed to bring the torque on the clutch 12 to zero in accordance with the travel state.

The equivalent torque Tf is the sum of "the torque for the friction of the electric motor and the reduction gear" and "the torque for accelerating the electric motor and the reduction gear equally with the acceleration of the rear wheels." The equivalent torque Tf may be a fixed value determined by experimentation or the like.

The motor torque decrease rate switch threshold T–TM2 is a torque value greater than the equivalent torque Tf but still close to the equivalent torque Tf, and is a value greater than the equivalent torque Tf to the extent that makes it possible to perform following and response by the system of motor control.

Also in the present embodiment, the disparity between the torque command value and the actual torque can be kept low by regulating the reduction rate, i.e., decrease rate, of the motor torque to remain sufficiently low to be able to be followed in terms of the control performance of the motor drive control when the target motor torque exceeds the motor torque decrease rate switch threshold T–TM2 before the equivalent torque Tf is reached. As a result, the motor torque control properties at the time of clutch release can be improved, the torque on the clutch 12 can be adjusted in a more reliable manner, and shocks can thus be more reliably prevented from being generated during clutch release.

FIG. 23 shows the corresponding exemplary time charts for this embodiment of the present invention. It can be seen in FIG. 23 that even if the reduction rate of the motor torque is accidentally set late at the time the equivalent torque Tf is approached, this time period is short. However, the torque reduction rate can still be set to the desired value while the torque is between T–TM1 and T–TM2.

The present invention of this embodiment was described above with reference to a case in which the electric motor 4 was driven by a voltage generated by the generator 7, and a four-wheel drive was configured, but this option is non-limiting. This embodiment is also applicable to a system comprising a battery capable of supplying electrical power to the electric motor 4. In this case, minute amounts of electrical power may be supplied from the battery, or the battery supply may be combined with the supply of electrical power from the generator 7.

Eighth Embodiment

Referring now to FIGS. 25–29, a vehicle driving force control apparatus in accordance with an eighth embodiment will now be explained. In view of the similarity between the preceding embodiments and this embodiment, the parts or steps of this embodiment that are identical to the parts or steps of the preceding embodiments will be given the same reference numerals as the parts or steps of the preceding embodiments. Moreover, the descriptions of the parts or steps of this embodiment that are identical to the parts or steps of the preceding embodiments may be omitted for the sake of brevity.

The vehicle driving force control apparatus of this eighth embodiment of the present invention is installed in the four wheel drive vehicle that is diagrammatically illustrated in FIG. 1. Thus, the electric motor 4, the generator 7 and the 4WD controller 8 are configured and arranged in this sixth embodiment of the present invention as illustrated in FIG. 2. Also, the 4WD controller 8 for the vehicle driving force control apparatus of this eighth embodiment is diagrammatically illustrated as a block diagram in FIG. 3.

Figure 7:
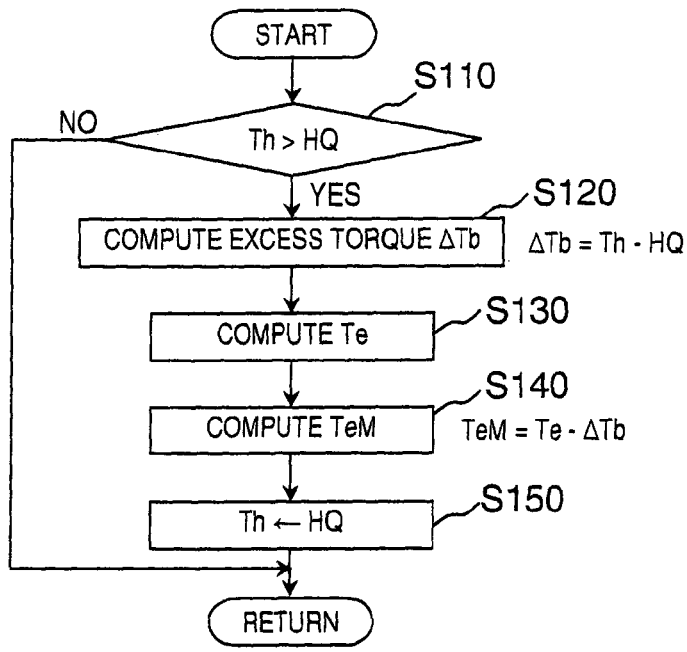
FIG. 7 is a flow chart showing the processing sequence executed by the target torque limiting (control) section of the 4WD controller for the vehicle driving force control apparatus illustrated in FIG. 1 in accordance with the illustrated embodiments of the present invention.
Figure 25:
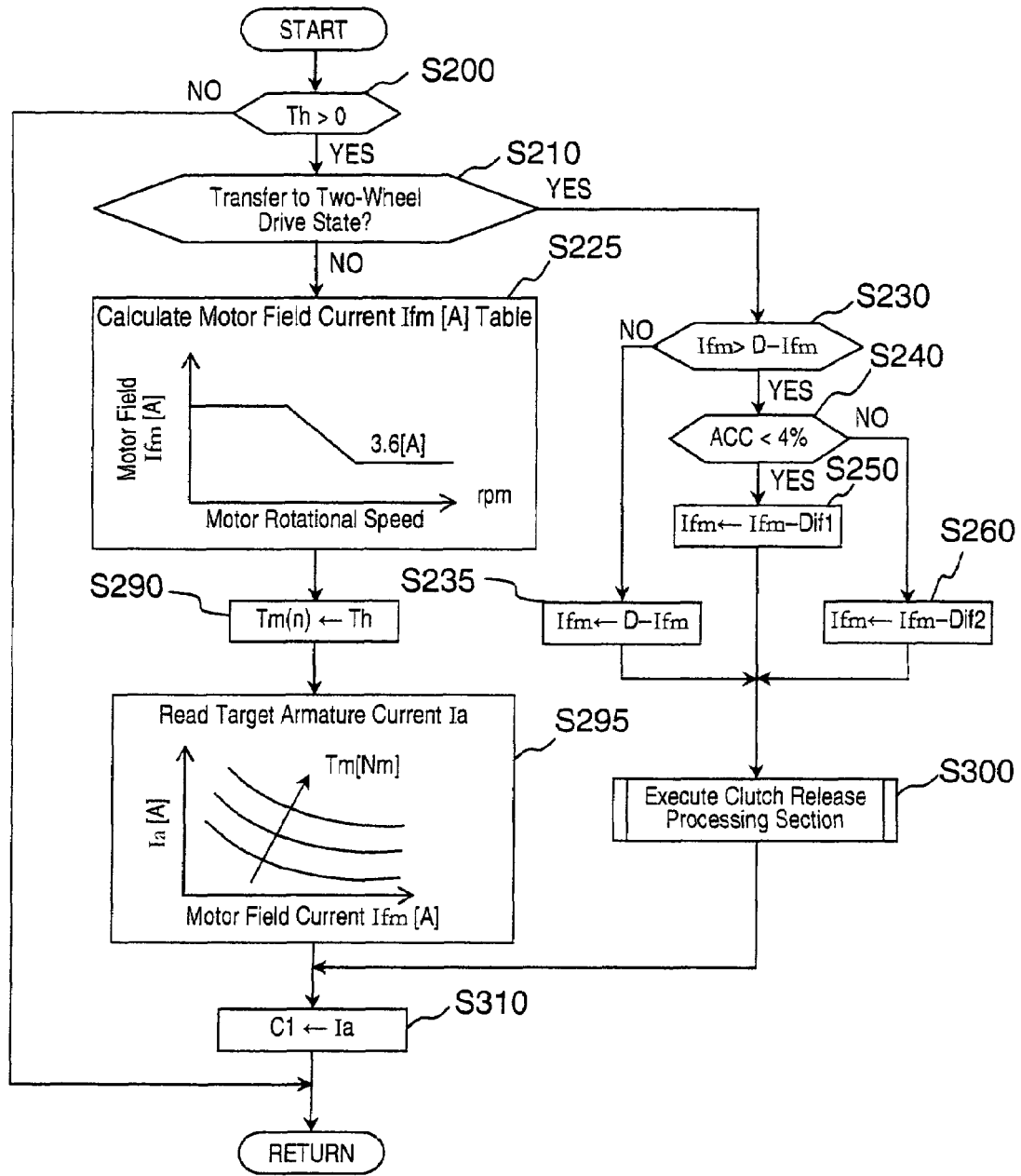
FIG. 25 is a flow chart showing the processing executed by the surplus torque converting section in accordance with an eighth embodiment based on the present invention.

Moreover, the 4WD controller 8 for the vehicle driving force control apparatus of this eighth embodiment executes the processing sequence illustrated in FIGS. 4–7 in the same manner as discussed above with reference to the first embodiment. In other words, the processing sequence executed by the 4WD controller 8 of the eighth embodiment is generally shown in FIG. 4 as discussed above. The processing sequence executed by the drive mode selection section 8D of the eighth embodiment is shown in FIG. 5 as discussed above. The processing sequence executed by the surplus torque computing section 8E of the eighth embodiment is shown in FIG. 6. The processing sequence executed by the target torque limiting section 8F of the eighth embodiment is shown in FIG. 7 as discussed above. However, the 4WD controller 8 for the vehicle driving force control apparatus of this eighth embodiment executes the processing sequence in the surplus torque converting section 8G as illustrated in FIG. 25. Also, the 4WD controller 8 for the vehicle driving force control apparatus of this eighth embodiment executes the processing sequence in the clutch release processing section 8H of FIG. 26, which replaces the clutch release processing section 8H of FIG. 9.

The engine controller 18 for the vehicle driving force control apparatus of this eighth embodiment also executes the processing sequence illustrated in FIG. 11 as discussed above.

Since only the processing of the surplus torque converting section 8G and the processing of the clutch release processing section 8H are different, only these differences will be discussed. Thus, in this embodiment, the surplus torque converting section 8G of FIG. 25 replaces the surplus torque converting section 8G of FIG. 8, and the clutch release processing section 8H of FIG. 26 replaces the clutch release processing section 8H of FIG. 9. The rest of the construction is the same as in the first embodiment. Also the other operations and effects are the same as in the first embodiment.

Similar to the prior embodiments of present invention, the shock generated when the clutch 12 is brought to a disengaged state can be avoided as a result of the fact that the clutch 12 is disengaged when the torque on the clutch is at zero level or in a low state. In addition, the clutch 12 can be released in a controlled state in which the motor torque remains constant at the clutch-release torque, whereby the clutch 12 can be released when the motor torque remains at the level of the clutch-release torque in a stable fashion. At this time, in accordance with the present invention, variations in the actual armature current value can be reduced; that is, variations in the actual motor torque can be suppressed, by starting the constant-value control of the motor torque in a state in which the deviation from the desired armature current value (end-time armature current value) is low when a transition is made from a four-wheel drive state to a two-wheel drive state, and the motor torque is controllably kept as a constant value at the level of the clutch-release torque.

Next, the processing executed by the surplus torque converting section 8G will be explained based on FIG. 25.

First, in step S200, the control program of the 4WD controller 8 determines whether the target generator load torque Th is larger than 0. If the target generator load torque Th is determined to be larger than 0, the 4WD controller 8 proceeds to step S210 because the front wheels 1L and 1R are experiencing acceleration slippage. If the 4WD controller 8 determines that the target generator load torque Th is less than or equal to 0, then the 4WD controller 8 returns directly to the beginning because the vehicle is in a state in which the front wheels 1L and 1R are not experiencing acceleration slippage.

In step S210, the 4WD controller 8 determines whether a transition is being made from a four-wheel drive state to a two-wheel drive state, the program proceeds to step S230 if it is determined that a transition to two wheels is being made, and the 4WD controller 8 proceeds to step S225 for regular processing if this is not the case. Step S210 constitutes a transition determination section.

In the present embodiment, the 4WD controller 8 determines that a transition is made to a two-wheel drive state, in which the clutch 12 should be released, if the target motor torque is decreasing and the target motor torque is at or below a prescribed threshold torque T−TM1(=1 Nm).

Here, the prescribed threshold torque is a value found in advance by experimentation or the like, the motor torque value at which the armature current becomes the end-time armature current value D−Ia with a high frequency is found in advance, and the torque is set as the threshold torque T−TM1 (=1 Nm) when the armature current value at which the motor torque becomes the clutch release torque Tf (=0.5 Nm) when the field current of the electric motor 4 is the end-time field current value D−Ifm (=3.6 A) is defined as the end-time armature current D−Ia (=27 A).

Here, the clutch release torque Tf is a value determined by experimentation or calculated by computation or mapping in accordance with the vehicle acceleration, the friction in the torque transfer path on the side of the electric motor, or the like, and is the motor torque value needed to bring the torque on the clutch 12 to zero during vehicle travel. The clutch release torque Tf is estimated to be the sum (Tf=Tf$_1$+Tf$_2$) of "the torque Tf$_1$ for the friction of the electric motor and the reduction gear" and "the torque Tf$_2$ for accelerating the electric motor and the reduction gear equally with the acceleration of the rear wheels."

In the present embodiment, it is assumed that the contribution from "the torque Tf$_1$ for the friction of the electric motor and the reduction gear" is greater than the contribution from "the torque Tf$_2$ for accelerating the electric motor and the reduction gear equally with the acceleration of the rear wheels," and the clutch release torque Tf is set to a fixed value (=0.5 Nm) that corresponds to "the torque Tf$_1$ for the friction of the electric motor and the reduction gear," which is determined by experimentation or the like.

Whether the target motor torque Tm, which is the torque command value for the electric motor 4, is decreasing may also be determined merely by comparing the target motor torque with a preceding value such as using Equation (9) discussed above.

To reduce the effect of noise or the like, it is also possible to determine whether the torque is decreasing on the basis of historical values that span target motor torques corresponding to three or more periods, as described below. The Equation (10) that was discussed above corresponds to an example in which values corresponding to six periods are used. Thus, it is further possible to determine whether the torque is decreasing in cases in which the target motor torque value continuously decreases over a plurality of calculation periods.

In step S225, the rotational speed Nm of the electric motor 4 detected by the motor rotational speed sensor 21 is subsequently received as an input, the target motor field current Ifm corresponding to the rotational speed Nm of the electric motor 4 is calculated, the target motor field current Ifm is outputted to the motor control section 8C, and the program then proceeds to step S290.

Here, the target motor field current Ifm corresponding to the rotational speed Nm of the electric motor 4 is held to a fixed prescribed current value when the rotational speed Nm is at or below a prescribed rotational speed, and the motor field current Ifm of the electric motor 4 is reduced by a known weak magnetic field control method when the electric motor 4 is rotating at or above a prescribed rotational speed. In short, when the electric motor 4 rotates at a high speed, the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque is obtained by reducing the field current Ifm of the electric motor 4 and lowering the induced voltage E. As a result, even if the electric motor 4 rotates at a high speed, the required motor torque can be obtained because the motor induced voltage E is kept from rising and the motor torque is prevented from decreasing. Also, the price of the electronic control circuit can be reduced in comparison with continuous field current control because the field current Ifm of the electric motor is controlled in two stages: a stage for when the rotational speed is below a prescribed value, and another stage for when the rotational speed is at or above a prescribed value.

It is also acceptable to provide a motor torque correcting section for continuously correcting the motor torque by adjusting the field current Ifm in accordance with the rotational speed Nm of the electric motor 4 with respect to the required motor torque. That is, instead of switching between two stages, the field current Ifm of the electric motor 4 can be adjusted in accordance with the motor rotational speed Nm. As a result, even if the electric motor 4 rotates at a high speed, the required motor torque can be obtained because the induced voltage E of the electric motor 4 is kept from rising and the motor torque is prevented from decreasing. Furthermore, since a smooth motor torque characteristic can be obtained, the vehicle can travel with better stability than in the case of two-stage control and can always be kept in a state where the motor driving efficiency is good.

Subsequently, in step S290, the corresponding target motor torque Tm(n) is calculated from a map or the like on the basis of the generator load torque Th calculated by the surplus torque computing section 8E, and the program of the 4WD controller 8 proceeds to step S295.

In step S295, the corresponding target armature current Ia is calculated on the basis of a map or the like by using the target motor torque Tm(n) and target motor field current Ifm as variables, and the 4WD controller 8 proceeds to step S310.

The 4WD controller 8 proceeds to step S230 if it is determined in step S210 that a transition is being made to a clutch-releasing two-wheel drive. In step S230, the 4WD controller 8 determines whether the field current Ifm is greater than an end-time field current value D−Ifm, and the 4WD controller 8 proceeds to step S240 if it is indeed so. The 4WD controller 8 proceeds to step S235 if the field current Ifm is equal to or less than the end-time field current value D−Ifm, the field current Ifm is kept at the end-time field current value D−Ifm, and the 4WD controller 8 then proceeds to step S300.

Here, the end-time field current value D−Ifm is the minimum field current value at which the electric motor 4 can generate a minute torque, and energy consumption can be reduced by maintaining such a low value in a two-wheel drive state. In the present embodiment, the end-time field current value D−Ifm is kept at 3.6 A. It is apparent that the end-time field current value D−Ifm may also be set greater than the minimum field current value at which the electric motor 4 can generate a minute torque.

It is determined in step S240 whether the accelerator position opening degree is less than 4% on the basis of a signal from an accelerator sensor, the program proceeds to step S250 if it is determined that the accelerator position opening degree is less then 4%, and the program proceeds to step S260 if this is not the case.

The phrase "the accelerator position opening degree is less than 4%" refers to an acceleration indicating amount sufficient to exclude the effect of the vehicle on the acceleration irrespective of whether the accelerator pedal is depressed or in a state in which it is not depressed.

In step S250, the field current Ifm is reduced at a first decrease rate Dif1, the field current Ifm is outputted to the motor control section 8C, and the program then proceeds to step S300.

In step S260, the field current Ifm is reduced at a second decrease rate Dif2, the field current Ifm is outputted to the motor control section 8C, and the program then proceeds to step S300.

Here, the second decrease rate Dif2 is set higher than the first decrease rate Dif1. The decrease rate of the field current value in the direction of the end-time field current value D−Ifm is thereby set higher, and the end-time field current value D−Ifm can be reached earlier when the accelerator position opening degree is less than 4%. The first decrease rate Dif1 can, for example, be set to a value at which the decrease rate of the field current value is 5 A/sec on the basis of a sampling time or the like.

[0046]

Although the above description was made with reference to a case in which the decrease rate of the field current Ifm was varied in two steps depending on whether the accelerator pedal was depressed or not (whether there was an efficient acceleration indication), it is also possible to use an arrangement in which the decrease rate of the field current Ifm is varied in three stages or in a greater number of stages, depending on the acceleration indicating amount. In addition, determining whether the accelerator position opening degree is less than 4% makes it possible to estimate the reduction in the generation capacity, so the program proceeds to step S250 if it is determined, for example, in step S240 on the basis of the rotational speed of the internal combustion engine 2, the rotational speed of the generator 7, or the like that the generation capacity is decreasing or there is a risk of such a decrease, and the program proceeds to step S260 if no such determination is made.

The 4WD controller 8 proceeds to step S310 after the clutch release processing section 8H is executed in step S300.

In step S310, the duty factor C1, which is a generator control command value, is calculated based on the target armature current Ia, the result is outputted, and the 4WD controller 8 then proceeds to the beginning.

Figure 26:
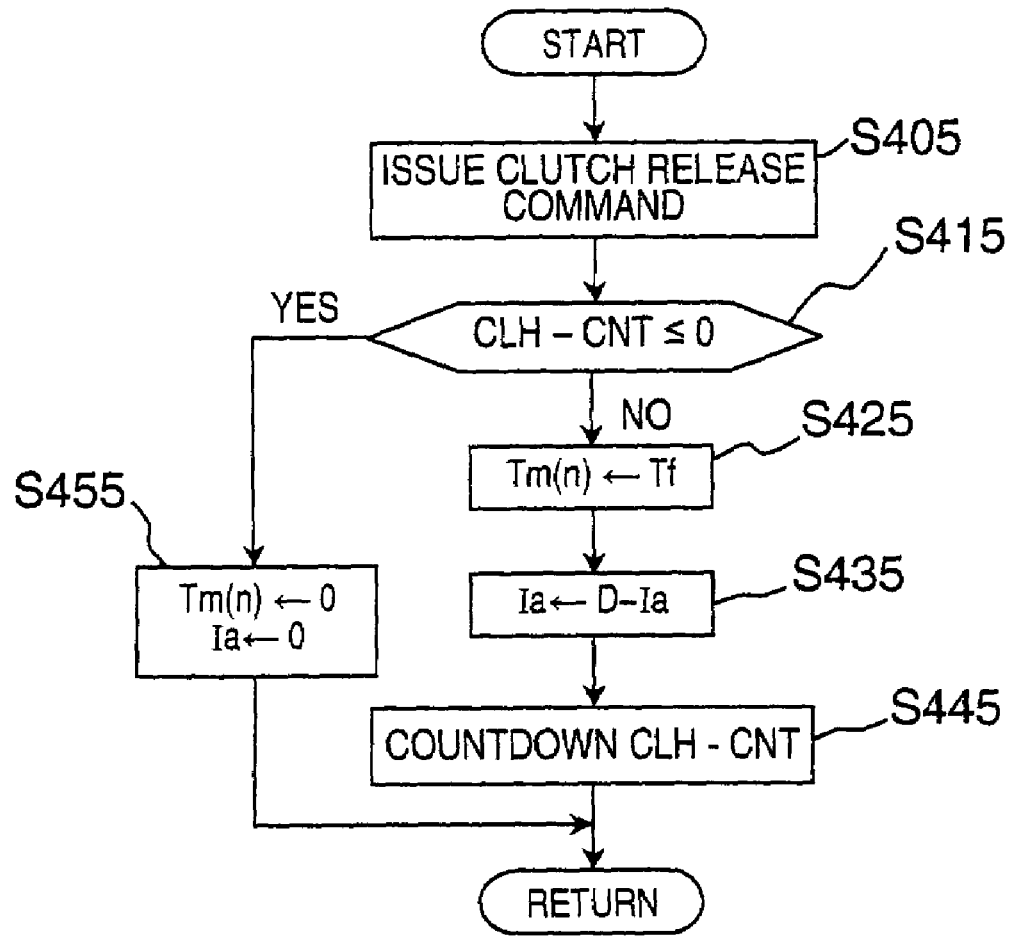
FIG. 26 is a diagram showing the processing executed by the clutch release processing section in accordance with the eighth embodiment based on the present invention.

The processing executed by the clutch release processing section 8H will be described next with reference to FIG. 26.

The clutch release processing section 8H operates during a transition to a two-wheel drive state, a clutch release command is first outputted in step S405, and the 4WD controller 8 then proceeds to step S415.

The 4WD controller 8 determines in step S410 whether a torque holding time counter CLH−CNT is zero or less. If the 4WD controller 8 determines that the torque holding time counter CLH−CNT is zero, then zero is substituted for the target motor torque Tm(n) in step S455 in order to no longer keep the motor torque constant. Moreover, in step S455, zero is also substituted for the target armature current Ia, and the 4WD controller 8 proceeds to the beginning of the program.

If, on the other hand, the torque holding time counter CLH−CNT is greater than zero, a substitution is made for the clutch release torque Tf in order to keep the target motor torque Tm(n) at the constant clutch release torque Tf. Also the target armature current Ia is subsequently substituted for the end-time armature current D−Ia in step S435, and the 4WD controller 8 proceeds to step S445.

Here, the torque holding time counter CLH−CNT is reset in the four-wheel drive state. The value that is set as the initial value for the torque holding time counter CLH−CNT is one at which the clutch 12 is reliably released when the variation component of the clutch response delay has been absorbed and the motor torque value brought to a constant level.

In step S445, the program of this section of the 4WD controller 8 is completed and returned to the beginning after the torque holding time counter CLH−CNT has been counted down.

Here, the clutch release processing section constitutes a clutch-release torque control section, and step S405 constitutes a clutch release section.

Next, the action and the like of the apparatus configured as described above will be explained.

When the torque transferred from the internal combustion engine 2 to the front wheels 1L and 1R is larger than the road surface reaction force limit torque, i.e., when acceleration slippage occurs in the front wheels 1L and 1R, which are the main drive wheels 1L and 1R, due to the road surface friction coefficient μ being small, or the driver depressing the accelerator pedal 17 too deeply, or the like, the clutch 12 is connected, a transition to a four-wheel drive state is made by having the generator 7 generate at a generator load torque Th corresponding to the magnitude of the acceleration slippage thereof, and a transition to a two-wheel drive state is subsequently made by adjusting the drive torque transferred to the front wheels 1L and 1R so as to approach the road surface reaction force limit torque of the front wheels 1L and 1R. This results in suppression of the acceleration slippage of the front wheels 1L and 1R, which are the main drive wheels.

Furthermore, the acceleration performance of the vehicle is improved by adopting an approach in which the surplus power generated by the generator 7 is used to drive the electric motor 4 as well as the rear wheels 3L and 3R, which are the subordinate drive wheels.

At this time, the energy efficiency is increased and fuel consumption improved because the electric motor 4 is driven by a surplus torque that has exceeded the road surface reaction force limit torque of the main drive wheels 1L, 1R.

Here, if the rear wheels 3L and 3R were always driven, several energy conversions (mechanical energy→electrical energy→mechanical energy) take place, creating energy losses that are proportional to the conversion efficiencies. Therefore, the acceleration performance of the vehicle would decline in comparison with a case where only the front wheels 1L and 1R were driven. Consequently, it is generally desired that driving of the rear wheels 3L and 3R be suppressed. By contrast, this embodiment takes into consideration the fact that when traveling on a slippery road surface or the like, even if all of the output torque Te of the internal combustion engine 2 is transferred to the front wheels 1L and 1R, not all of the torque will be used as driving force. The driving force that cannot be utilized efficiently by the front wheels 1L and 1R is outputted to the rear wheels 3L and 3R, and the acceleration performance is improved.

In addition, accelerator slippage occurs as described above, and the clutch 12 is connected to establish a four-wheel drive state, whereupon the motor torque is continuously reduced as the acceleration slippage is reduced. Generation of shocks during clutch release can be reliably prevented as a result of the fact that the motor torque value during the actual clutch release can be kept substantially at the clutch release torque Tf, even when the response delay time of the clutch 12 fluctuates somewhat due to temperature and other factors, by adopting an approach in which the motor torque is controlled to become the clutch release torque Tf (=0.5), and the actual motor torque values before and after the clutch 12 is actually released are kept at a constant torque substantially equal to the clutch release torque Tf when it is determined that a transition is made from a four-wheel drive state to a two-wheel drive state.

Figure 27:
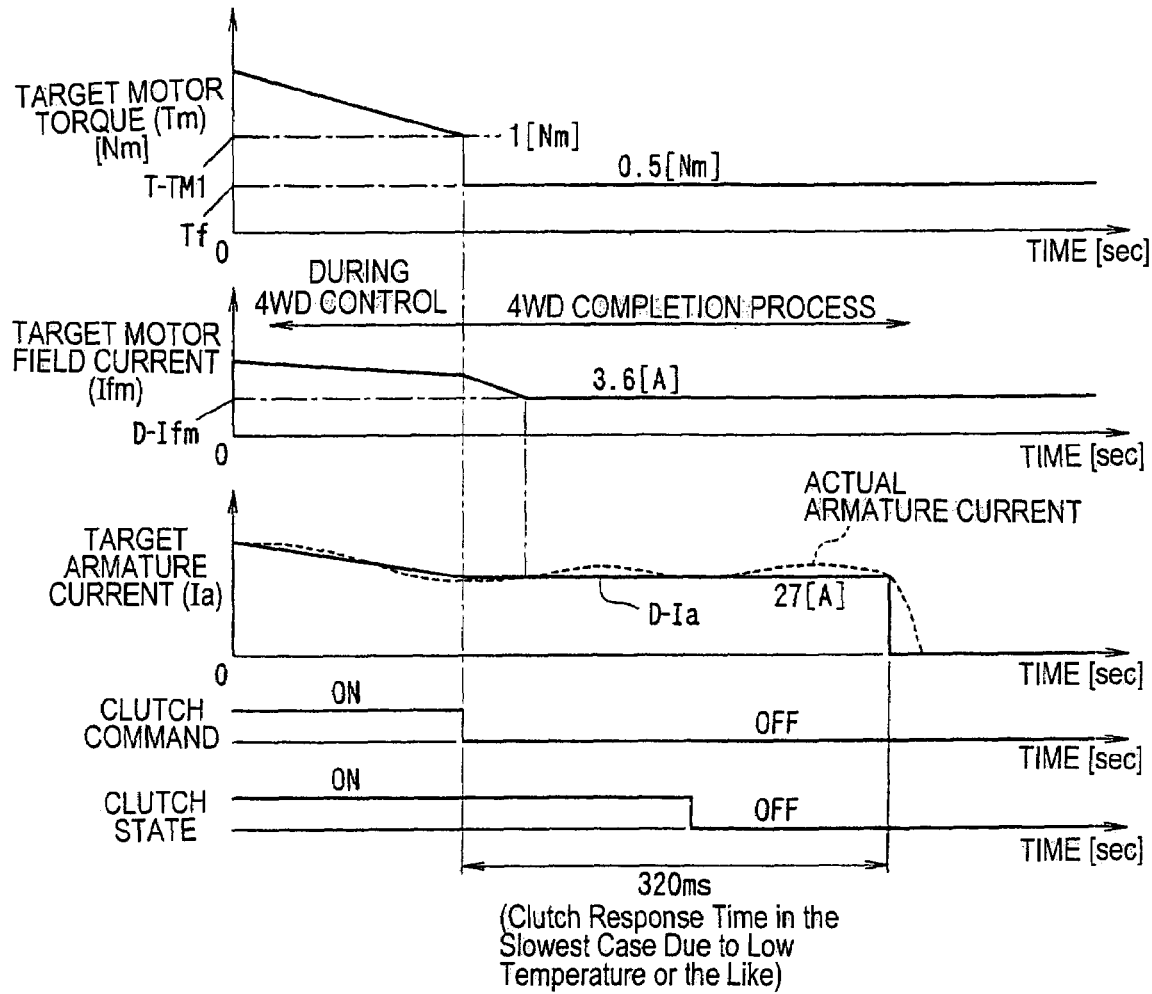
FIG. 27 is a diagram showing the time charts for a transition to a two-wheel drive state in accordance with the eighth embodiment based on the present invention.

The target armature current value existing at the time it is determined that a transition is made to a two-wheel drive state can be brought closer to an end-time armature current D–Ia at which the motor torque becomes the clutch release torque Tf (=0.5 Nm) by adopting an approach in which the transition from a four-wheel drive state to a two-wheel drive state is determined based on the fact that the motor torque is continuously decreasing and the motor torque assumes a torque value of 1 Nm or less, as shown in FIG. 27.

Specifically, in the exemplary time charts shown in FIG. 27, the armature current value at the time it is determined that a transition is made to a two-wheel drive state is 30 A, which is a value that is close to the end-time armature current D–Ia (=27 A), thus making it easier to minimize variations in the actual armature current value and keeping the motor torque during the actual clutch release substantially equal to the clutch release torque Tf.

Figure 28:
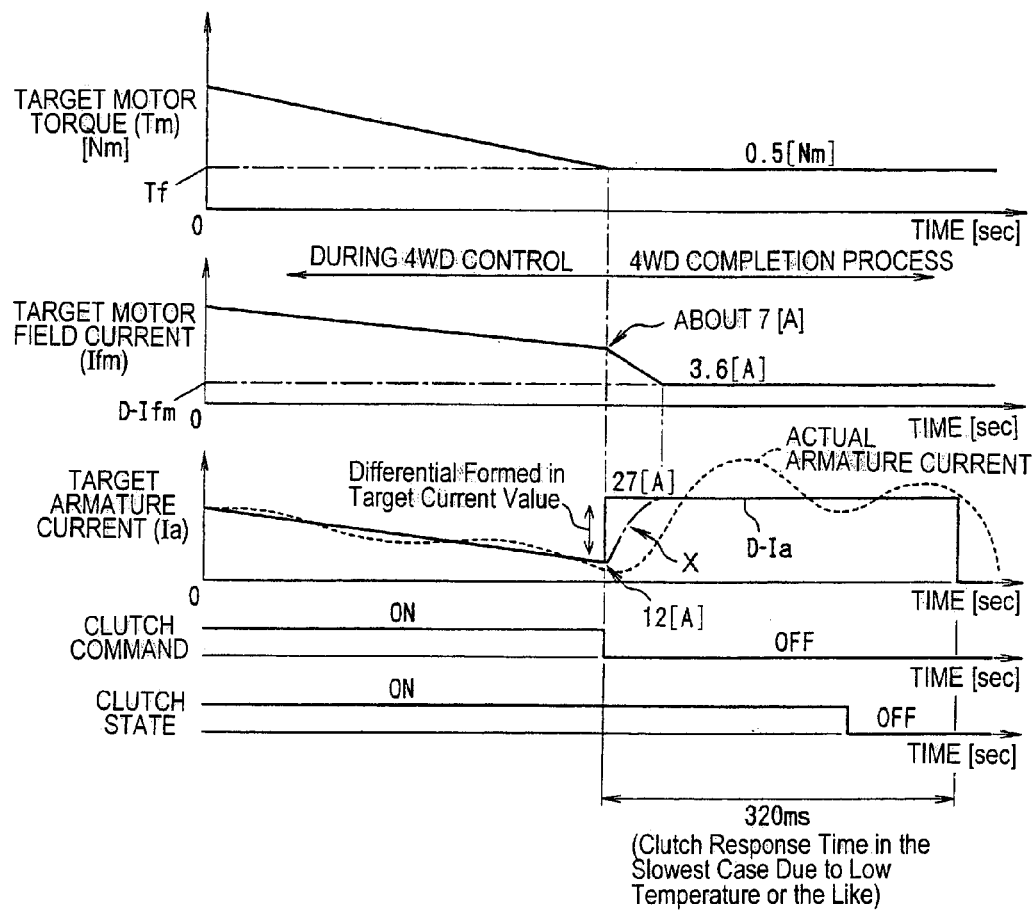
FIG. 28 is a diagram showing time charts for the transition to a two-wheel drive state in accordance with a comparative example.

Here, FIG. 28 shows exemplary time charts that serve as the comparative examples of a case in which it is determined that a transition is made to a two-wheel drive state at the time the target motor torque becomes the clutch release torque Tf.

In the case shown in FIG. 28, variations occurring in the actual armature current and in the actual motor torque during the processing of a transfer to a two-wheel drive state increase over those observed in the present embodiment if it is assumed that the armature current value becomes the end-time armature current D–Ia the moment the target motor torque is determined to be the clutch release torque Tf because the armature current value has assumed a value (about 12 A) less than the end-time armature current D–Ia, based on the relation that the motor field current becomes greater than the end-time field current value D–Ifm at the time the target motor torque is determined to be the clutch release torque Tf.

The reason that the field current decreases at a prescribed gradient to the desired end-time field current value D–Ifm in FIG. 28 is that peaked variations occur in the actual armature current if the motor field current Ifm is set to the end-time field current value D–Ifm immediately after it is determined that a transfer is made to a two-wheel drive state.

Although it is suggested that the target armature current is controlled such that the motor torque becomes the clutch release torque Tf in agreement with the target motor field current Ifm when the motor torque is kept constant at the clutch release torque Tf (the target armature current increases in accordance with the reduction of the target motor field current Ifm in the direction of the end-time field current value D–Ifm, as shown by the dashed line (symbol X) in FIG. 28), a more rapid convergence to the actual armature current value can be ensured by setting the target armature current value to the end-time armature current D–Ia immediately after it is determined that a transition is made to a two-wheel drive state, as described above.

Also in the eighth embodiment, a difference in level that is equal to or greater than a predetermined value exists between the target motor field current Ifm and the end-time field current value D–Ifm when the target armature current value is set to the end-time armature current D–Ia immediate after it is determined that a transfer is made to a two-wheel drive state, but this difference does not pose a problem because the end-time field current value D–Ifm must be gradually approached, as described above.

Also in the eighth embodiment, the motor torque value at which the armature current becomes the end-time armature current value D–Ia with a high frequency is found in advance and set as a prescribed threshold T–TM1 in the determination made during a transition from a four-wheel drive state to a two-wheel drive state, but this option is non-limiting. It is also possible, for example to stabilize the transition from a four-wheel drive state to a two-wheel drive state by monitoring the armature current of the electric motor and detecting the fact that the armature current has become the end-time armature current D–Ia.

Figure 29:
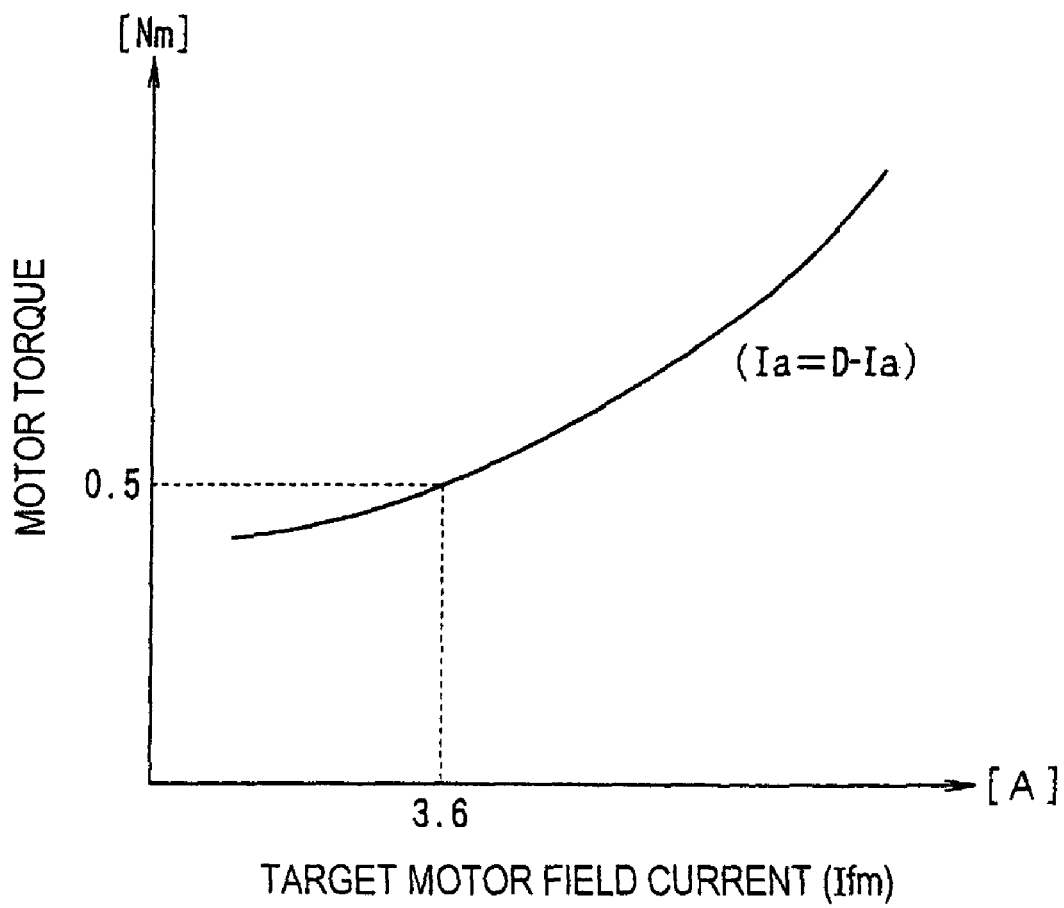
FIG. 29 is a diagram showing the relation between the field current value and motor torque for a case in which the armature current is set to the end-time armature current value.

It is also possible to determine that a transition is made from a four-wheel drive state to a two-wheel drive state by adopting an approach in which the relation between the target motor torque Tm and the target motor field current Ifm whereby the end-time armature current D–Ia is reached is found in advance in the manner shown in FIG. 29. Here the motor field current is monitored, the deviation is found between the motor torque found from FIG. 29 and the target motor torque existing at this time, and this deviation is kept within a prescribed range.

In the eighth embodiment, the target motor field current Ifm is controlled in two steps in accordance with the motor rotational speed, as in the map shown in step S220, so it is possible to preset the prescribed threshold torque T–TM1 to two units of the target motor field current Ifm, and to use of the two prescribed threshold torques T–TM1 in accordance with the motor rotational speed.

In the aforementioned case as well, the premise is that the motor torque is decreasing (in order to exclude the period of transition from a two-wheel drive state to a four-wheel drive state).

Also in the eighth embodiment, the clutch release torque Tf was assumed to be constant as "the torque $Tf_1$ for the friction of the electric motor and the reduction gear," which is the value of the steady-state travel (zero acceleration), but this option is non-limiting. Modifications may also be made based on the acceleration (negative acceleration in the case of deceleration) of the rear wheels or the vehicle body.

The eighth embodiment was described above with reference to a case in which the electric motor 4 was driven by a voltage generated by the generator 7, and a four-wheel drive was configured, but this option is non-limiting. This embodiment is also applicable to a system comprising a battery capable of supplying electrical power to the electric motor 4. In this case, minute amounts of electrical power may be supplied from the battery, or the battery supply may be combined with the supply of electrical power from the generator 7.

In the above-described embodiment, an internal combustion engine was cited as an example of the main drive source, but the main drive source may also comprise an electric motor.

Also, the above system was described with reference to a case in which the transition to a four-wheel drive state was performed in accordance with the acceleration slippage of the front wheels, but it is also possible to use a system in which the transition to a four-wheel drive state is performed in accordance with the accelerator position opening degree or the like.

In each of the above embodiments, the term "clutch-release torque", as used herein, is regarded as the sum of "the torque component corresponding to the friction component in the electric motor and in the torque transfer path from the electric motor to the clutch" and "the torque component that is required to accelerate the clutch input side equally with the subordinate drive wheels." Therefore, the clutch-release torque becomes a torque that corresponds to the friction component in the electric motor and in the torque transfer path from the electric motor to the clutch when the rear wheels rotate at equal speed.

Also as used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

In each of the above embodiments, the term "configured" as used herein to describe a component, section or part of a device includes hardware and/or software that is constructed and/or programmed to carry out the desired function. Moreover, in each of the above embodiments, terms that are expressed as "means-plus function" in the claims should include any structure that can be utilized to carry out the function of that part of the present invention. Also in each of the above embodiments, the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2002-245566, 2002-245567, 2002-247553, 2002-291240 and 2002-291866. The entire disclosures of Japanese Patent Application Nos. 2002-245566, 2002-245567, 2002-247553, 2002-291240 and 2002-291866 are all hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus for a vehicle comprising:
    a main drive source configured and arranged to supply a main drive wheel with a drive torque;
    a subordinate drive source configured and arranged to supply a subordinate drive wheel with a drive torque;
    a clutch disposed in a torque transfer path from the subordinate drive source to the subordinate drive wheel;
    a transition determining section configured to output a transition determination upon determining a transition condition indicating cease of the drive torque from the subordinate drive source to the subordinate drive wheel, while the vehicle is traveling; and
    a clutch release section configured to disengage the clutch, upon the drive torque of the subordinate drive source substantially reaching a target drive torque in which a difference between an output torque of the clutch and an input torque of the clutch is smaller than a prescribed value in response to the transition determination by the transition determining section.

2. The vehicle driving force control apparatus as recited in claim 1, wherein
    the prescribed value is substantially equal to zero.

3. The vehicle driving force control apparatus as recited in claim 1, further comprising
    a drive torque control section configured to adjust the target drive torque in response to the transition determination by the transition determining section.

4. The vehicle driving force control apparatus as recited in claim 3, wherein
    the drive torque control section is further configured to substantially maintain the drive torque of the subordinate drive source substantially at the target drive torque at least during a delay period after issuance of a control command to release the clutch and until the clutch is released.

5. The vehicle driving force control apparatus as recited in claim 3, wherein
    the drive torque control section is further configured to substantially maintain the drive torque of the subordinate drive source substantially at the target drive torque at issuance of a control command to release the clutch and until the clutch is released.

6. The vehicle driving force control apparatus as recited in claim 3, wherein
    the drive torque control section is further configured to substantially maintain the drive torque of the subordinate drive source substantially at the target drive torque prior to start of a release operation of the clutch and until the clutch is released.

7. The vehicle driving force control apparatus as recited in claim 3, wherein
    the drive torque control section starts the clutch disengagement operation, upon the drive torque of the subordinate drive source substantially reaching the target drive torque.

8. The vehicle driving force control apparatus as recited in claim 3, wherein
    the drive torque control section is further configured to reduce the drive torque of the subordinate drive source within a reduction range that the drive torque of the subordinate drive source can be stably controlled when the drive torque of the subordinate drive source is larger than the target drive torque after the transition determination by the transition determining section to cease the drive torque of the subordinate drive source to the subordinate drive wheel until the clutch is released.

9. The vehicle driving force control apparatus as recited in claim 8, wherein
the drive torque control section is further configured to reduce the drive torque of the subordinate drive source within the reduction range at a predetermined reduction rate.

10. The vehicle driving force control apparatus as recited in claim 8, wherein
the drive torque control section is further configured to reduce the drive torque of the subordinate drive source until the clutch is released by controlling a field current of an electric motor of the subordinate drive source of the vehicle to a predetermined field current value.

11. The vehicle driving force control apparatus as recited in claim 10, wherein
the drive torque control section is further configured to setting an armature current command value of an armature current of the subordinate drive source to substantially equal a predetermined end-time armature current value that the subordinate drive source requires to output the target drive torque when the field current of the subordinate drive source is substantially equal to the predetermined field current value.

12. The vehicle driving force control apparatus as recited in claim 9, wherein
the clutch release section is further configured to set the target drive torque based on a generation capacity of a generator that supplies electricity to an electric motor of the subordinate drive source.

13. The vehicle driving force control apparatus as recited in claim 9, wherein
the drive torque control section is further configured to set the target drive torque based on a generation capacity of a generator that supplies electricity to an electric motor of the subordinate drive source prior to the transition determination by the transition determining section.

14. The vehicle driving force control apparatus as recited in claim 3, further comprising
an output torque control section configured to control a driving torque of a secondary driving source to a target drive torque command value;
a generation capacity reduction detection section configured to detect whether an electrical capacity of a power source to supply power to the subordinate drive source decreases to an insufficient power state in which the power source cannot supply sufficient power to output the driving torque of the secondary driving source to a level substantially equal to the target drive torque command value; and
an output torque command limiting section configured to limit the target drive torque command value, when the transition determining section determines the transition condition indicating cease of the drive torque of the subordinate drive source to the subordinate drive wheel, based on detecting that the drive torque of the subordinate drive source is decreasing, and when the generation capacity reduction detection section detects that the electrical capacity decreases to the insufficient power state, while the vehicle is traveling.

15. The vehicle driving force control apparatus as recited in claim 14, wherein
the output torque control section is further configured to reduce the target drive torque command value at a prescribed reduction rate, when the transition determining section detects that the drive torque of the subordinate drive source is decreasing, and when the generation capacity reduction detection section detects that the generation capacity decreases to the insufficient power state, while the vehicle is traveling; and
the output torque command limiting section is further configured to control the target drive torque command value by increasing the prescribed reduction rate, when the generation capacity reduction detection section detects that the generation capacity decreases to the insufficient power state.

16. The vehicle driving force control apparatus as recited in claim 14, wherein
the generation capacity reduction detection section is further configured to determine that the generation capacity decreases, based on detecting an upshift in an automatic transmission of the vehicle provided between the main drive source and the main drive wheel.

17. The vehicle driving force control apparatus as recited in claim 14, wherein
the generation capacity reduction detection section is further configured to determine that the generation capacity decreases, when a rotational speed of a generator of the power source is detected to be below a prescribed rotational speed.

18. The vehicle driving force control apparatus as recited in claim 14, wherein
the generation capacity reduction detection section is further configured to determine that the generation capacity decreases, when a rotational speed of the main drive source is detected to be below a prescribed rotational speed.

19. The vehicle driving force control apparatus as recited in claim 8, wherein
the drive torque control section is further configured to control the drive torque of the subordinate drive source within the reduction range at a first predetermined reduction rate during a first control period and at a second predetermined reduction rate during a second control period before the clutch is released.

20. The vehicle driving force control apparatus as recited in claim 19, wherein
the drive torque control section is further configured to control the drive torque of the subordinate drive source during the first and second periods after issuance of a control command to release the clutch.

21. The vehicle driving force control apparatus as recited in claim 19, wherein
the drive torque control section is further configured to control the drive torque of the subordinate drive source such that the second predetermined reduction rate during the second period maintains the drive torque substantially constant before the clutch is released.

22. The vehicle driving force control apparatus as recited in claim 21, wherein
the drive torque control section is further configured to reduce the drive torque of the subordinate drive source to the clutch such that the drive torque of the subordinate drive source is controlled to substantially equal the target drive torque by controlling a field current command value of the field current of the subordinate drive source to a predetermined field current value.

23. The vehicle driving force control apparatus as recited in claim 22, wherein
the drive torque control section is further configured to setting an armature current command value of an armature current of the subordinate drive source to substantially equal a predetermined end-time armature current value that the subordinate drive source requires to output the target drive torque when the field current of the subordinate drive source is substantially equal to the predetermined field current value.

24. The vehicle driving force control apparatus as recited in claim 3, wherein
the drive torque control section is further configured to control the drive torque of the subordinate drive source until the clutch is released by controlling a field current of a power source of the subordinate drive source of the vehicle to a predetermined value.

25. The vehicle driving force control apparatus as recited in claim 3, wherein
the drive torque control section is further configured to reduce the drive torque of the subordinate drive source to the clutch such that the drive torque of the subordinate drive source is an output motor torque of a power source which is controlled to substantially equal the target drive torque by controlling a field current command value of the field current of the power source to a predetermined field current value.

26. The vehicle driving force control apparatus as recited in claim 3, wherein
the drive torque control section is further configured to control the drive torque of the subordinate drive source until the clutch is released by setting an armature current command value of an armature current of an electric motor substantially equal to an end-time armature current value immediately after the transition determining section outputs the transition determination.

27. The vehicle driving force control apparatus as recited in claim 3, wherein
the clutch release section is further configured to estimate a convergence time for fluctuations in the drive torque of the subordinate drive source to converge within a prescribed allowable range, and output a command value for releasing the clutch such that the clutch is released after the convergence time has elapsed based on the estimate.

28. The vehicle driving force control apparatus as recited in claim 1, further comprising
a clutch-release torque correction section configured to correct the target drive torque in accordance with a vehicle body acceleration of the vehicle.

29. The vehicle driving force control apparatus as recited in claim 1, wherein
the transition determining section is further configured to determine the transition condition indicating cease of the drive torque of the subordinate drive source to the subordinate drive wheel based on determining that the drive torque of the subordinate drive source is decreasing, while the vehicle is traveling.

30. The vehicle driving force control apparatus as recited in claim 1, wherein
the transition determining section is further configured to determine the transition condition indicating cease of the drive torque of the subordinate drive source to the subordinate drive wheel based on detecting a field current value of the subordinate drive source that corresponds to the drive torque at which an armature current value of the drive torque become equal to a predetermined end-time armature current value, while the vehicle is traveling.

31. The vehicle driving force control apparatus as recited in claim 1, wherein
the transition determining section is further configured to determine the transition condition indicating cease of the drive torque of the subordinate drive source to the subordinate drive wheel based on detecting a prescribed motor torque of the subordinate drive source that corresponds to the drive torque at which an armature current value to become equal to a predetermined end-time armature current value, while the vehicle is traveling.

32. The vehicle driving force control apparatus as recited in claim 1, wherein
the transition determining section is further configured to determine the transition condition indicating cease of the drive torque of the subordinate drive source to the subordinate drive wheel based on detecting an armature current value of the subordinate drive source that corresponds to a predetermined end-time armature current value, while the vehicle is traveling.

33. The vehicle driving force control apparatus as recited in claim 1, wherein
the transition determining section is further configured to determine the transition condition indicating cease of the drive torque of the subordinate drive source to the subordinate drive wheel based on detecting that the drive torque of the subordinate drive source has substantially reached the target drive torque, while the vehicle is traveling.

34. The vehicle driving force control apparatus as recited in claim 1, further comprising
an electric motor that forms part of the subordinate drive source.

35. The vehicle driving force control apparatus as recited in claim 34, wherein
the prescribed value is substantially equal to zero.

36. The vehicle driving force control apparatus as recited in claim 34, further comprising
a drive torque control section configured to adjust the target drive torque in response to the transition determination by the transition determining section.

37. The vehicle driving force control apparatus as recited in claim 36, wherein
the drive torque control section is further configured to substantially maintain the drive torque of the electric motor substantially at the target drive torque at least during a delay period after issuance of a control command to release the clutch and until the clutch is released.

38. The vehicle driving force control apparatus as recited in claim 36, wherein
the drive torque control section is further configured to substantially maintain the drive torque of the electric motor substantially at the target drive torque at issuance of a control command to release the clutch and until the clutch is released.

39. The vehicle driving force control apparatus as recited in claim 36, wherein
the drive torque control section is further configured to substantially maintain the drive torque of the electric motor substantially at the target drive torque prior to start of a release operation of the clutch and until the clutch is released.

40. The vehicle driving force control apparatus as recited in claim 36, wherein
the drive torque control section starts the clutch disengagement operation, upon the drive torque of the electric motor substantially reaching the target drive torque.

41. The vehicle driving force control apparatus as recited in claim 36, wherein
the drive torque control section is further configured to reduce the drive torque of the electric motor within a reduction range that the drive torque of the electric motor can be stably controlled when the drive torque of the electric motor is larger than the target drive torque after the transition determination by the transition determining section to cease the drive torque of the electric motor to the subordinate drive wheel until the clutch is released.

42. The vehicle driving force control apparatus as recited in claim 41, wherein
the drive torque control section is further configured to reduce the drive torque of the electric motor within the reduction range at a predetermined reduction rate.

43. The vehicle driving force control apparatus as recited in claim 41, wherein
the drive torque control section is further configured to reduce the drive torque of the electric motor until the clutch is released by controlling a field current of the electric motor of the vehicle to a predetermined field current value.

44. The vehicle driving force control apparatus as recited in claim 43, wherein
the drive torque control section is further configured to setting an armature current command value of an armature current of the electric motor to substantially equal a predetermined end-time armature current value that the electric motor requires to output the target drive torque when the field current of the electric motor is substantially equal to the predetermined field current value.

45. The vehicle driving force control apparatus as recited in claim 42, wherein
the clutch release section is further configured to set the target drive torque based on a generation capacity of a generator that supplies electricity to the electric motor.

46. The vehicle driving force control apparatus as recited in claim 42, wherein
the drive torque control section is further configured to set the target drive torque based on a generation capacity of a generator that supplies electricity to the electric motor prior to the transition determination by the transition determining section.

47. The vehicle driving force control apparatus as recited in claim 36, further comprising
an output torque control section configured to control a driving torque of a secondary driving source to a target drive torque command value;
a generation capacity reduction detection section configured to detect whether a electrical capacity of a power source to supply power to the electric motor decreases to an insufficient power state in which the power source cannot supply sufficient power to output the driving torque of the secondary driving source to a level substantially equal to the target drive torque command value; and
an output torque command limiting section configured to limit the target drive torque command value, when the transition determining section determines the transition condition indicating cease of the drive torque of the electric motor to the subordinate drive wheel, based on detecting that the drive torque of the electric motor is decreasing, and when the generation capacity reduction detection section detects that the electrical capacity decreases to the insufficient power state, while the vehicle is traveling.

48. The vehicle driving force control apparatus as recited in claim 47, wherein
the output torque control section is further configured to reduce the target drive torque command value at a prescribed reduction rate, when the transition determining section detects that the drive torque of the electric motor is decreasing, and when the generation capacity reduction detection section detects that the generation capacity decreases to the insufficient power state, while the vehicle is traveling; and
the output torque command limiting section is further configured to control the target drive torque command value by increasing the prescribed reduction rate, when the generation capacity reduction detection section detects that the generation capacity decreases to the insufficient power state.

49. The vehicle driving force control apparatus as recited in claim 47, wherein
the generation capacity reduction detection section is further configured to determine that the generation capacity decreases, based on detecting an upshift in an automatic transmission of the vehicle provided between the electric motor and the subordinate drive wheel.

50. The vehicle driving force control apparatus as recited in claim 47, wherein
the generation capacity reduction detection section is further configured to determine that the generation capacity decreases, when a rotational speed of a generator of the power source is detected to be below a prescribed rotational speed.

51. The vehicle driving force control apparatus as recited in claim 47, wherein
the generation capacity reduction detection section is further configured to determine that the generation capacity decreases, when a rotational speed of the electric motor is detected to be below a prescribed rotational speed.

52. The vehicle driving force control apparatus as recited in claim 41, wherein
the drive torque control section is further configured to control the drive torque of the electric motor within the reduction range at a first predetermined reduction rate during a first control period and at a second predetermined reduction rate during a second control period before the clutch is released.

53. The vehicle driving force control apparatus as recited in claim 52, wherein
the drive torque control section is further configured to control the drive torque of the electric motor during the first and second periods after issuance of a control command to release the clutch.

54. The vehicle driving force control apparatus as recited in claim 52, wherein
the drive torque control section is further configured to control the drive torque of the electric motor such that the second predetermined reduction rate during the second period maintains the drive torque substantially constant before the clutch is released.

55. The vehicle driving force control apparatus as recited in claim 54, wherein the drive torque control section is further configured to reduce the drive torque of the electric motor to the clutch such that the drive torque of the electric motor is controlled to substantially equal the target drive torque by controlling a field current command value of the field current of the electric motor to the predetermined field current value.

56. The vehicle driving force control apparatus as recited in claim 55, wherein
the drive torque control section is further configured to setting an armature current command value of an armature current of the electric motor to substantially equal a predetermined end-time armature current value that the electric motor requires to output the target drive torque when the field current of the electric motor is substantially equal to the predetermined field current value.

57. The vehicle driving force control apparatus as recited in claim 36, wherein
the drive torque control section is further configured to control the drive torque of the electric motor until the clutch is released by controlling a field current of a power source of the electric motor of the vehicle to a predetermined value.

58. The vehicle driving force control apparatus as recited in claim 36, wherein
the drive torque control section is further configured to reduce the drive torque of the electric motor to the clutch such that the drive torque of the electric motor is an output motor torque of a power source which is controlled to substantially equal the target drive torque by controlling a field current command value of the field current of the power source to a predetermined field current value.

59. The vehicle driving force control apparatus as recited in claim 36, wherein
the drive torque control section is further configured to control the drive torque of the electric motor until the clutch is released by setting an armature current command value of am armature current of an electric motor substantially equal to an end-time armature current value immediately after the transition determining section outputs the transition determination.

60. The vehicle driving force control apparatus as recited in claim 36, wherein
the clutch release section is further configured to estimate a convergence time for fluctuations in the drive torque of the electric motor to converge within a prescribed allowable range, and output a command value of the clutch release such that the clutch is released after the convergence time has elapsed based on the estimate.

61. The vehicle driving force control apparatus as recited in claim 34, further comprising
a clutch-release torque correction section configured to correct the target drive torque in accordance with a vehicle body acceleration of the vehicle.

62. The vehicle driving force control apparatus as recited in claim 34, wherein
the transition determining section is further configured to determine the transition condition indicating cease of the drive torque of the electric motor to the subordinate drive wheel based on determining that the drive torque of the electric motor is decreasing, while the vehicle is traveling.

63. The vehicle driving force control apparatus as recited in claim 34, wherein
the transition determining section is further configured to determine the transition condition indicating cease of the drive torque of the electric motor to the subordinate drive wheel based on detecting a field current value of the electric motor that corresponds to the drive torque at which an armature current value of the drive torque become equal to a predetermined end-time armature current value, while the vehicle is traveling.

64. The vehicle driving force control apparatus as recited in claim 34, wherein
the transition determining section is further configured to determine the transition condition indicating cease of the drive torque of the electric motor to the subordinate drive wheel based on detecting a prescribed motor torque of the electric motor that corresponds to the drive torque at which an armature current value to become equal to a predetermined end-time armature current value, while the vehicle is traveling.

65. The vehicle driving force control apparatus as recited in claim 34, wherein
the transition determining section is further configured to determine the transition condition indicating cease of the drive torque of the electric motor to the subordinate drive wheel based on detecting an armature current value of the electric motor that corresponds to a predetermined end-time armature current value, while the vehicle is traveling.

66. The vehicle driving force control apparatus as recited in claim 34, wherein
the transition determining section is further configured to determine the transition condition indicating cease of the drive torque of the electric motor to the subordinate drive wheel based on detecting that the drive torque of the electric motor has substantially reached the target drive torque, while the vehicle is traveling.

67. The vehicle driving force control apparatus as recited in claim 1, further comprising
a drive mode selection section configured to select between a multi-wheel drive mode and a non-all wheel drive mode, the multi-wheel drive mode driving at least the subordinate drive wheel by the subordinate drive source through engagement of the clutch and the main drive wheel independently of engagement of the clutch, and the non-all wheel drive mode disengaging the subordinate drive wheel from the subordinate drive source through disengagement of the clutch and driving the main drive wheel.

68. The vehicle driving force control apparatus as recited in claim 67, further comprising
an acceleration slippage detection section configured to detect if acceleration slippage is occurring in the main drive wheel that is driven by the main drive source; and
the drive mode selection section being configured to select between the multi-wheel drive mode and the non-all wheel drive mode based on detection of acceleration slippage by the acceleration slippage detection section.

69. The vehicle driving force control apparatus as recited in claim 67, wherein
the drive mode selection section includes a drive mode switch to manually select one of the multi-wheel drive mode and the non-all wheel drive mode.

70. The vehicle driving force control apparatus according to claim 67, wherein
an electric motor forms part of the subordinate drive source.

71. The vehicle driving force control apparatus according to claim 70, wherein
the electric motor is driven by a generator being driven by an internal combustion engine that forms part of the main drive source.

72. The vehicle driving force control apparatus as recited in claim 67, wherein
the prescribed value is substantially equal to zero.

73. The vehicle driving force control apparatus as recited in claim 67, further comprising
a drive torque control section configured to adjust the target drive torque in response to the transition determination by the transition determining section.

74. The vehicle driving force control apparatus as recited in claim 73, wherein
the drive torque control section is further configured to substantially maintain the drive torque of the subordinate drive source substantially at the target drive torque at least during a delay period after issuance of a control command to release the clutch and until the clutch is released.

75. The vehicle driving force control apparatus as recited in claim 73, wherein
the drive torque control section is further configured to substantially maintain the drive torque of the subordinate drive source substantially at the target drive torque at issuance of a control command to release the clutch and until the clutch is released.

76. The vehicle driving force control apparatus as recited in claim 73, wherein
the drive torque control section is further configured to substantially maintain the drive torque of the subordinate drive source substantially at the target drive torque prior to start of a release operation of the clutch and until the clutch is released.

77. The vehicle driving force control apparatus as recited in claim 73, wherein
the drive torque control section starts the clutch disengagement operation, upon the drive torque of the subordinate drive source substantially reaching the target drive torque.

78. The vehicle driving force control apparatus as recited in claim 73, wherein
the drive torque control section is further configured to reduce the drive torque of the subordinate drive source within a reduction range that the drive torque of the subordinate drive source can be stably controlled when the drive torque of the subordinate drive source is larger than the target drive torque after the transition determination by the transition determining section to cease the drive torque of the subordinate drive source to the subordinate drive wheel until the clutch is released.

79. The vehicle driving force control apparatus as recited in claim 78, wherein
the drive torque control section is further configured to reduce the drive torque of the subordinate drive source within the reduction range at a predetermined reduction rate.

80. The vehicle driving force control apparatus as recited in claim 78, wherein
the drive torque control section is further configured to reduce the drive torque of the subordinate drive source until the clutch is released by controlling a field current of an electric motor of the subordinate drive source of the vehicle to a predetermined field current value.

81. The vehicle driving force control apparatus as recited in claim 80, wherein
the drive torque control section is further configured to setting an armature current command value of an armature current of the subordinate drive source to substantially equal a predetermined end-time armature current value that the subordinate drive source requires to output the target drive torque when the field current of the subordinate drive source is substantially equal to the predetermined field current value.

82. The vehicle driving force control apparatus as recited in claim 79, wherein
the clutch release section is further configured to set the target drive torque based on a generation capacity of a generator that supplies electricity to an electric motor of the subordinate drive source.

83. The vehicle driving force control apparatus as recited in claim 79, wherein
the drive torque control section is further configured to set the target drive torque based on a generation capacity of a generator that supplies electricity to an electric motor of the subordinate drive source prior to the transition determination by the transition determining section.

84. The vehicle driving force control apparatus as recited in claim 73, further comprising
an output torque control section configured to control a driving torque of a secondary driving source to a target drive torque command value;
a generation capacity reduction detection section configured to detect whether a electrical capacity of a power source to supply power to the subordinate drive source decreases to an insufficient power state in which the power source cannot supply sufficient power to output the driving torque of the secondary driving source to a level substantially equal to the target drive torque command value; and
an output torque command limiting section configured to limit the target drive torque command value, when the transition determining section determines the transition condition indicating cease of the drive torque of the subordinate drive source to the subordinate drive wheel, based on detecting that the drive torque of the subordinate drive source is decreasing, and when the generation capacity reduction detection section detects that the electrical capacity decreases to the insufficient power state, while the vehicle is traveling.

85. The vehicle driving force control apparatus as recited in claim 84, wherein
the output torque control section is further configured to reduce the target drive torque command value at a prescribed reduction rate, when the transition determining section detects that the drive torque of the subordinate drive source is decreasing, and when the generation capacity reduction detection section detects that the generation capacity decreases to the insufficient power state, while the vehicle is traveling; and
the output torque command limiting section is further configured to control the target drive torque command value by increasing the prescribed reduction rate, when the generation capacity reduction detection section detects that the generation capacity decreases to the insufficient power state.

86. The vehicle driving force control apparatus as recited in claim 84, wherein
the generation capacity reduction detection section is further configured to determine that the generation capacity decreases, based on detecting an upshift in an automatic transmission of the vehicle provided between the main drive source and the main drive wheel.

87. The vehicle driving force control apparatus as recited in claim 84, wherein
the generation capacity reduction detection section is further configured to determine that the generation capacity decreases, when a rotational speed of a generator of the power source is detected to be below a prescribed rotational speed.

88. The vehicle driving force control apparatus as recited in claim 84, wherein
the generation capacity reduction detection section is further configured to determine that the generation capacity decreases, when a rotational speed of the main drive source is detected to be below a prescribed rotational speed.

89. The vehicle driving force control apparatus as recited in claim 78, wherein
the drive torque control section is further configured to control the drive torque of the subordinate drive source within the reduction range at a first predetermined reduction rate during a first control period and at a second predetermined reduction rate during a second control period before the clutch is released.

90. The vehicle driving force control apparatus as recited in claim 89, wherein
the drive torque control section is further configured to control the drive torque of the subordinate drive source during the first and second periods after issuance of a control command to release the clutch.

91. The vehicle driving force control apparatus as recited in claim 89, wherein
the drive torque control section is further configured to control the drive torque of the subordinate drive source such that the second predetermined reduction rate during the second period maintains the drive torque substantially constant before the clutch is released.

92. The vehicle driving force control apparatus as recited in claim 91, wherein
the drive torque control section is further configured to reduce the drive torque of the subordinate drive source to the clutch such that the drive torque of the subordinate drive source is controlled to substantially equal the target drive torque by controlling a field current command value of the field current of the subordinate drive source to a predetermined field current value.

93. The vehicle driving force control apparatus as recited in claim 92, wherein
the drive torque control section is further configured to setting an armature current command value of an armature current of the subordinate drive source to substantially equal a predetermined end-time armature current value that the subordinate drive source requires to output the target drive torque when the field current of the subordinate drive source is substantially equal to the predetermined field current value.

94. The vehicle driving force control apparatus as recited in claim 73, wherein
the drive torque control section is further configured to control the drive torque of the subordinate drive source until the clutch is released by controlling a field current of a power source of the subordinate drive source of the vehicle to a predetermined value.

95. The vehicle driving force control apparatus as recited in claim 73, wherein
the drive torque control section is further configured to reduce the drive torque of the subordinate drive source to the clutch such that the drive torque of the drive source is an output motor torque of a power source which is controlled to substantially equal the target drive torque by controlling a field current command value of the field current of the power source to a predetermined field current value.

96. The vehicle driving force control apparatus as recited in claim 73, wherein
the drive torque control section is further configured to control the drive torque of the subordinate drive source until the clutch is released by setting an armature current command value of am armature current of an electric motor substantially equal to an end-time armature current value immediately after the transition determining section outputs the transition determination.

97. The vehicle driving force control apparatus as recited in claim 73, wherein
the clutch release section is further configured to estimate a convergence time for fluctuations in the drive torque of the subordinate drive source to converge within a prescribed allowable range, and output a command value of the clutch release such that the clutch is released after the convergence time has elapsed based on the estimate.

98. The vehicle driving force control apparatus as recited in claim 67, further comprising
a clutch-release torque correction section configured to correct the target drive torque in accordance with a vehicle body acceleration of the vehicle.

99. The vehicle driving force control apparatus as recited in claim 67, wherein
the transition determining section is further configured to determine the transition condition indicating cease of the drive torque of the subordinate drive source to the subordinate drive wheel based on determining that the drive torque of the subordinate drive source is decreasing, while the vehicle is traveling.

100. The vehicle driving force control apparatus as recited in claim 67, wherein
the transition determining section is further configured to determine the transition condition indicating cease of the drive torque of the subordinate drive source to the subordinate drive wheel based on detecting a field current value of the subordinate drive source that corresponds to the drive torque at which an armature current value of the drive torque become equal to a predetermined end-time armature current value, while the vehicle is traveling.

101. The vehicle driving force control apparatus as recited in claim 67, wherein
the transition determining section is further configured to determine the transition condition indicating cease of the drive torque of the subordinate drive source to the subordinate drive wheel based on detecting a prescribed motor torque of the subordinate drive source that corresponds to the drive torque at which an armature current value to become equal to a predetermined end-time armature current value, while the vehicle is traveling.

102. The vehicle driving force control apparatus as recited in claim 67, wherein
the transition determining section is further configured to determine the transition condition indicating cease of the drive torque of the subordinate drive source to the subordinate drive wheel based on detecting an armature current value of the subordinate drive source that corresponds to a predetermined end-time armature current value, while the vehicle is traveling.

103. The vehicle driving force control apparatus as recited in claim 67, wherein the transition determining section is further configured to determine the transition condition indicating cease of the drive torque of the subordinate drive source to the subordinate drive wheel based on detecting that the drive torque of the subordinate drive source has substantially reached the target drive torque, while the vehicle is traveling.

104. A vehicle driving force control apparatus for a vehicle comprising:

main drive means for supplying a main drive wheel with a drive torque;

subordinate drive means for supplying a subordinate drive wheel with a drive torque;

connecting means for selectively connecting and disconnecting a torque transfer path from the subordinate drive means to the subordinate drive wheel;

transition determining means for outputting a transition determination upon determining a transition condition indicating cease of the drive torque of the subordinate drive means to the subordinate drive wheel, while the vehicle is traveling; and clutch release means for disengaging the connecting means, upon the drive torque of the subordinate drive means substantially reaching a target drive torque in which a difference between an output torque of the connecting means and an input torque of the connecting means is smaller than a prescribed value in response to the transition determination by the transition determining means.

105. A method of controlling a vehicle driving force of a vehicle comprising:

providing a main drive source configured and arranged to supply a main drive wheel with a drive torque;

providing a subordinate drive source configured and arranged to supply a subordinate drive wheel with a drive torque;

providing a clutch disposed in a torque transfer path from the subordinate drive source to the subordinate drive wheel;

determining a transition condition indicating cease of the drive torque of the subordinate drive source to the subordinate drive wheel, while the vehicle is traveling;

outputting a transition determination upon the determining of the issuance of the control command; and disengaging the clutch, upon the drive torque of the subordinate drive source substantially reaching a target drive torque in which a difference between an output torque of the clutch and an input torque of the clutch is smaller than a prescribed value in response to the transition determination.

* * * * *